US011586790B2

(12) United States Patent
AlQahtani et al.

(10) Patent No.: US 11,586,790 B2
(45) Date of Patent: Feb. 21, 2023

(54) DETERMINING HYDROCARBON PRODUCTION SWEET SPOTS

(71) Applicant: Saudi Arabian Oil Company, Dhahran (SA)

(72) Inventors: Ghazi Dhafer AlQahtani, Dhahran (SA); Shahid Manzoor, Khobar (SA); Faisal AlNaseef, Rabwah (SA); Menhal A. Alismael, Qatif (SA); Osman Hamid, Houston, TX (US); Taher Mohammed Yusuf Sodagar, Dhahran (SA); Fabio M. De Matos Ravanelli, Pocos de Caldas (BR)

(73) Assignee: Saudi Arabian Oil Company, Dhahran (SA)

( * ) Notice: Subject to any disclaimer, the term of this patent is extended or adjusted under 35 U.S.C. 154(b) by 342 days.

(21) Appl. No.: 16/868,232

(22) Filed: May 6, 2020

(65) Prior Publication Data

US 2021/0350052 A1 Nov. 11, 2021

(51) Int. Cl.
*G06F 30/28* (2020.01)
*G06F 3/0482* (2013.01)
(Continued)

(52) U.S. Cl.
CPC ............ *G06F 30/28* (2020.01); *G06F 3/0482* (2013.01); *G06T 19/20* (2013.01); *G06F 2113/08* (2020.01)

(58) Field of Classification Search
CPC .... G06F 30/28; G06F 3/0482; G06F 2113/08; G06T 19/20
See application file for complete search history.

(56) References Cited

U.S. PATENT DOCUMENTS 7,277,796 B2 10/2007 Kuchuk et al.
7,389,185 B2 6/2008 Craig
(Continued)

FOREIGN PATENT DOCUMENTS

KR 20200027264 3/2020
WO 0123829 4/2001
(Continued)

OTHER PUBLICATIONS

AlQahtani et al. "A Comparison between Evolutionary Metaheuristics and Mathematical Optimization to Solve the Wells Placement Problem," Advances in Chemical Engineering and Science, Aug. 2013, 3: 30-36.
(Continued)

*Primary Examiner* — Tadesse Hailu
*Assistant Examiner* — Darrin Hope
(74) *Attorney, Agent, or Firm* — Fish & Richardson P.C.

(57) ABSTRACT

Techniques for determining one or more hydrocarbon sweet spots include generating a three-dimensional (3D) simulation model of a hydrocarbon reservoir in a subterranean formation; executing a gas winnowing process to the 3D simulation model; applying one or more geomechanical restraints to the 3D simulation model; activating one or more energy simulation parameters with the 3D simulation model; applying a total dynamic productivity index (TDPI) process to the 3D simulation model to generate at least one 3D index that includes one or more hydrocarbon sweet spots; and generating a graphical representation of the generated 3D index for presentation on a graphical user interface (GUI) to a user.

30 Claims, 38 Drawing Sheets

(51) Int. Cl.
*G06T 19/20* (2011.01)
*G06F 113/08* (2020.01)

(56) References Cited

U.S. PATENT DOCUMENTS

| | | | | |
|---|---|---|---|---|
| 7,620,534 | B2 | 11/2009 | Pita et al. | |
| 7,874,357 | B2 | 1/2011 | Jalali et al. | |
| 7,963,327 | B1 | 6/2011 | Saleri et al. | |
| 7,983,885 | B2 | 7/2011 | Suarez-Rivera et al. | |
| 8,005,658 | B2 | 8/2011 | Tilke et al. | |
| 8,280,695 | B2 | 10/2012 | Neelamani et al. | |
| 9,816,366 | B2 | 11/2017 | AlQahtani et al. | |
| 9,864,098 | B2 | 1/2018 | Sequiera et al. | |
| 2007/0016389 | A1 | 1/2007 | Ozgen | |
| 2007/0038375 | A1 | 2/2007 | Jalali et al. | |
| 2007/0083331 | A1 | 4/2007 | Craig | |
| 2007/0255500 | A1 | 11/2007 | Pita et al. | |
| 2008/0167849 | A1 | 7/2008 | Hales et al. | |
| 2010/0084131 | A1 | 4/2010 | Bouzas et al. | |
| 2010/0114544 | A1 | 5/2010 | Dogru | |
| 2010/0179797 | A1* | 7/2010 | Cullick | E21B 43/30 703/10 |
| 2010/0191516 | A1* | 7/2010 | Benish | E21B 43/00 703/10 |
| 2010/0299125 | A1 | 11/2010 | Ding et al. | |
| 2011/0022368 | A1 | 1/2011 | Huang et al. | |
| 2011/0320047 | A1* | 12/2011 | Stone | E21B 43/00 703/2 |
| 2012/0253770 | A1* | 10/2012 | Stern | G06F 30/20 703/10 |
| 2013/0268248 | A1 | 10/2013 | Bouzarkouna et al. | |
| 2015/0233846 | A1* | 8/2015 | Locklair | G01N 23/223 378/45 |
| 2018/0258748 | A1* | 9/2018 | AlQahtani | G06Q 10/04 |
| 2019/0345815 | A1* | 11/2019 | Mishra | G01V 1/34 |
| 2020/0097864 | A1* | 3/2020 | Gupta | G06Q 50/06 |

FOREIGN PATENT DOCUMENTS

| | | |
|---|---|---|
| WO | 2009105650 | 8/2009 |
| WO | 2010080270 | 7/2010 |

OTHER PUBLICATIONS

Al-Qahtani et al., "New Hydrocarbon Reservoir Sweet Spot Identifier Enabling Optimal Field Development Plans," The Aramco Jounal of Technology, Winter 2019, 92 pages.

Artus et al., "Optimization of Nonconventional Wells Under Uncertainty Using Statistical Proxies," Computational Geosciences, Nov. 2006, 10(4): 389-404.

Bukhamsin et al., "Optimization of Multilateral Well Design and Location in a Real Field Using Continuous Genetic Algorithm," SPE 136944 Annual Technical Conference and Exhibtion, Apr. 4-7, 2010, 16 pages.

Cruz et al., "The Quality Map: A Tool for Reservoir Uncertainty Quantification and Decision Making," SPE Annual Technical Conference and Exhibition, Oct. 3-6, 1999, Houston, TX; Society of Petroleum Engineers, 1999, 11 pages.

Dasgupta et al., "Algorithms," McGraw-Hill, 2006, 318 pages, p. 21.

Ding, "Optimization of Well Placement Using Evolutionary Algorithms," SPE Europec/EAGE Annual Conference and Exhibition, Society of Petroleum Engineers, Jun. 9-12, 2008, 18 pages.

Farmer et al., "Optimal Multilateral Well Placement," Oxford University Mathematical Institute, Aug. 2010, 10, 16 pages.

Harris et al., "Combinatorics and Graph Theory", Second Edi. Springer, 2008, p. 34, 6 pages.

Magnanti et al., "Network Flows: Theory, Algorithms, and Applications," Prentice-Hall, Inc, Jan. 1993, publication information only, 9 pages.

Onwunalu and Durlofsky, "A New Well-Pattern-Optimization Procedure for Large-Scale Field Development," SPE124364, presented at the SPE Annual Technical Conference and Exhibition, New Orleans, Oct. 4-7, 2009; SPE Journal, Society of Petroleum Engineers, Sep. 2011, 14 pages.

Onwunalu, "Optimization of Nonconventional Well Placement Using Genetic Algorithms and Statistical Proxy," A Report Submitted to the Department of Petroleum Engineering of Stanford University in Partial Fulfillment of the Requirement for the Degree of Master of Science, Jun. 2006, 73 pages.

Saggaf, "A Vision for Future Upstream Technologies," SPE 109323, Journal of Petroleum Technology, Mar. 2008, 7 pages.

Siu et al. "Re-Engineering the Well Calibration Procedure for a Large Number of High Productivity Wells," SPE 66385, SPE Reservoir Simulation Symposium, Houston, Texas, Feb. 11-14, 2001; Society of Petroleum Engineers, 2001, 9 pages.

Vasantharajan et al. "Well Site Selection Using Integer Programming Optimization" in Proceedings of IAMG'97, V. PawlowskyGlahn (Ed.), CIMNE, Barcelona, 1997, pp. 421-426.

Yeten et al., "Optimization of Nonconventional Well Type, Location and Trajectory," SPE 77565 Annual Technical Conference and Exhibition, Sep. 2002, 14 pages.

PCT International Search Report and Written Opinion in International Appln. PCT/US2015/039710, dated Oct. 9, 2015, 4 pages.

McClure, "D-0949: Total Dynamic Productivity Index (TDPI) Maps for Wells Placement Optimization and Reservoir Management Decisions" Sep. 2019, 2 pages (Abstract only).

PCT International Search Report and Written Opinion in International Appln. PCT/US2021/030572, dated Sep. 17, 2021, 16 pages.

* cited by examiner

700

1700

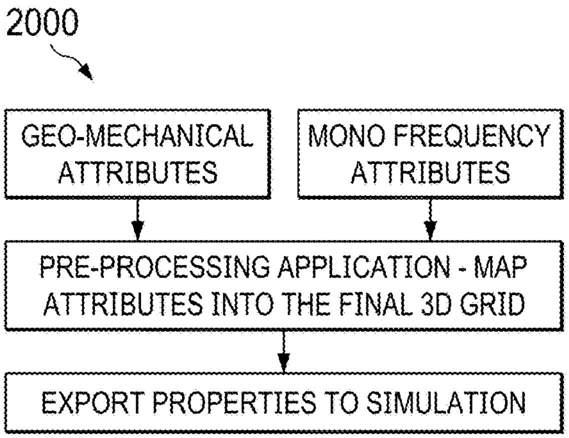
FIG. 20
2100
| | ATTRIBUTE | CUT-OFF RELATION | VALUE |
|---|---|---|---|
| 2105 | FRACTURE GRADIENT <0.85 | < | 0.85 psi/ft |
| | YOUNG'S MODULUS | < | 14 mpsi |
| | POISSON'S RATIO | > | 0.2 |
| 2110 | Abs-Imp_RMS | = | 22000 - 55000. |
| | FSD20 | > | 1.25 |
| | FSD10/30 | > | 1.25 |
| | Skelton_RMS | = | 0-0.4. |
| | RMS_Ampl | = | 10000 - 60000 |
| | CMX_FSD10/40 | > | 1.25 |
FIG. 21
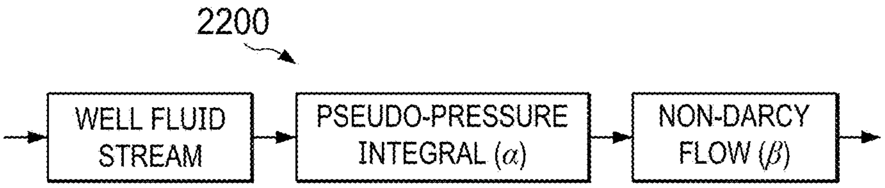
FIG. 22

2800

| PARAMETER | VALUE |
|---|---|
| FIELD NAME | Y |
| I*J*K | 629*1276*238 |
| FLUID TYPE | GAS MODELED AS BLACK OIL |
| SPACING | 8 CELLS |
| MaxQg | 50000 mscfpd |
| Min BHP | 1000 psi |
| START OF ASSESSMENT | AT START OF PREDICTION 2020 |
| DURATION OF THE ASSESSMENT | 10 YEARS |
| PROPERTY FILTERS APPLIED | SGAS > 0.00 |

| PARAMETER | VALUE |
|---|---|
| NUMBER OF ASSESSMENT CASES | 81 |
| NUMBER OF CPUs REQUIRED FOR EACH CASE | 1,000 |
| RUNTIME FOR ONE CASE | 0.5 HOUR |
| NUMBER OF FREE AND AVAILABLE CPUs IN THE CLUSTER | > 81,000 |

3105

| PARAMETER | VALUE |
|---|---|
| NUMBER OF ASSESSMENT CASES | 81 |
| NUMBER OF CPUs REQUIRED FOR EACH CASE | 1,000 |
| RUNTIME FOR ONE CASE | 0.5 HOUR |
| NUMBER OF FREE AND AVAILABLE CPUs IN THE CLUSTER | < 81,000 |

OPTIMA

Scenario

- New: Scenario_1
- Existing:

Release Date: 01/19/2020

Assessment Wells Constraints

Fluid: ○ Oil  ○ Gas
Horizontal Spacing: 1 cells
Max Qg: 50000 mscfpd
Min BHP: 1000 psi

3402

1

Start of Assessment:

- ● Start of Prediction
- ○ Specify: 01/01/1990

3404

2

Duration of the Assessment:

Years: 0
Months: 3

3406

3

Property Filters

| | Property | Time | Logic | Value | Delete |
|---|---|---|---|---|---|
| 1 | POROS | 1-1-1990 | > | 0.00 | |
| 2 | SGAS | 1-1-1990 | > | 0.00 | |

3408

4

Layer Filter

| From | To | Delete |
|---|---|---|

3410

5

Simulator Version: Prod (CL17610)   Number of Slots: 4   [Run]

[Save] [Delete] [Close]

3412

6

Case Loaded Successfully

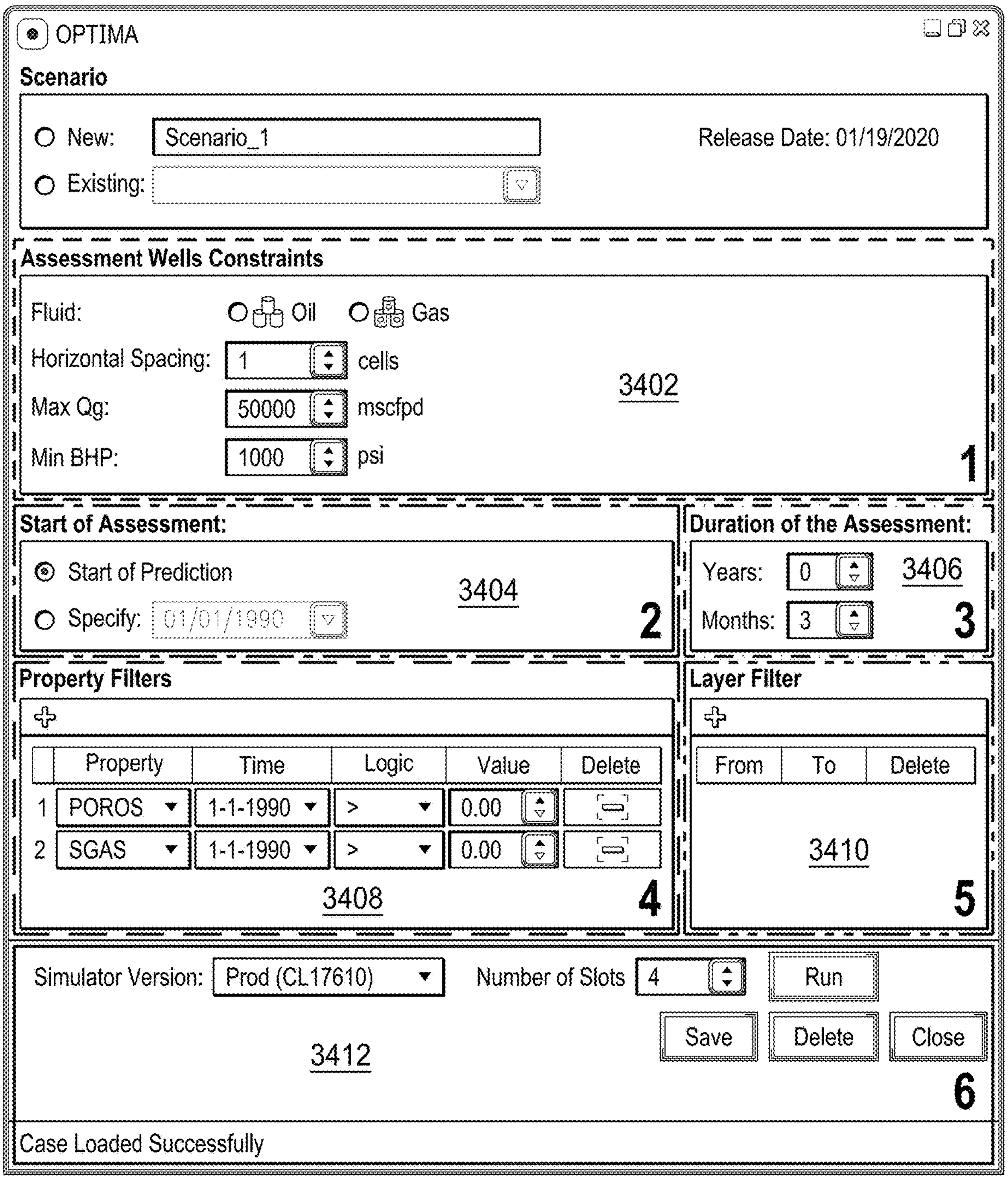

| RUN | DATA (MMSCF/D) |
|---|---|
| WELLS BASED ON GAS PRESSURE RELATED SIMULATION PARAMETERS | 508,191 |
| WELLS BASED ON GEO-MECHANICAL PROPERTIES | 397,046 |
| WELLS BASED ON MONO FREQUENCY ATTRIBUTES | 387,220 |
| WELLS BASED ON EQUAL SPACING | 275,845 |
| WELLS BASED ON ROI | 161,343 |

DETERMINING HYDROCARBON PRODUCTION SWEET SPOTS

TECHNICAL FIELD

This document relates to determining hydrocarbon sweet spots and, more particularly, determining sweet spots for gas reservoirs.

BACKGROUND

Identifying sweet spots (for example, production sites) for gas reservoirs is challenging and not trivial as compared to oil reservoirs. Static properties such as porosity, permeability and gas saturation at a specified single time can be misleading if used to determine sweet spots in gas reservoirs. Gas reservoir development may undergo different depletion strategies than oil reservoirs. One of the reasons is that a different drive mechanism is attributed mainly to gas expansion for conventional gas reservoirs.

SUMMARY

Example implementations include a computer-implemented method executed by one or more hardware processors for determining one or more hydrocarbon sweet spots. The computer-implemented method includes generating a three-dimensional (3D) simulation model of a hydrocarbon reservoir in a subterranean formation; executing a gas winnowing process to the 3D simulation model; applying one or more geomechanical restraints to the 3D simulation model; activating one or more energy simulation parameters with the 3D simulation model; applying a total dynamic productivity index (TDPI) process to the 3D simulation model to generate at least one 3D index that includes one or more hydrocarbon sweet spots; and generating a graphical representation of the generated 3D index for presentation on a graphical user interface (GUI) to a user.

In an aspect combinable with the example implementation, generating the 3D simulation model includes integrating one or more 3D geomechanical properties and one or more two- or three-dimensional (2D or 3D) mono frequency attributes with the 3D simulation model; and generating a history matched 3D simulation model that includes a grid model that includes a plurality of grid cells.

In another aspect combinable with any of the previous aspects, the plurality of grid cells include a plurality of uniformly-sized grid cells.

Another aspect combinable with any of the previous aspects further includes applying one or more user-defined cutoffs to the 2D or 3D mono frequency attributes.

Another aspect combinable with any of the previous aspects further includes applying one or more user-defined cutoffs to the 3D geomechanical properties.

Another aspect combinable with any of the previous aspects further includes excluding a portion of the plurality of grid cells based on the applied one or more user-defined cutoffs to the 2D or 3D mono frequency attributes and the applied one or more user-defined cutoffs to the 3D geomechanical properties.

Another aspect combinable with any of the previous aspects further includes generating the history matched 3D simulation model that includes the grid model that includes the plurality of grid cells without the excluded portion of the plurality of uniformly-sized grid cells.

Another aspect combinable with any of the previous aspects further includes receiving the one or more user-defined cutoffs to the 2D or 3D mono frequency attributes and the one or more user-defined cutoffs to the 3D geomechanical properties from the user through the GUI.

In another aspect combinable with any of the previous aspects, generating the one or more energy simulation parameters with the 3D simulation model includes activating a pseudo-pressure function; activating a non-Darcy flow function; and generating the history matched 3D simulation model that includes the pseudo-pressure function and the non-Darcy flow function.

Another aspect combinable with any of the previous aspects further includes receiving a pseudo-pressure blockage factor for the pseudo-pressure function and a D factor for the non-Darcy flow function from the user through the GUI In another aspect combinable with any of the previous aspects, applying the TDPI process includes identifying one or more user-defined TDPI factors; executing productivity index computations for each of the one or more hydrocarbon sweet spots for each of a plurality of layers in the 3D simulation model; and generating a TDPI for each of a plurality of grid cells of the 3D simulation model per layer of the plurality of layers in the 3D simulation model.

In another aspect combinable with any of the previous aspects, the one or more user-defined TDPI factors include at least one of a spacing between the one or more hydrocarbon sweet spots; one or more static cutoffs; one or more dynamic cutoffs; a time interval between completion times of the one or more hydrocarbon sweet spots; or one or more layers of the plurality of layers to be excluded from the productivity index computations.

In another aspect combinable with any of the previous aspects, the graphical representation of the generated 3D index includes at least one of a graphical representation of the generated 3D index that includes mono frequency attributes; a graphical representation of the generated 3D index that includes geomechanical properties; or a graphical representation of the generated 3D index that includes has energy simulation parameters.

Implementations can also be realized in computing systems and tangible, non-transitory computer-readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

One, some, or all of the implementations according to the present disclosure may include one or more of the following features. For example, implementations according to the present disclosure may reduce or eliminate the drilling of inefficient hydrocarbon wells that can cost millions of dollars every year to drill and place gas wells (for example, when compared to oil wells). Implementations may provide for a robust system that ensures that every drilled well is justified with robust sweet spots system that provide an energetic view and understanding about every layer in the gas reservoir. Such a robust system may allow reservoir engineers to prioritize locations for new wells and sidetracks and help engineers contrast and rank different fields performance and establish compare and rank list for fields to be developed economically. Implementations according to the present disclosure may also aid in knowing which areas in the reservoir require attention, whether related to poor performance or lack of data. For gas reservoirs, the example implementations identify energy points and productivity potential which is a conventional challenge, as gas reservoirs may honor different drive mechanisms than oil reservoirs and a profound understanding may be essential to know how the reservoir is unleashing energy through production wells.

One, some, or all of the implementations according to the present disclosure may also include one or more of the following features. For example, implementations according to the present disclosure may combine data from different disciplines such as seismic data, geomechanics and reservoir engineering to provide an upfront picture about reservoir quality and energy points. Implementations according to the present disclosure may provide improvements over conventional calculation methods that represent reservoir quality by reservoir static properties at initial reservoir conditions or dynamic properties as saturation and pressure or a function of both at specific location in the reservoir, which do not capture the comprehensive effect of the well region contribution to the long term performance of the well at a specific location. Implementations according to the present disclosure may provide improvements over conventional calculation methods that only capture the quality of the reservoir at a specific location which only contributes to the very early stages of production. Implementations according to the present disclosure may provide improvements over conventional calculation methods that only consider the regional quality in calculating reservoir quality indices, which are not practical especially in very large models (for example, models with greater than 1 MM grid blocks). As an example, implementations according to the present disclosure may reduce and save enormous computational cost overhead that would require availing a massive computing power and a long period of run time for conventional calculation methods.

One, some, or all of the implementations according to the present disclosure may also include one or more of the following features. For example, implementations according to the present disclosure may develop indicators for gas reservoir sweet spots that are based on dynamic parameters that implicitly combine fluid and rock properties with pressure and saturation as they change with time. As another example, implementations according to the present disclosure may factor gas energy components such as non-Darcy flow and blockage coefficient for gas condensate into computations of productivity index, which illuminates the changes occurred due to gas expansion and non-Darcy flow contribution to the productivity of wells. As another example, implementations according to the present disclosure may incorporate seismic mono frequency data to account for areal discrepancies in gas saturation together with rock quality. As another example, implementations according to the present disclosure may include geo-mechanics in a computational model, which sets the stage to place acceptable drillable new wells and/or sidetracks based on critical parameters such as Poisson's ration, young modulus, minimum stress, fracturability index, and brittleness index. Such a combination may entail static and dynamic reservoir parameters in the process of identifying sweet spots and energy points.

One, some, or all of the implementations according to the present disclosure may also include one or more of the following features. For example, implementations according to the present disclosure may develop sweet spot indicators that can be found with minimum sensitivity to simulation time. Such a feature may result in minimal computational expense to generate the output values, since it can be created after a small time elapsed and provide the same information quality as if the invented method had been created after a very long simulation production time. Such a feature can facilitate real options decisions for intelligent or smart fields since new sweet spot indication values can be generated quickly once abrupt changes have been recorded in the dynamicity of any reservoir considered. Implementations according to the present disclosure, therefore, can open the door to nominate hydraulic fracturing sites by generating the three-dimensional (3D) quality maps with geomechanical properties, before and after fracturing is simulated on tight zones in reservoir models. Implementations according to the present disclosure can be combined with many geological realizations to embrace uncertainty and thus result in ranked, tuned models to be used for any reservoir management actions. In addition implementations according to the present disclosure may allow several evaluation opportunities for fields' business development plans to be initiated at different time intervals. Such evaluations include but are not limited to several well types to connect the identified sweet spots and recommended completion target layers in the reservoir of interest.

Implementations of the embodiments described in the present disclosure may include systems and computer-readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more embodiments are set forth in the accompanying drawings and the description. Other features, objects, and advantages will be apparent from the description and drawings, and from the claims.

DESCRIPTION OF DRAWINGS

FIG. 20 illustrates a process chart according to the present disclosure.

FIG. 21 illustrates a table with geomechanical and mono frequency attributes with cut-offs according to the present disclosure.

FIG. 22 illustrates an example workflow of unified near wellbore modeling options according to the present disclosure.

FIG. 28 illustrates a table that shows a gas model of an example specified field according to the present disclosure.

FIG. 34 illustrates a graphical user interface (GUI) illustrating sections to be specified by a user according to the present disclosure.

DETAILED DESCRIPTION

This document discusses systems, methods, and computer-readable media for determining one or more hydrocarbon production sites such as, for example, production sites that represent gas reservoir sweet spots. In some implementations, data from different sources (for example, seismic data, geomechanical properties, dry gas pressure computations) is integrated to provide a quality picture about dry gas energy spots distribution at any specific time interval in a particular gas reservoir (or reservoirs). In some aspects, the described implementations may be used to answer questions regarding the best spots in a dry gas reservoir, where to place gas effective producers, what locations are good to increase the chances of drillable wells, and where are the fracturable locations that can improve success chances of fracturing jobs in gas wells. Aspects of the present disclosure may include multiple technologies such as mono frequency spectrum decomposition (MFSD), geomechanical property modeling and identification, and total dynamic productivity index (TDPI).

Figure 1:
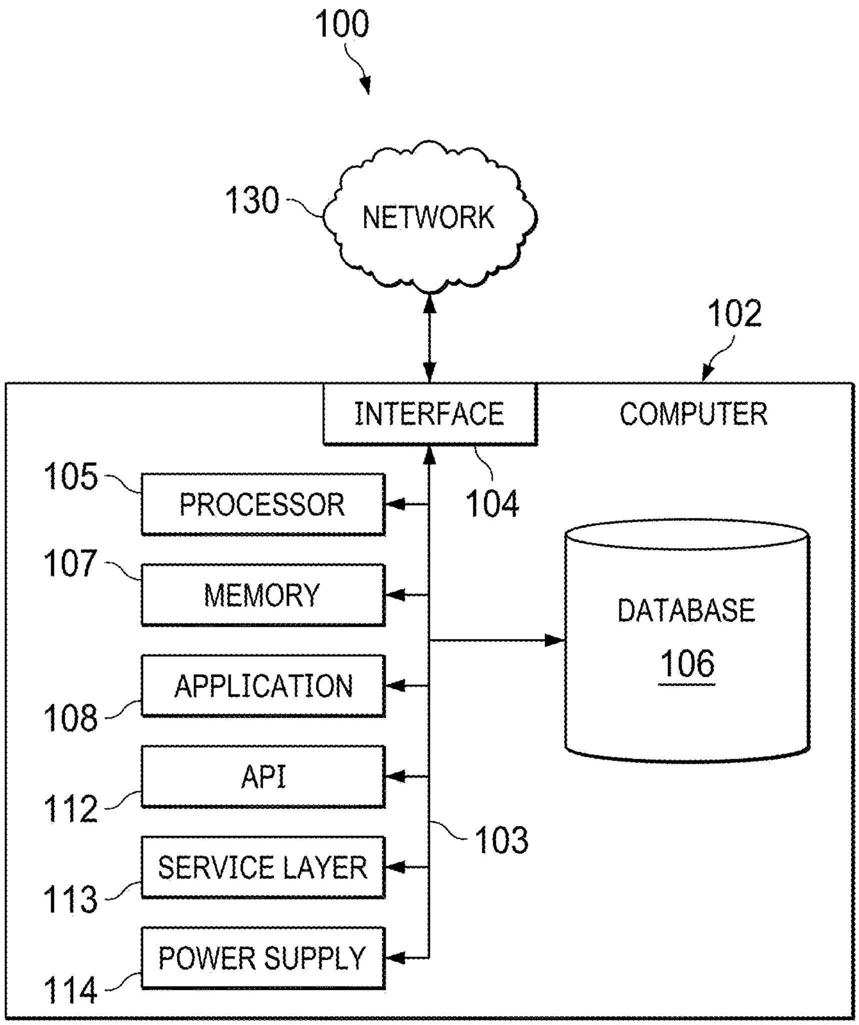
FIG. 1 is a block diagram of an example computer system used to provide computational functionalities associated with described algorithms, methods, functions, processes, flows, and procedures described in the present disclosure, according to some implementations of the present disclosure.

FIG. 1 is a block diagram of an example computer system 100 used to provide computational functionalities associated with described algorithms, methods, functions, processes, flows, and procedures described in the present disclosure, according to some implementations of the present disclosure. The illustrated computer 102 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 102 can include input devices such as keypads, keyboards, and touch screens that can accept user information. Also, the computer 102 can include output devices that can convey information associated with the operation of the computer 102. The information can include digital data, visual data, audio information, or a combination of information. The information can be presented in a graphical user interface (UI) (or GUI).

The computer 102 can serve in a role as a client, a network component, a server, a database, a persistency, or components of a computer system for performing the subject matter described in the present disclosure. The illustrated computer 102 is communicably coupled with a network 130. In some implementations, one or more components of the computer 102 can be configured to operate within different environments, including cloud-computing-based environments, local environments, global environments, and combinations of environments.

At a high level, the computer 102 is an electronic computing device operable to receive, transmit, process, store, and manage data and information associated with the described subject matter. According to some implementations, the computer 102 can also include, or be communicably coupled with, an application server, an email server, a web server, a caching server, a streaming data server, or a combination of servers.

The computer 102 can receive requests over network 130 from a client application (for example, executing on another computer 102). The computer 102 can respond to the received requests by processing the received requests using software applications. Requests can also be sent to the computer 102 from internal users (for example, from a command console), external (or third) parties, automated applications, entities, individuals, systems, and computers.

Each of the components of the computer 102 can communicate using a system bus 103. In some implementations, any or all of the components of the computer 102, including hardware or software components, can interface with each other or the interface 104 (or a combination of both), over the system bus 103. Interfaces can use an application programming interface (API) 112, a service layer 113, or a combination of the API 112 and service layer 113. The API 112 can include specifications for routines, data structures, and object classes. The API 112 can be either computer-language independent or dependent. The API 112 can refer to a complete interface, a single function, or a set of APIs.

The service layer 113 can provide software services to the computer 102 and other components (whether illustrated or not) that are communicably coupled to the computer 102. The functionality of the computer 102 can be accessible for all service consumers using this service layer. Software services, such as those provided by the service layer 113, can provide reusable, defined functionalities through a defined interface. For example, the interface can be software written in JAVA, C++, or a language providing data in extensible markup language (XML) format. While illustrated as an integrated component of the computer 102, in alternative implementations, the API 112 or the service layer 113 can be stand-alone components in relation to other components of the computer 102 and other components communicably coupled to the computer 102. Moreover, any or all parts of the API 112 or the service layer 113 can be implemented as child or sub-modules of another software module, enterprise application, or hardware module without departing from the scope of the present disclosure.

The computer 102 includes an interface 104. Although illustrated as a single interface 104 in FIG. 1, two or more interfaces 104 can be used according to particular needs, desires, or particular implementations of the computer 102 and the described functionality. The interface 104 can be used by the computer 102 for communicating with other systems that are connected to the network 130 (whether illustrated or not) in a distributed environment. Generally, the interface 104 can include, or be implemented using, logic encoded in software or hardware (or a combination of software and hardware) operable to communicate with the network 130. More specifically, the interface 104 can include software supporting one or more communication protocols associated with communications. As such, the network 130 or the interface's hardware can be operable to communicate physical signals within and outside of the illustrated computer 102.

The computer 102 includes a processor 105. Although illustrated as a single processor 105 in FIG. 1, two or more processors 105 can be used according to particular needs, desires, or particular implementations of the computer 102 and the described functionality. Generally, the processor 105 can execute instructions and can manipulate data to perform the operations of the computer 102, including operations using algorithms, methods, functions, processes, flows, and procedures as described in the present disclosure.

The computer 102 also includes a database 106 that can hold data for the computer 102 and other components connected to the network 130 (whether illustrated or not). For example, database 106 can be an in-memory, conventional, or a database storing data consistent with the present disclosure. In some implementations, database 106 can be a combination of two or more different database types (for example, hybrid in-memory and conventional databases) according to particular needs, desires, or particular implementations of the computer 102 and the described functionality. Although illustrated as a single database 106 in FIG. 1, two or more databases (of the same, different, or combination of types) can be used according to particular needs, desires, or particular implementations of the computer 102 and the described functionality. While database 106 is illustrated as an internal component of the computer 102, in alternative implementations, database 106 can be external to the computer 102.

The computer 102 also includes a memory 107 that can hold data for the computer 102 or a combination of components connected to the network 130 (whether illustrated or not). Memory 107 can store any data consistent with the present disclosure. In some implementations, memory 107 can be a combination of two or more different types of memory (for example, a combination of semiconductor and magnetic storage) according to particular needs, desires, or particular implementations of the computer 102 and the described functionality. Although illustrated as a single memory 107 in FIG. 1, two or more memories 107 (of the same, different, or combination of types) can be used according to particular needs, desires, or particular implementations of the computer 102 and the described functionality. While memory 107 is illustrated as an internal component of the computer 102, in alternative implementations, memory 107 can be external to the computer 102.

The application 108 can be an algorithmic software engine providing functionality according to particular needs, desires, or particular implementations of the computer 102 and the described functionality. For example, application 108 can serve as one or more components, modules, or applications. Further, although illustrated as a single application 108, the application 108 can be implemented as multiple applications 108 on the computer 102. In addition, although illustrated as internal to the computer 102, in alternative implementations, the application 108 can be external to the computer 102.

The computer 102 can also include a power supply 114. The power supply 114 can include a rechargeable or non-rechargeable battery that can be configured to be either user- or non-user-replaceable. In some implementations, the power supply 114 can include power-conversion and management circuits, including recharging, standby, and power management functionalities. In some implementations, the power-supply 114 can include a power plug to allow the computer 102 to be plugged into a wall socket or a power source to, for example, power the computer 102 or recharge a rechargeable battery.

There can be any number of computers 102 associated with, or external to, a computer system containing computer 102, with each computer 102 communicating over network 130. Further, the terms "client," "user," and other appropriate terminology can be used interchangeably, as appropriate, without departing from the scope of the present disclosure. Moreover, the present disclosure contemplates that many users can use one computer 102 and one user can use multiple computers 102.

Application 108 may be executed by the computer to determine hydrocarbon production sites (for example, gas reservoir sweet spots) according to the present disclosure. For example, application 108 may include multiple modules (or execute multiple sub-processes) that create an innovative method to generate productive sweet spots for gas reservoirs using reservoir simulation modeling. For example, a module or sub-process may include preparing 3D history matched simulation model that incorporates dynamic and static reservoir properties, wells performance data, scaled up 3D seismic Mono frequency maps, and 3D geomechanical reservoir properties. Another module or sub-process may identify gas rich grid cells using seismic mono frequency upscaled grids. Another module or sub-process may define geomechanical attractive grid cells in terms of drillability and fracturability. Another module or sub-process may define and apply energy computational parameters, such as pseudo pressure with gas condensate blockage factor and non-Darcy flow component. Another module or sub-process may utilize a TDPI algorithm to compute 3D energy points for every layer in a gas reservoir. The result of the models or sub-processes includes graphical illustrations of predicted or recommended drilling, completion, and/or production sites in a gas reservoir.

Generally, computer system 100 may provide a platform that combines paramount information from geo-physical, geomechanical, geological and reservoir related fluid and rock properties to generate distinctive gas production sweet spots in order to establish a quantitative 3D array that identifies energy potential points in the gas reservoir. Computer system 100 may apply parallel simulation computations to generate reservoir static and dynamic productivity indices using a high performance computational system.

Figure 2:
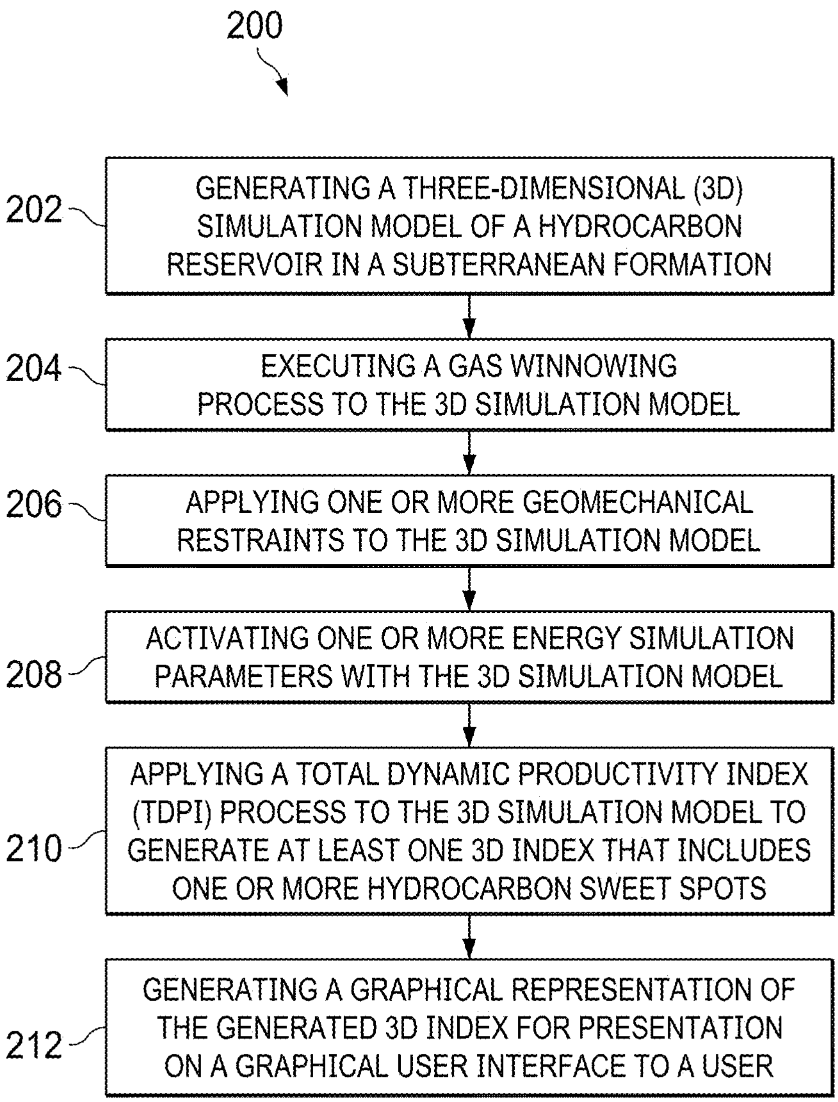
FIG. 2 illustrates an example method for determining hydrocarbon sweet spots according to the present disclosure.

FIG. 2 illustrates an example method 200 for determining hydrocarbon production sites. In some aspects, method 200 may be executed as or as part of the application 108 on the computer 102 shown in FIG. 1. Alternatively, method 200 may be performed on any appropriate computing system that includes one or more hardware processors that can execute stored instructions according to the present disclosure. Method 200 may begin at step 202, which includes generating a three-dimensional (3D) simulation model of a hydrocarbon reservoir in a subterranean formation. For example, the generated 3D simulation model may be built from or by a number of pre-processed data sources, including a history matched simulation model, seismic mono frequency spectral decomposition (MFSD) 2D maps, and 3D geomechanical data generated for a particular field (in other words, a reservoir) of interest. In this disclosure, the particular field may be termed field "Y" for ease of description. Such MFSD and geomechanical data may be generated as follows.

For example, an MFSD ratio workflow may utilize seismic attributes that are used as a DHI (Direct Hydrocarbon Indicator) for gas fluid detection. For instance, each single seismic trace in the surface 3D seismic data volume may consist of a wide-range of composed frequencies. Commonly, the MFSD workflow procedure involves decomposing or separating the 3D seismic data volume into several frequency band wavelets and then sorting the seismic frequency gathers to produce many specific frequency volumes, for example 10, 20, 30, 40 and 50 Hz volumes. Therefore, relative amplitude preserved (RAP) processed 3D pre-stack time migration (PSTM) seismic data volume with noise attenuation and multiple removal is used as an input for the MFSD workflow. Objectives of RAP seismic processing are to provide ideal seismic data for qualitative and quantitative stratigraphic interpretation, which include representing earth true reflectivity, maintaining good correlation with well data, and preserving full frequency bandwidth.

The seismic shadows are the lower frequencies seen beneath gas reservoirs that are usually observed below the high amplitudes associated with gas reservoirs. These low frequency shadows affected by atypically of high attenuations of high frequency amplitudes in the gas reservoir itself due to a sufficient travel path that allows energy absorption shifts the spectral energy from high to low frequencies in these fairly thick gas reservoirs. Therefore, reflections from such reservoirs may exhibit anomalously low frequencies and used as validating of hydrocarbons indications. To differentiate these kind of low frequency shadows in the 3D seismic data volume, spectral differences in the seismic data from above and below the targeted zone are pursued. Then, the spectrum average above the targeted zone is identified to compare with the spectrum average determined below the zone and determine the difference to the attenuation within the targeted zone.

Fault detection is another step in both reservoir characterization and geological modeling. One approach of automatic fault detection is generating coherence volume. However, coherence volumes are sensitive to incoherent anomalies associated with seismic noise. On the other hand, a skeleton volumes methodology highlights more anomalies than coherence volume, although skeleton volumes may highlight tiny discontinuities alongside the faults. In skeleton volume generation, the dip of both fault azimuth and magnitude is considered and can be used in a targeted window of analysis to discard small anomalies and define the faults.

A first step of the application of an MFSD workflow to generate the MFSD data is to apply principal component structure-oriented filtering to reject random noise and sharpen the lateral edges of 3D seismic amplitude data. The next step is to compute Eigen structure coherence, which highlights the stratigraphic and structural discontinuities. A third step is to implement a Laplacian of a Gaussian filter to the coherence attribute that sharpens the steeply dipping faults, attenuates the stratigraphic features parallel to the seismic reflectors, and skeletonizes the unconformity features subparallel to the reflectors. A fourth step is to skeletonize the filtered coherence attribute along with the fault plane. The filtered and skeletonized seismic coherence attribute delineates the geologic discontinuities more clearly and precisely.

Figure 3:
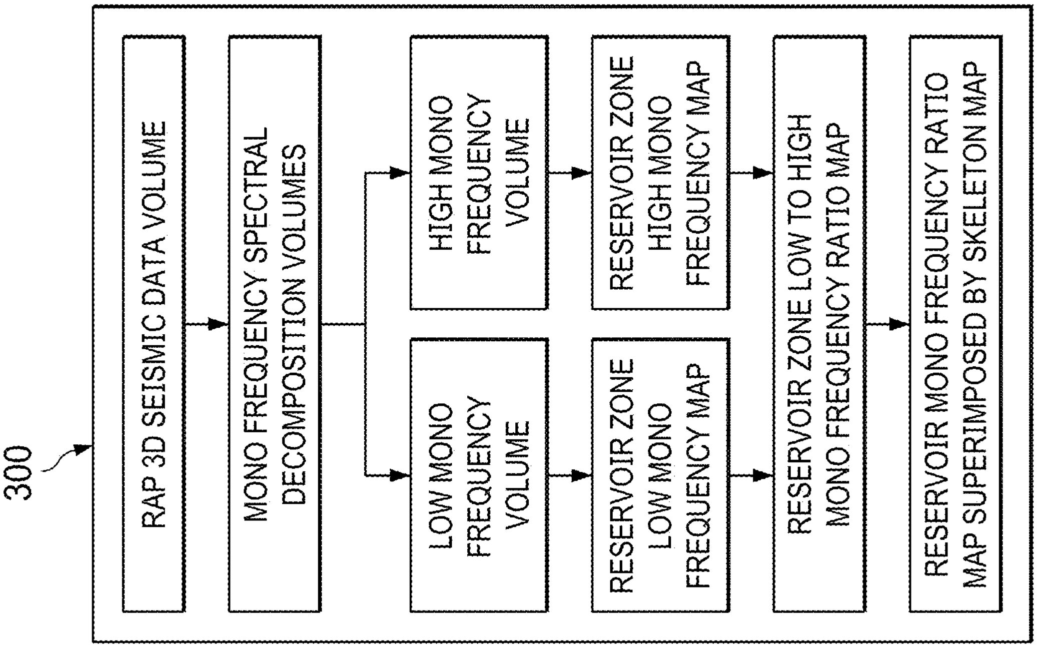
FIG. 3 illustrates a reservoir seismic mono frequency ratio map workflow approach according to the present disclosure.

An MFSD workflow process 300 is shown in FIG. 3. The RAP processing may significantly improve the 3D seismic data volume in terms of noise and multiple suppression. Generally, the seismic amplitude response in the gas bearing reservoirs diminishes at high frequencies more strongly compared to wet reservoirs. Additionally, the seismic amplitude response in the shadow zone below the gas reservoirs attenuates remarkably at common dominant frequencies with comparison of wet reservoirs that get brighter. Therefore, incremental MFSD volumes range from low of 10 to high of 40 Hz were generated as shown in the workflow process 300 of FIG. 3.

Figure 4:
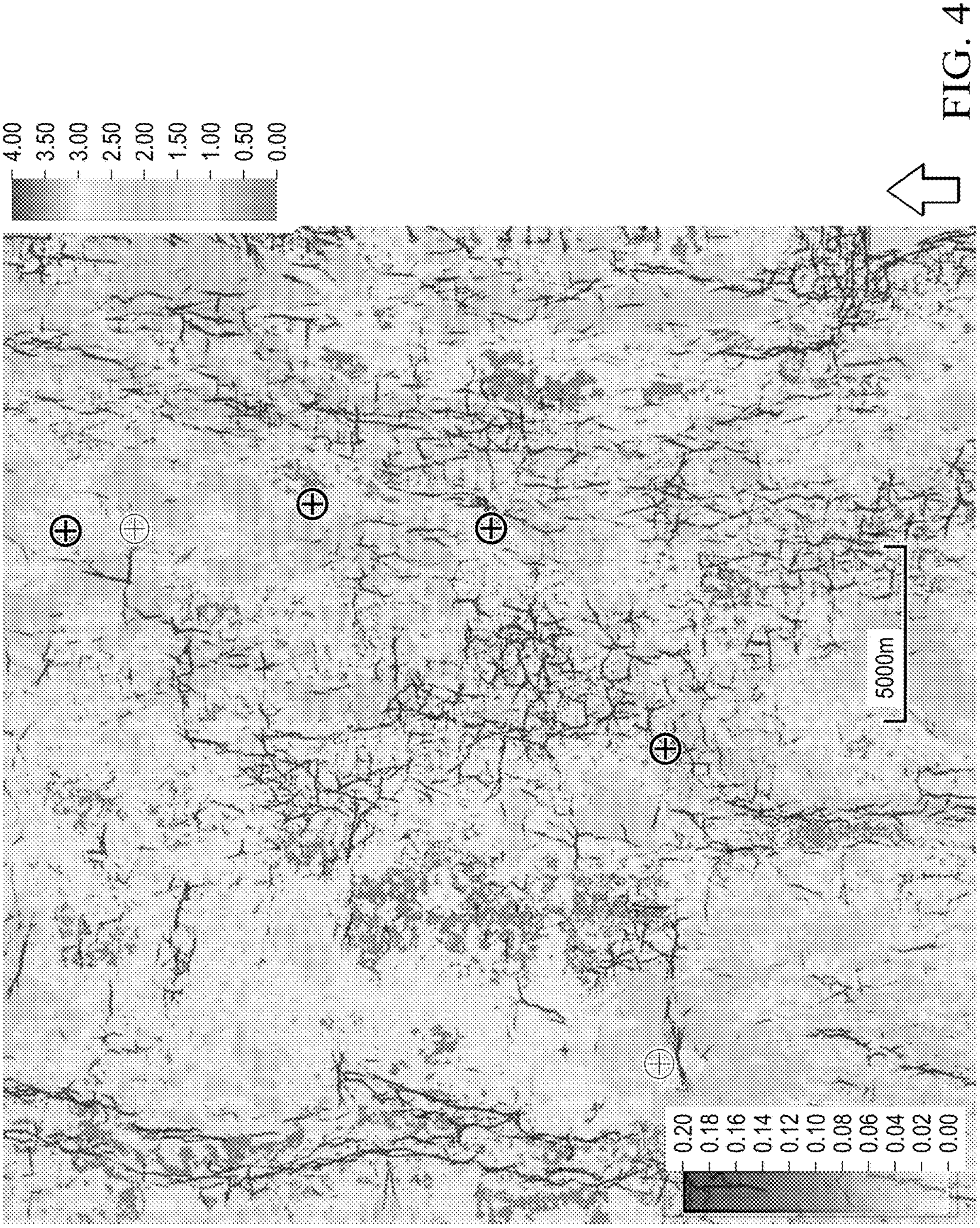
FIG. 4 illustrates a reservoir seismic mono frequency ratio map superimposed by a skeleton map according to the present disclosure.

The reservoir in hand may consist of upper and lower zones. For the upper zone reservoir, specific and unique window maps were created for each mono frequency volumes for the targeted upper zone as shown in the process 300. Afterwards, a ratio map was calculated from the low to high mono frequency maps to help identify gas saturated reservoir locations with bright spots in lower frequency map that are promptly dimmed in higher frequency map as further shown in the process 300. Finally, a reservoir mono frequency ratio map superimposed by a transparent skeleton map to detect faults and fractures lineaments. For example, FIG. 4 shows a map 400 that illustrates the reservoir seismic mono frequency ratio map superimposed by the skeleton map for the upper zone reservoir, which demonstrates the faults and fractures lineaments as well as the sweet bright spots (shown in darker shades) at the gas reservoir wells (represented by black circles) however dimmed (shown in lighter shades) at the water or tight reservoir wells (represented by white circles).

In some aspects, the shadow zone intervals below the gas-saturated zone reservoirs have dimmed spots in common dominant frequency volume. For the lower zone reservoir, common dominant mono frequency volume was produced by exploiting mono frequency spectral decomposition procedure. Then, the lower zone reservoir map was extracted employing a specific interval window from the common dominant mono frequency volume, as shown in the example reservoir to shadow seismic mono frequency ratio map workflow approach 500 shown in FIG. 5. Similarly, definite and distinctive shadow zone interval window map were generated for the zone interval below the lower zone reservoir. Next, the ultimate reservoir to shadow mono frequency ratio map was generated to analyze and recognize gas-bearing bright spot zones. For example, FIG. 6 shows a map 600 that illustrates the reservoir to shadow seismic mono frequency ratio map superimposed by the skeleton map for the lower zone reservoir, which demonstrates the faults and fractures lineaments as well as the sweet bright spots (shown in darker shades) at the gas reservoir wells (represented by black circles) however dimmed (shown in lighter shades) at the water or tight reservoir wells (represented by white circles).

Figure 5:
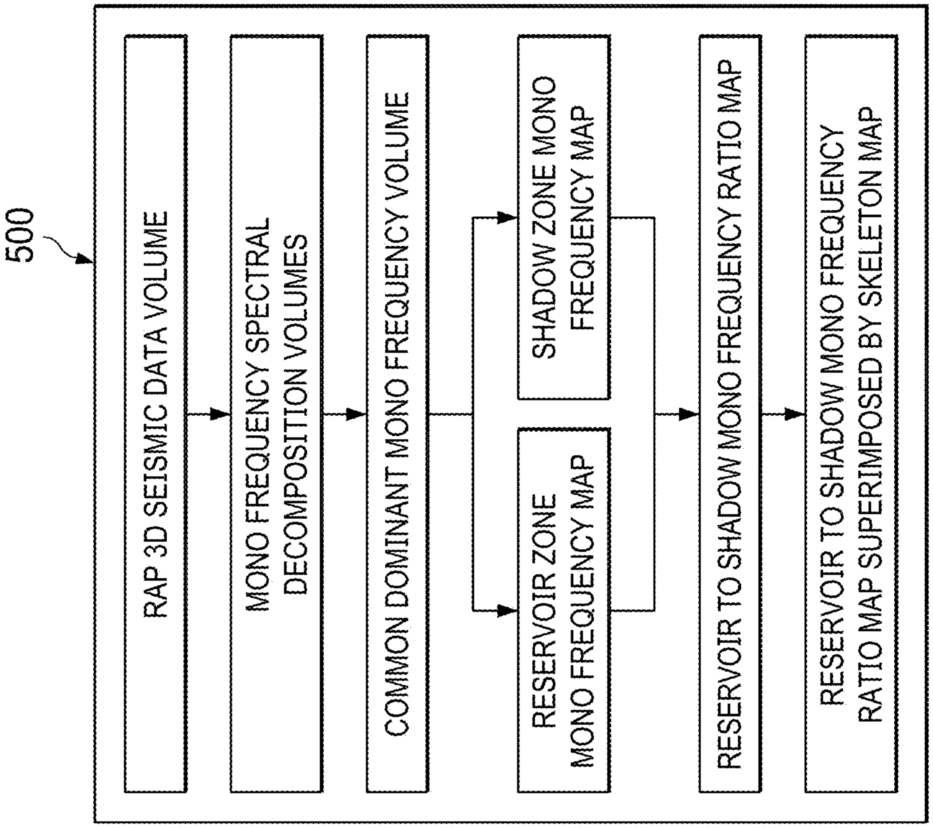
FIG. 5 illustrates a reservoir to shadow seismic mono frequency ratio map workflow approach according to the present disclosure.
Figure 6:
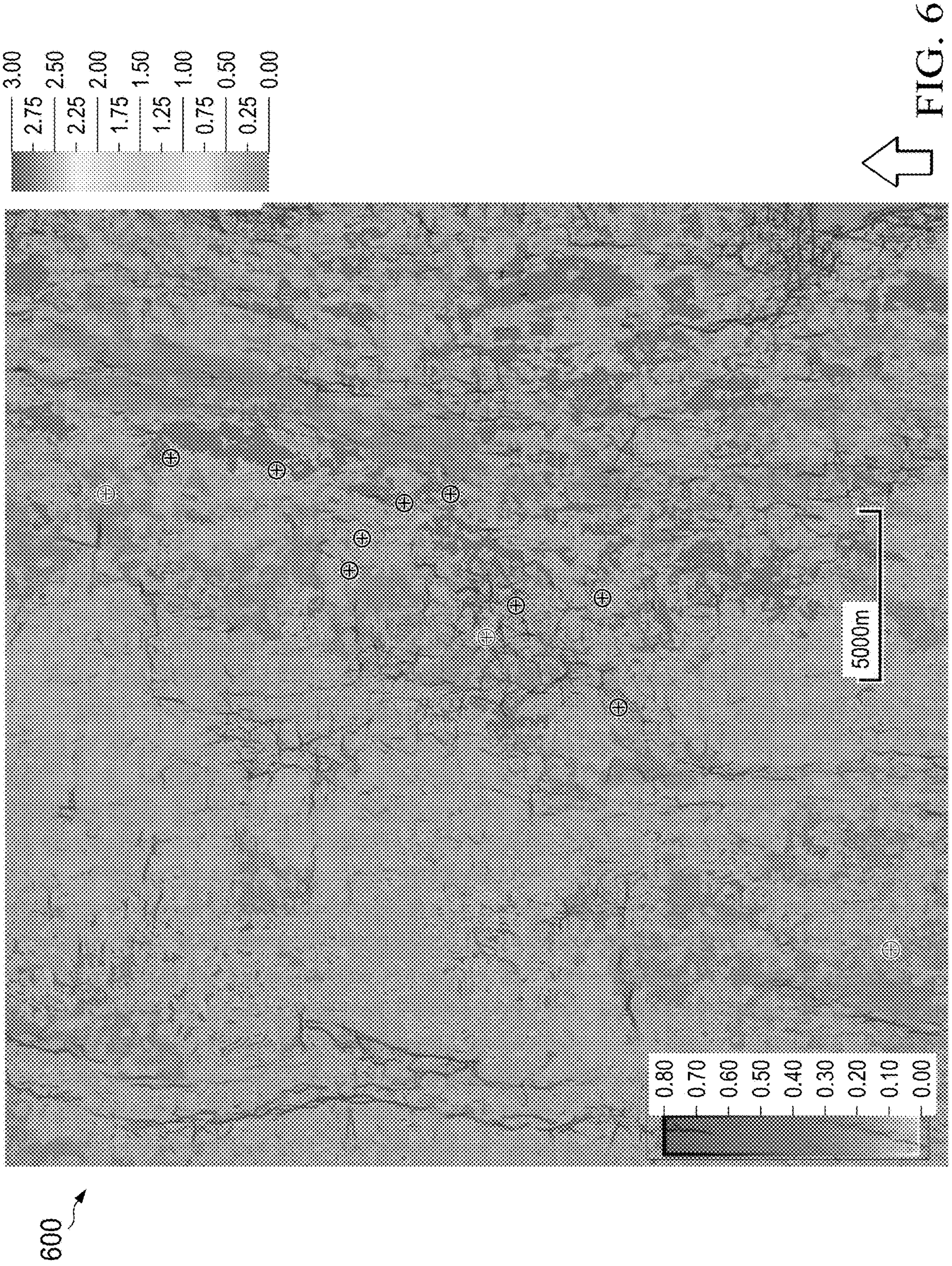
FIG. 6 illustrates a reservoir to shadow seismic mono frequency ratio map superimposed by a skeleton map according to the present disclosure.

As shown in FIGS. 5 and 6, the reservoir to shadow mono frequency ratio workflow map (600) reveals sweet spots of high amplitude attenuation ratio at the drilled gas wells while dimmed or low ratio of amplitude attenuation at the drilled water or tight wells. Finally, the reservoir to shadow mono frequency ratio map overlain by the transparent skeleton map (in other words, map 600) identifies faults and fractures lineaments (as shown in FIG. 6).

Posting the drilled gas and non-gas wells on the ultimate seismic mono frequency ratio maps which produced by the reservoir and reservoir to shadow seismic mono frequency workflows 300 and 500 display high confidence when correlated with the drilled wells in the study area and, as a result, reduces the uncertainties of proposing new exploration, delineation and development planned wells. Therefore, such posting may reduce the risk by avoiding drilling potentially unsuccessful wells.

After generating 2D MFSD maps for both reservoir zones, such maps can be converted into 3D maps that can be aggregated with the generated 3D simulation model of step 202.

As described, the generated 3D simulation model may utilize geomechanical properties. Geomechanical properties may be obtained from planning-to-production workflows that use 1D/3D/4D geomechanical modeling approaches to cluster reservoir properties, stimulation, and drilling qualities. Such workflows may lead to landing lateral wellbores in a better reservoir quality, provide strong guidelines for wellbore drillability, and provide effective solutions for formation fracturability and injectivity related issues that is facing completion and stimulation operations. Such workflows may include the following aspects:

(1) Investigating and analyzing all possible reasons for operational challenges and failure including reservoir quality, wellbore ovality, low or no injectivity issues, and high breakdown pressure.

Figure 7:
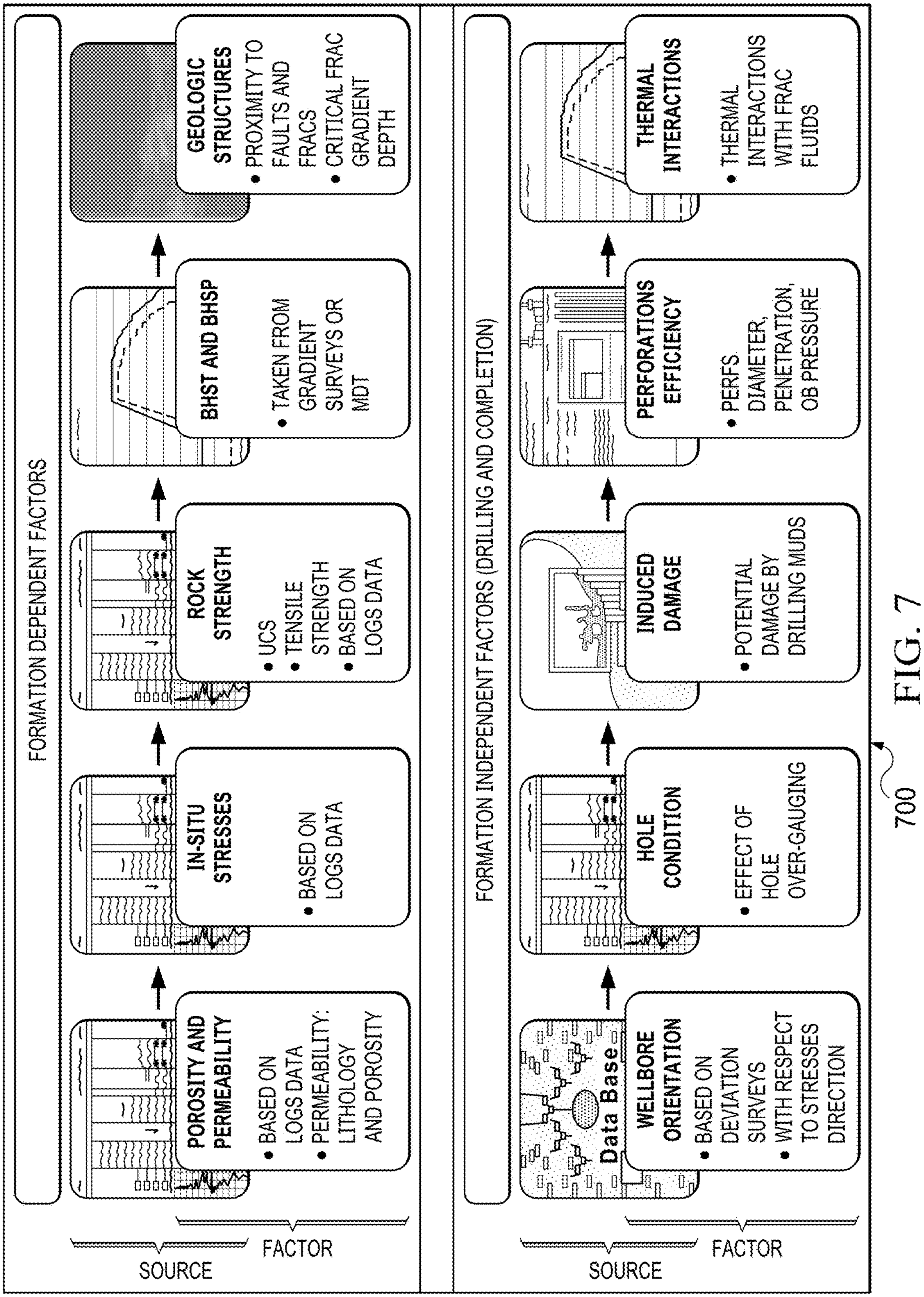
FIG. 7 illustrates an example workflow illustrating categorized factors that influence a stimulation operation according to the present disclosure.

(2) Establishing a workflow for dependent and independent factors that influence drilling and stimulation operations, including reservoir properties, geomechanical parameters, geological structures, and operational practices. Such a workflow is exemplified in FIG. 7 as workflow 700.

Figure 8:
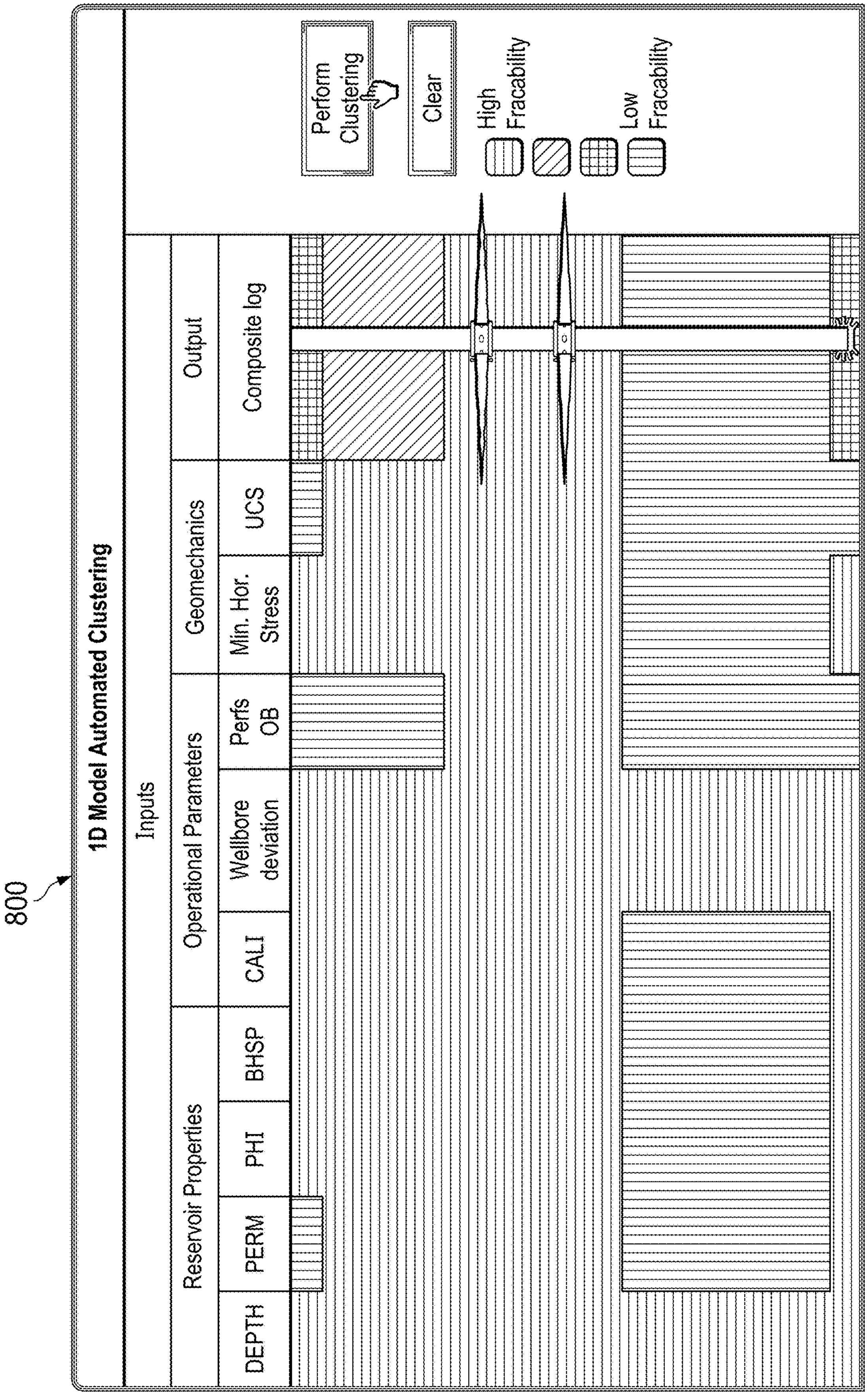
FIG. 8 illustrates a chart that shows one-dimensional (1D) automated clustering according to the present disclosure.

(3) Developing numerical methods to perform 1D clustering processes to analyze the reservoir sections and reflects a composite log that highlights different levels of stimulation difficulties across the intervals. An example of a 1D automated clustering is shown in graphic 800 shown in FIG. 8.

Figure 9:
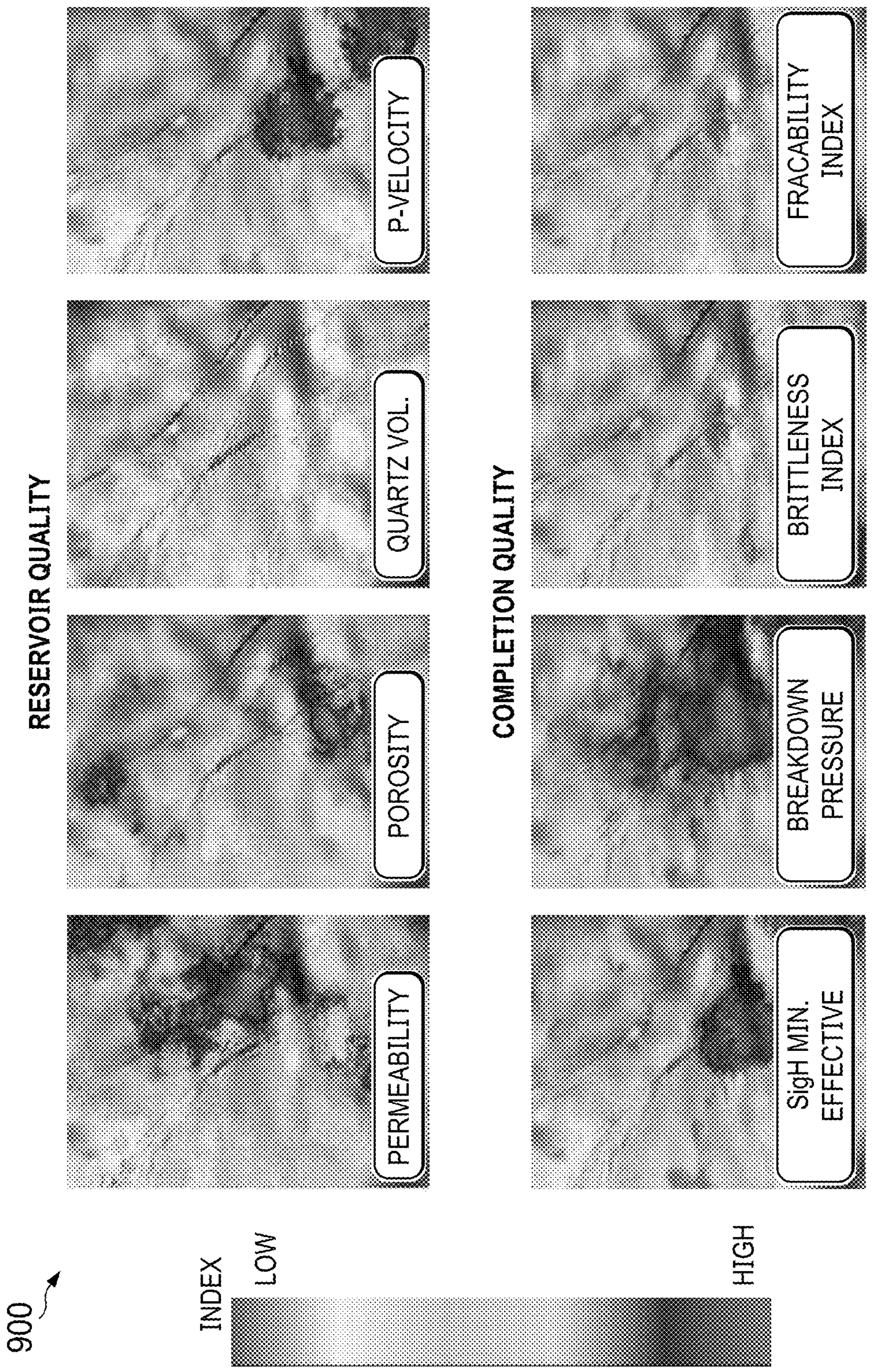
FIG. 9 illustrates a set of heat maps that show 3D reservoir and completion quality indices according to the present disclosure.

(4) Constructing 3D models for reservoir, drilling, and stimulation quality using effective geostatistical technology. An example of heat maps that illustrate reservoir and completion quality parameters are heat maps 900 shown in FIG. 9.

Figure 10:
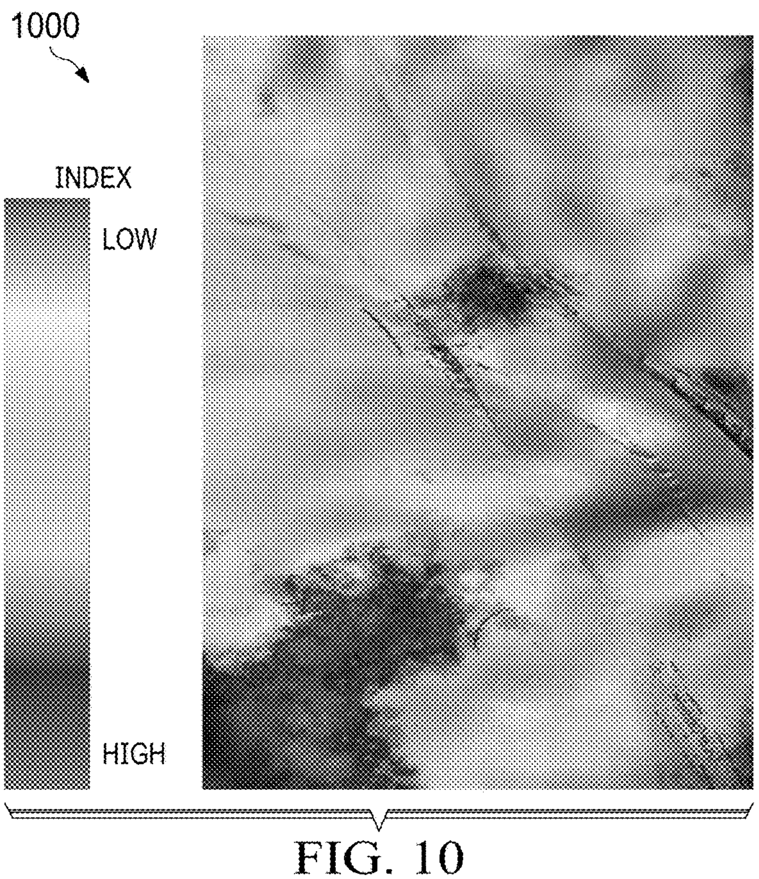
FIG. 10 illustrates a heat map that shows 3D automated clustering according to the present disclosure.

(5) Developing a technology to perform 3D clustering and providing the final confidence index of the geomechanical properties. An example of an index is shown in a heat map 1000 that shows 3D automated clustering FIG. 10.

Figure 11:
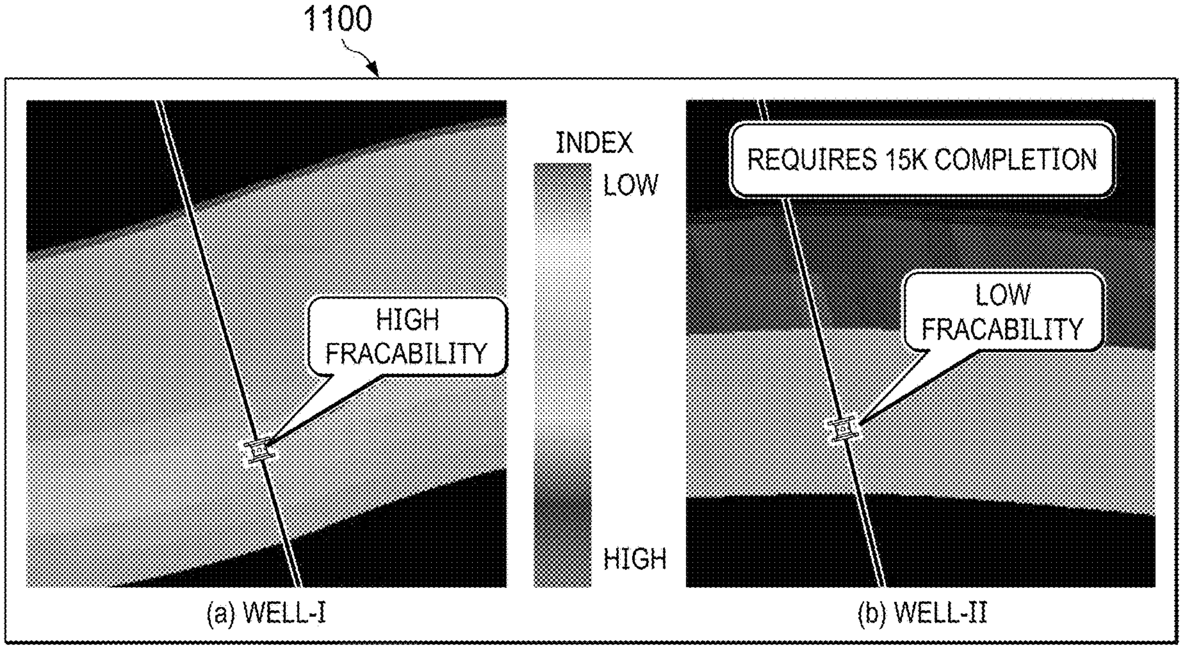
FIG. 11 illustrates heat maps that show a stimulation prediction according to the present disclosure.
Figure 12:
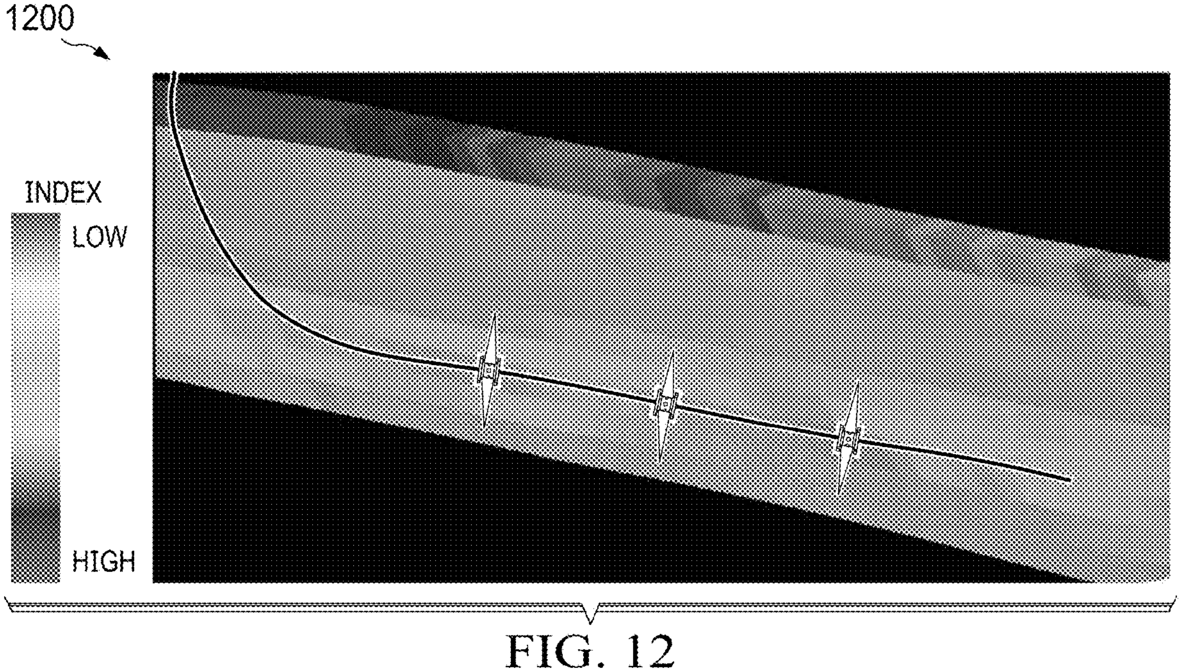
FIG. 12 illustrates a heat map that shows a well placement, drilling, and stimulation prediction according to the present disclosure.

(6) Successfully applied 1D and 3D workflow modeling to drilling and stimulation operations. For example, heat maps 1100 shown in FIG. 11 illustrate a stimulation prediction for two wells (Well-I and Well-II). A heat map 1200 shown in FIG. 12 illustrates Fs a well placement, drilling, and stimulation prediction.

The described planning-to-production workflows aim to accurately land a lateral in better reservoir quality rock with prior information on spatial variation of in-situ stresses in order to optimize completion and maximize hydrocarbon production by incorporating all available information including reservoir data, geomechanical parameters, and petrophysical and geological properties. The workflows change conventional planning processes to ensure safe drilling to target depth and enhance success rate of stimulation treatments in terms of fracture zone selections, proppant placement and production enhancement.

Field development from exploration to abandonment benefits from using the described planning-to-production workflows and modeling for making better long-term operational and management decisions. Such workflows may be optimized in areas of increasing challenges in operations when dealing with deep and tight reservoirs, depleted zones, drilling horizontal wells especially in the direction of the minimum stress when intended to place multistage hydraulic fractures. The stimulation challenges increase in the zones having high breakdown pressure. In some aspects, the described planning-to-production workflows address these operational challenges by constructing the following qualities:

(1) Reservoir Quality: this group includes parameters such as permeability, porosity, quartz volume, and P-velocity. This group helps identify areas with higher chances of productivity and will provide suggestions to optimize the well placement accordingly.

(2) Completion Quality: this group includes parameters such as formation breakdown, fracturability index, brittleness index, and minimum horizontal stress. This group may help to identify zones where fracturing operation will be successful. This group may also help select the best well profile to achieve breakdown and the suitable completion strength. This group may be considered and integrated into the method 200 to ensure drillability of locations nominated in which to place wells.

(3) Drilling Quality: This group may include well placement, wellbore quality, drilling mud rheology, drilling mechanics, and drilling practices.

The described planning-to-production workflows may drive the drilling and stimulation operations improvement resulting in the best performance and economic of the field development. The efficiency and the success of the described planning-to-production workflows have been proven through the implementation of the model results in three wells in a gas field. The model predicted lower fracturability for the Well-I as shown in (a) of FIG. 11 and the stimulation results accurately matched the model prediction. The model predicted high breakdown for the Well-II as shown in (b) in FIG. 11, which was true as the well hasn't fractured. Moreover, the model predicts higher completion design such that a 15K liner should be used. Well-III as shown in the heat map 1200 shown in FIG. 12 has been placed on a sweet spot, then drilled and successfully stimulated.

The model from the resulting planning-to-production workflows as described, can be integrated into step 202 to provide for integration of the 3D geomechanical properties. Thus, in some aspects, step 202 includes integration work executed to combine MFSD 2D maps and 3D geomechanical completion quality parameters to provide a 3D dynamic simulation history matched model in this step of method 200.

The history matched 3D simulation model of the field of interest (in other words, field Y) may include several characteristics:

(1) a single structure realization with respective porosity, permeability and saturation modeling;

(2) no geological layering upscaling between the geological and simulation model;

(3) water saturation modeled by a J Function and honored in the simulation model;

(4) a 100×100 meter model cell grid size for the entire study area;

(5) a 629×1276×238 GigaPOWERS™ model (for example, by Saudi Arabian Oil Company) with 3.5 MM active cells;

(6) three phases extended black oil (oil, water and wet gas);

(7) two PVT regions to account for the compositional differences in the fluids from north to south;

(8) different free water levels for the east and west flank of each field separated by a sealing fault;

(9) new field limits based on the intersection of the free water level and the structure; and

(10) history matching was attained by introducing permeability multipliers around the wells that have been hydraulic fractured in the field.

Figure 13:
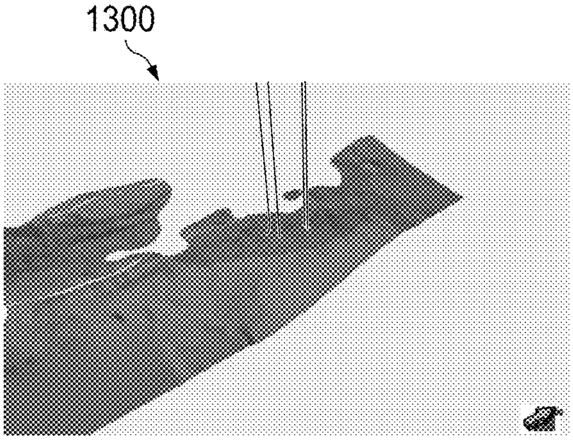
FIG. 13 illustrates a heat map that shows a particular field zone with two wells according to the present disclosure.
Figure 14:
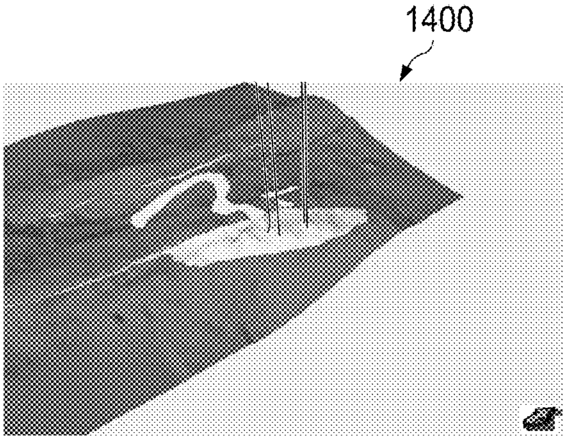
FIG. 14 illustrates a heat map that shows a particular field zone with one well according to the present disclosure.

Most of the wells in field Y were hydraulic fractured (in other words stimulated) to obtain commercial gas rates. This was mimicked in the simulation model by the introduction of permeability multipliers around the wellbore. Currently three wells were completed and are currently producing from zone 1 as shown in the heat map 1300 in FIG. 13 and two wells from zone 2 as shown in heat map 1400 in FIG. 14.

Figure 15:
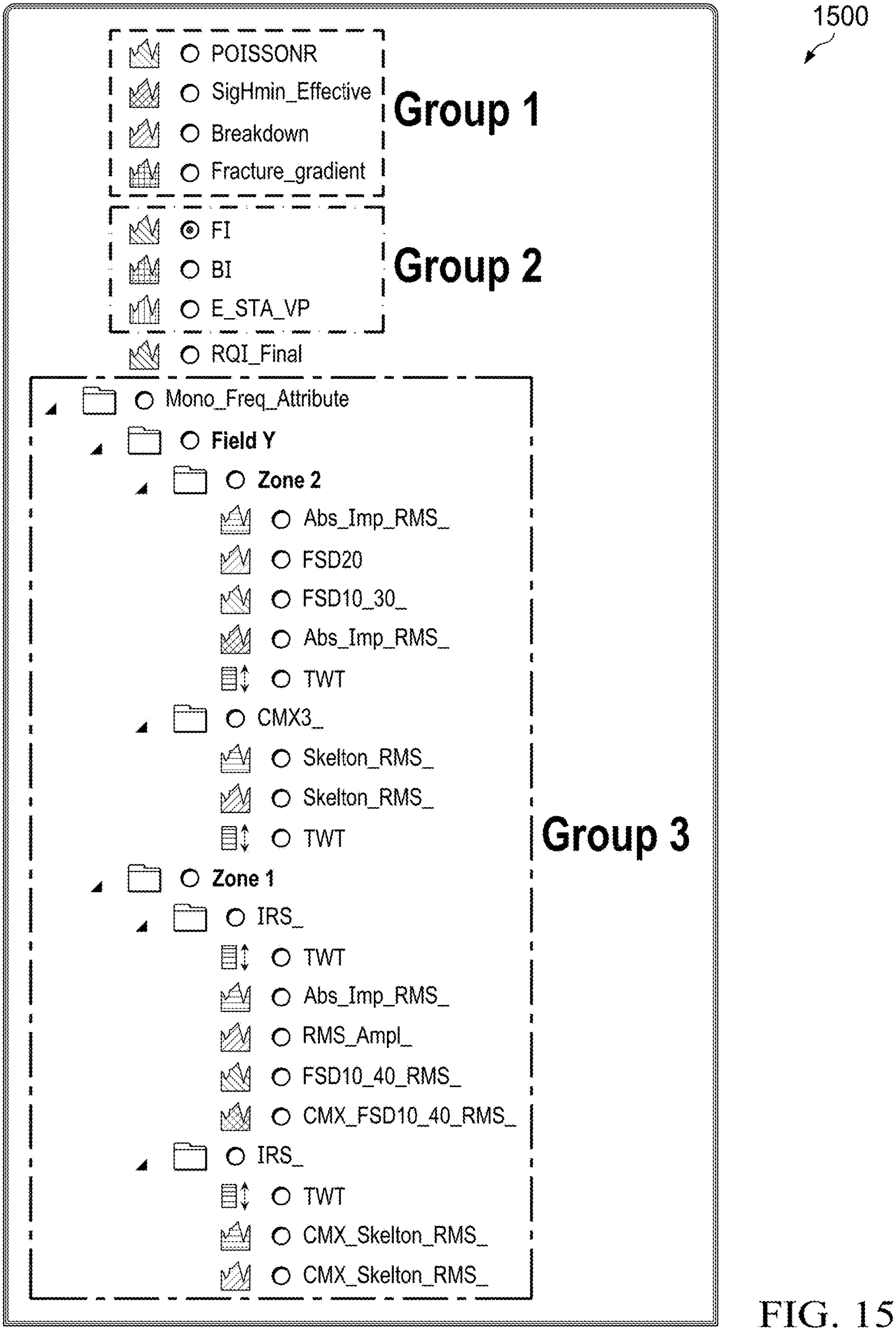
FIG. 15 illustrates a chart that shows groups of properties according to the present disclosure.
Figure 16:
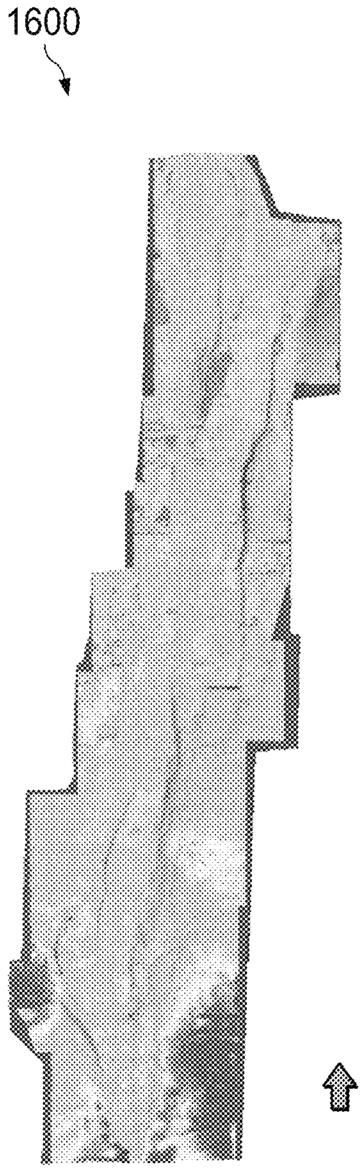
FIG. 16 illustrates a heat map that shows a mono frequency attribute in two dimensions according to the present disclosure.

After the completion of the dynamic model, new properties may be introduced in the 3D simulation model from step 202. As described, geomechanical parameters and the 2D mono frequency attributes from MFSD are introduced. For example, a chart 1500 in FIG. 15 shows groups of properties in three groups of data. Group 1 and 2 are some of the geomechanical properties that were imported from different geological models (with different horizontal and vertical resolutions). Group 3 include some of the mono frequency attributes that were imported from 2D MFSD maps.

Figure 17:
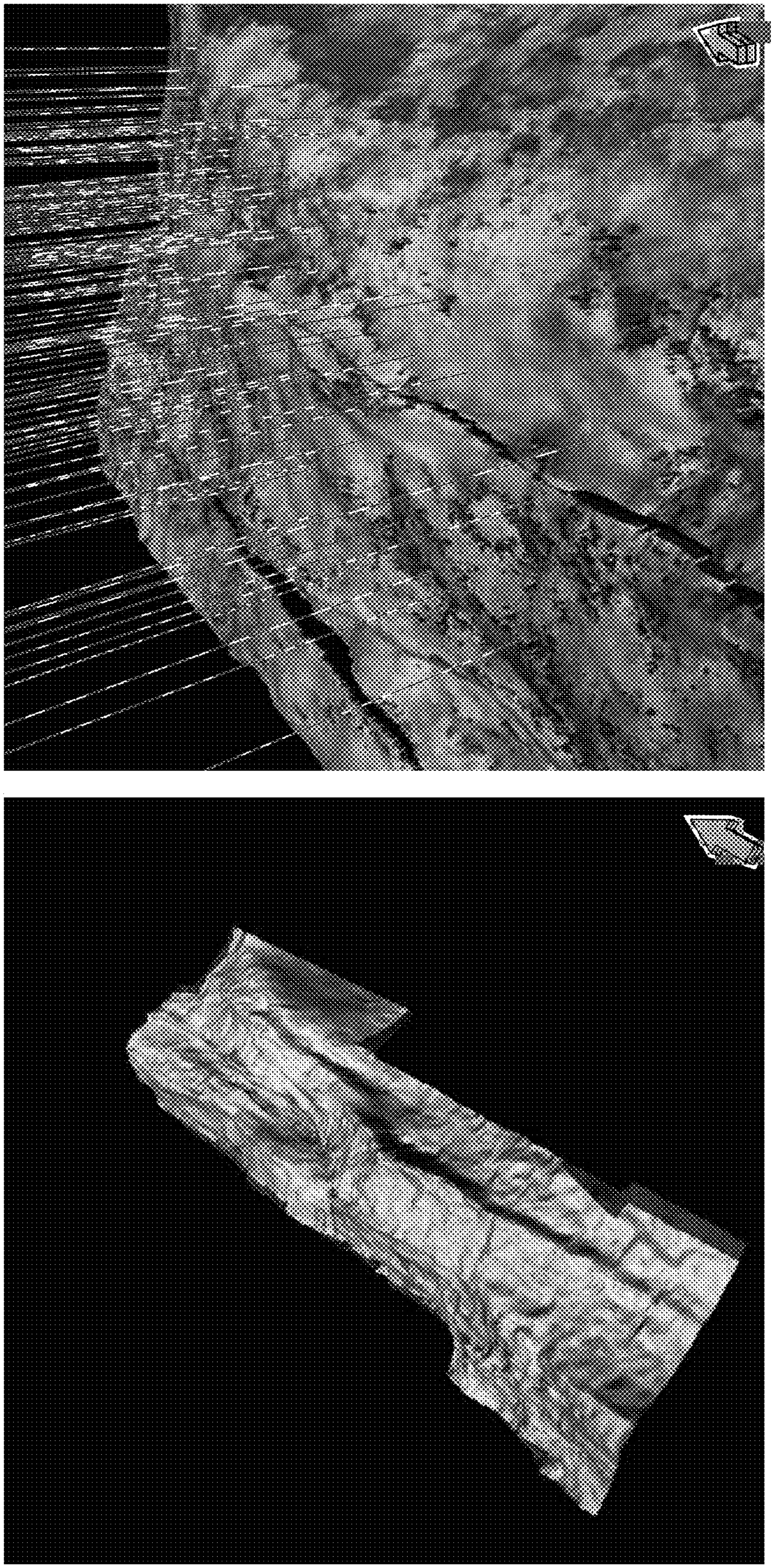
FIG. 17 illustrates heat maps that show mono frequency attributes according to the present disclosure.
Figure 19:
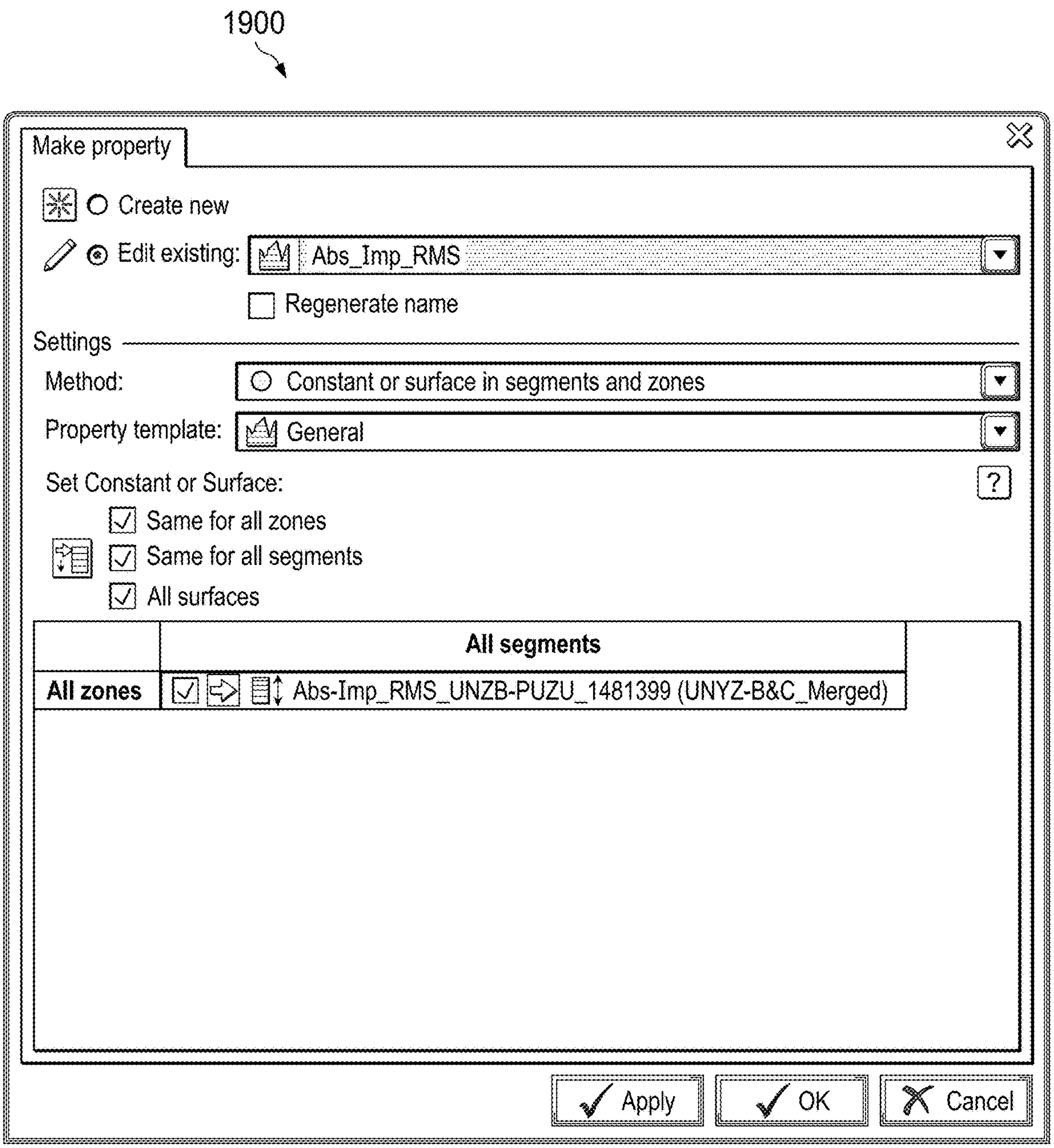
FIG. 19 illustrates a mono frequency upscale process according to the present disclosure.

The first set of properties imported into the dynamic model may be the mono frequency attributes. This was done by importing the maps into a pre-processing application and including the data into the simulation model. The values of each of the attributes (mono frequency) was mapped from the 2D domain. For example, FIG. 15 shows a map 1600 of mono frequency attributes in the 2D domain. Such attributes may be mapped to the 3D domain. FIG. 17 shows a set of maps 1700 of the mono frequency attributes mapped in the 3D domain. The difference in resolution (for example, the resolution of the mono frequency map is 25×25 meters while the 3D grid resolution is 100×100 meters) is addressed by a geometrical modeling process in the pre-processing application as shown in GUI 1900 shown in FIG. 19. This will take the average of all values falling within a grid cell of 100×100 meters.

Thus, in some aspects, all cells along a pillar in the 3D grid will take a single value: the 2D value of the respective cell in the 2D map for field Y zone 1 and 2. The values for different zones (zone 1 and zone 2) were mapped individually and later combined using the property calculator and appropriate property filters in order to combine them into a single 3D property.

Figure 18:
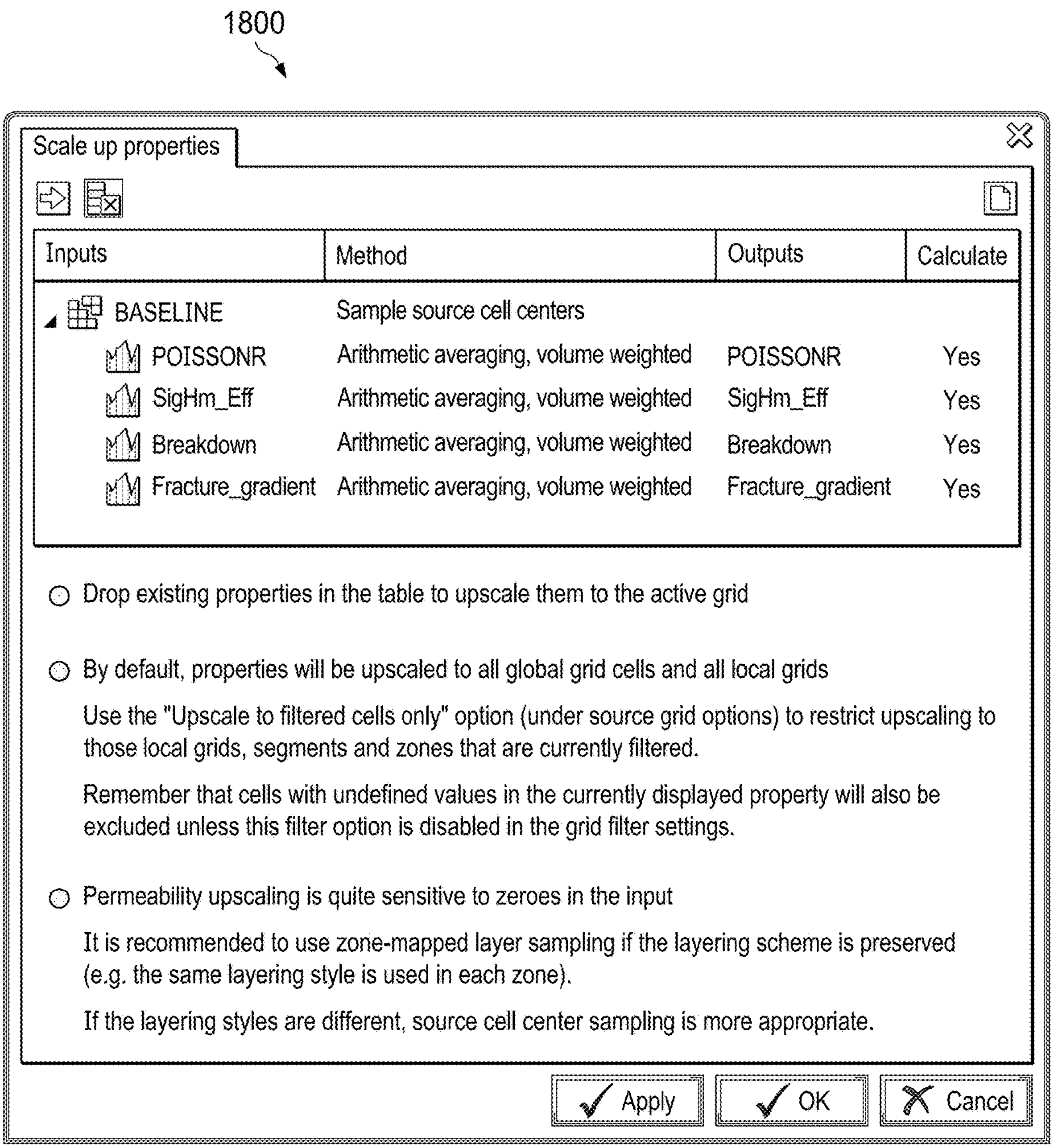
FIG. 18 illustrates a geomechanical upscaling process according to the present disclosure.

Geomechanical properties were mapped to the final dynamic grid in a similar process. For example, such properties are upscaled to the final grid using the upscaling process in the pre-processing application as shown in GUI 1800 in FIG. 18. This upscaling may map properties from the baseline grid to the target grid (the final one that will be used in dynamic modeling).

The properties may then be exported using a pre-processing application. For each property, for instance, a GigaPOWERS™ (for example, a reservoir simulator by Saudi Arabian Oil Company) array was created. The arrays were then imported into the history matched 3D dynamic model. In this example, a total of 30 attributes were exported with 14 geomechanical and 16 mono frequency related attributes to arrive at the history matched 3D simulation model of step 202.

In some aspects, therefore, step 202 includes importing several types of attributes (geomechanical and mono frequency) with different resolutions (both horizontal and vertical) into a single 3D geological model for use as a history matched 3D simulation model. This may be done by mapping these attributes into the final 3D grid by averaging the values by volume from the 3D representation of any model to the 3D representation to the destination grid. A simplified workflow 2000 is shown in FIG. 20. FIG. 21 shows a table 2100 that includes values of several of the integrated attributes (mono frequency 2110 and geomechanical 2105). Table 2100 also include a cut-off relation value for each property that may be used, for example, in step 206.

Method 200 may continue at step 204, which includes executing a gas winnowing process to the 3D simulation model. For example, once the history matched 3D simulation model is generated in step 202, this model may be modified according to, for example, user-defined cut-offs for one or more of the integrated mono frequency data. For example, step 204 may include excluding one or more cells of the array created for each property according to the cut-off values shown in FIG. 21 for the mono frequency attributes 2110. Thus, cells in the array for each of the properties 2110 may be excluded if the value in the particular cell does not meet the cut-off relation as shown in Table 2100.

Method 200 may continue at step 206, which includes applying one or more geomechanical restraints to the 3D simulation model. For example, once the history matched 3D simulation model is generated in step 202, this model may be modified according to, for example, user-defined cut-offs for one or more of the integrated geomechanical data. For example, step 206 may include excluding one or more cells of the array created for each property according to the cut-off values shown in FIG. 21 for the geomechanical attributes 2105. Thus, cells in the array for each of the properties 2105 may be excluded if the value in the particular cell does not meet the cut-off relation as shown in Table 2100.

Method 200 may continue at step 208, which includes activating one or more energy simulation parameters with the 3D simulation model. In some aspects, the generated 3D simulation model of step 202 may be used in step 208; alternatively, the generated simulation model of step 202 as modified by either or both of steps 204 or 206 may be used in step 208. In any event, step 208 may include one or both sub-steps of activating a pseudo-pressure function or activating a non-Darcy flow computation. For instance, such sub-steps may be taken into account, because gas reservoir development undergoes different depletion strategies than oil reservoirs. Accurate productivity index (PI) calculations and well-deliverability may be a critical issue in the development of many gas reservoirs.

In gas wells, high-pressure gradients may induce both large condensate saturation (when produced below dew point pressure) and high gas velocities (non-Darcy flow) in the near-wellbore regions. The non-Darcy flow energy component is considered not only for high gas flow rate wells but also for low rate ones with low porosity and permeability rock quality and, hence, it may be a significant contributor to PI computations. Furthermore, production data for some gas wells have shown that well productivity may be significantly reduced when wellbore bottom-hole-flowing-pressure (BHFP) drops below the saturation pressure of the in-place fluid. This may be true even for lean gas condensate reservoirs where maximum liquid drop out in the deep reservoir is as low as 1%. To this end, a pseudo pressure integral covering the entire range of pressure regions for gas wells may be used in resolving pressure dependence of rock and fluid flow properties.

A numerical simulation of reservoir and wellbore fluid flow processes is typically based on a modified set of partial differential (conservation) equations, coupled dynamically. In reservoir simulators, pressure drop computations are handled by solving the diffusivity equation which includes Darcy and non-Darcy flow components for gas reservoirs. Reservoir boundary conditions come in the form of well controls that are used to match historical data and/or define operational limits/constraints for reservoir forecasting. In general, discrete grid cell size used in reservoir simulation is much larger than that of the wellbore and would introduce singularities if the well was discretized similar to that of grid cell size. Well productivity index ($WI_l$) is introduced to couple wells to the reservoir, this relates wellbore pressure and flow to the grid cell parameters. The well inflow performance relationship for a compositional case for a given phase, p, through layer/completion, l, connected to grid block, i, is given by:

$$q_{c,l}=WI_l \times \lambda c,l \times (p_i-p_{w,l}) \quad (1)$$

where $\lambda_{c,l}$ is the upstream hydrocarbon component molar mobility, $p_i$ is grid cell pressure, $p_{w,l}$ is the wellbore pressure incorporating gravity and friction effects for the layer l. For producing completions the mobility term is the defined as:

$$\lambda_{c,l} = \left(\frac{k_{ro}\rho_o}{\mu_o}\right)_l x_c + \left(\frac{k_{rg}\rho_g}{\mu_g}\right)_l y_c \quad (2)$$

where $k_{rp}$ represents relative permeability, $\rho_p$ corresponds to molar density, and $\mu_p$ is viscosity with subscript p relating to hydrocarbon (oil/gas) phase. In Equation (2), $x_c$ and $y_c$ represent oil and gas component-mole-fraction respectively. The quantities defining the mobility term ($\lambda_{c,l}$) are a function of saturation and pressure. Instead of rewriting the appropriate parts of the well model, an effect of pseudo-pressure and non-Darcy flow can be equivalently modeled by simply modifying conventional well inflow component molar rate Equation (1), thereby introducing dimensionless flow blocking factors:

$$q_{c,l}=\alpha \times \beta \times WI_l \times \lambda_{c,l} \times (p_i-p_{w,l}) \quad (3)$$

where α is computed after resolving pseudo-pressure integral and in the presence of condensate banking is always less than unity. It resolves pressure dependence of density, viscosity, relative permeability, and well stream composition. In Equation (3), β corresponds to rate dependent non-Darcy factor, also named as turbulence or rate dependent skin factor. Detailed description and implementation of pseudo-pressure integral and a non-Darcy flow blockage factor—both of which may be user-specified—can be found elsewhere. In this example implementation, for accurate PI calculation pseudo-pressure and non-Darcy flow, calculations may be carried out in conjunction.

Figure 23:
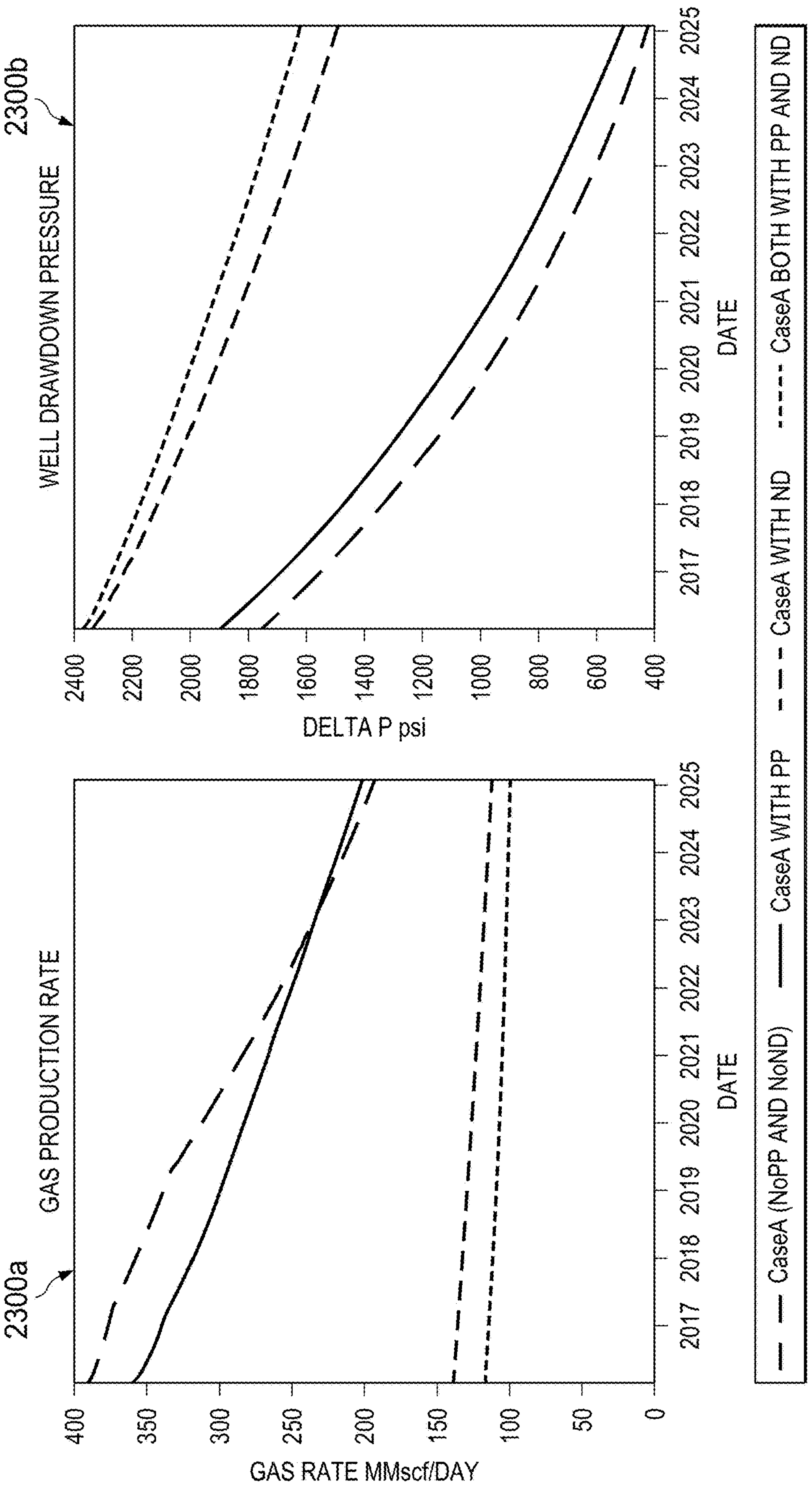
FIG. 23 illustrates charts that illustrate a test case with wells in bottom hole pressure (BHP) control, with and without pseudo-pressure and non-Darcy flow options according to the present disclosure.
Figure 24:
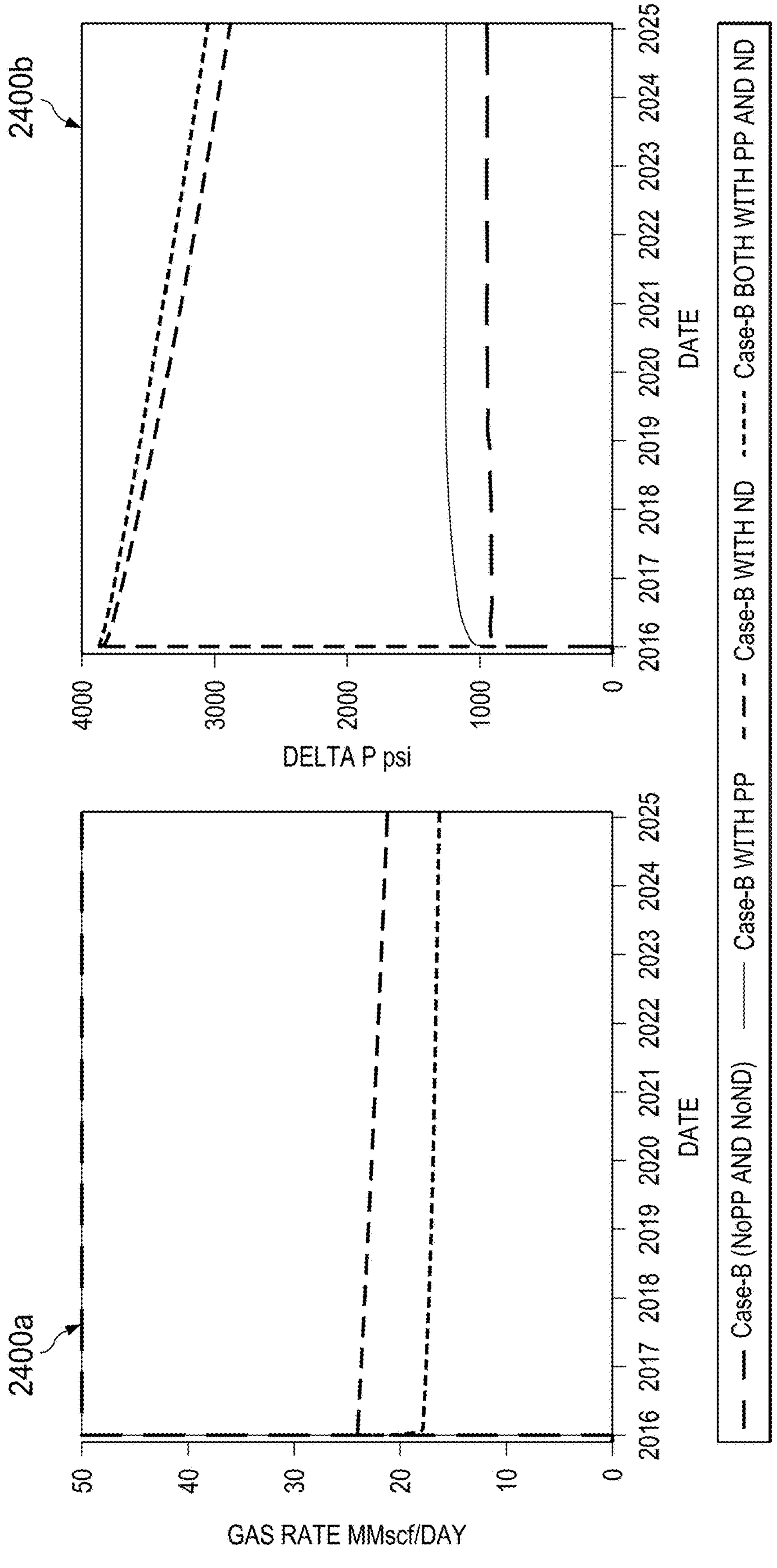
FIG. 24 illustrates charts that illustrate a test case with wells initially in rate control, tested both with and without pseudo-pressure and non-Darcy flow option according to the present disclosure.

In some aspects, first, the pseudo-pressure integral is resolved, which is followed by non-Darcy flow modelling, for example, as shown in the workflow 2200 shown in FIG. 22. In FIGS. 23 and 24, the performance of two different test cases with/without near wellbore modelling options are compared. For instance, as shown in FIG. 23, charts 2300*a* and 2300*b* illustrate gas production rate and well drawdown pressure, respectively, for a test case with wells in bottom hole pressure (BHP) control, with (Case B) and without (Case A) pseudo-pressure and non-Darcy flow options. FIG. 24 shows charts 2400*a* and 2400*b*, which illustrate gas production rate and well drawdown pressure, respectively, for a test case with wells initially in rate control, tested both with (Case B) and without (Case A) pseudo-pressure and non-Darcy flow options.

In the presence of pseudo-pressure and non-Darcy flow modeling options, as shown in this example, pressure drop is higher, and the test well, since constrained by a minimum BHP, is unable to make the target rate. As for FIG. 24, initially in the absence of near wellbore modeling options, the well is in rate control, in other words, constrained by a specified target rate. When tested with the pseudo-pressure option only, pressure drop occurs; however it is not reflected in production rate. This is because the test well is able to make the target without violating minimum BHP constraints. Nonetheless, when tested with the non-Darcy flow modelling option, pressure drop is significant and the same test well is now constrained by specified minimum BHP and unable to make the target rate. In either of the cases, when pseudo-pressure and non-Darcy options are used in conjunction, pressure drop is higher than that of a single option.

In general, a pressure drop incurred due to non-Darcy flow is much larger than that of a pressure drop due to the pseudo-pressure option alone. In some aspects, the pressure drop and production profile is dynamic and cannot be modeled as a constant skin factor. In such cases, the most limiting constraint is the rate constraint; an impact of blockage due to pseudo-pressure and/or non-Darcy flow is not directly reflected in the production rate. However, the production rate may be reflected in drawdown pressure. In the example of step 208, both non-Darcy flow and pseudo-pressure integral is used for accurate PI calculations for gas reservoirs. As such, the generated 3D simulation model output from step 208 in this example implementation includes both non-Darcy flow and pseudo-pressure integral Method 200 may continue at step 210, which includes applying a total dynamic productivity index (TDPI) process to the 3D simulation model to generate at least one 3D index that includes one or more hydrocarbon production sites. For example, the TDPI process may include a computational approach that computes unique index values for every simulation grid cell in a reservoir model based on a Productivity Index (PI) versus time relationship.

In some aspects, the TDPI process includes static and dynamic reservoir properties over time, which ensures capitalizing on the energy spots responsible for better production wells performance and recovery. The optimal reservoir productivity workflow identifies the high potential regions that can be used for drilling wells in hydrocarbon reservoirs by assessing well productivity. A numerical simulation may be utilized to generate the sweet spots and extrapolate performance domains reflecting reservoir energy and dynamicity. The PI at each grid cell in the simulation model may be calculated at each time step within a period of prediction. The PI is a measure of well potential or ability to produce a number of barrels per day for every psi of pressure. Therefore, all grid cells have to be penetrated by assessment wells in order for the simulator to compute the productivity at each grid cell. At the initial stage, the workflow shuts-in all existing wells in the simulation model and places one assessment well that penetrates all the layers of the reservoir model.

Multiple prediction scenarios may be simulated in the TDPI process in which each scenario has one assessment well in a different location. Therefore, the number of simulation scenarios required may be equal to the number of grid cells in one layer in the simulation model. This may be done in order to assess the productivity index in each grid column. Combining the results from all the scenarios provides a complete picture of the productivity of each area in the reservoir.

This process would require thousands or more of simulation cases in which each case is used for assessing one column of grid cells only. This would consume a huge amount of time and resources, especially for huge simulation models with multimillion grid cells in size. For this reason, the TDPI process of step 210 may introduce well spacing as an important element that accommodates well interference in the process. Instead of placing one assessment well in each simulation case, multiple assessment wells are placed taking into consideration reservoir connectivity and permeability, which determines suitable spacing between the assessment wells.

Figure 25:
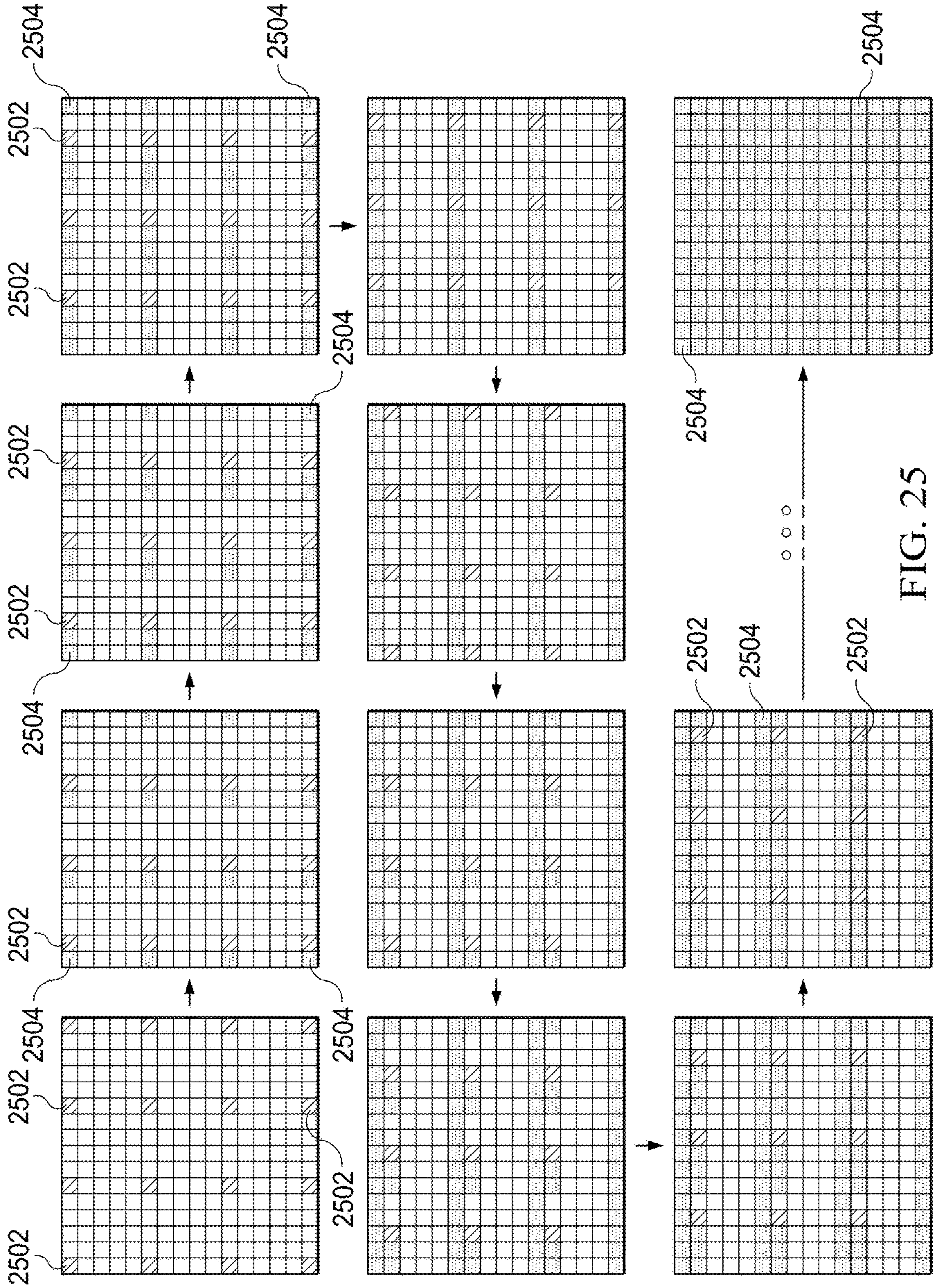
FIG. 25 illustrates a sequential diagram that shows multiple simulation cases with different assessment well locations according to the present disclosure.

For example, FIG. 25 shows a sequential diagram 2500 that shows multiple simulation cases with different assessment well locations. The diagram 2500, in some aspects, represents a changing layout for the location of the assessment wells placed to cover the entire X and Y grids in the i and j directions, respectively. Each layout represents a certain simulation scenario for the location of the assessment wells, which produces a PI for each layer in the reservoir. The lighter shaded squares (for example, 2502) represent well locations; as the diagram 2500 progresses sequentially according to the arrows, the lighter shaded squares turn to darker shaded squares (2504) in subsequent iterations, as the darker shaded squares represent already assessed wells. The last (bottom right) grid shows that all cells have been assessed, from which TDPI values are computed.

For high permeability reservoirs, spacing between assessment wells may be increased to avoid interference that could lead to misleading results and may not reflect the actual productivity potential. Placing multiple assessment wells may improve the performance of running the workflow of step 210 (in other words, the TDPI process) where it reduces the number of simulation cases by more than two orders of magnitude. The number of simulation cases required to run the workflow depends on the chosen well spacing, and it can be calculated using the formula $N=(x+1)^2$, where N is a number of simulation cases with different layouts of well locations and xis the spacing between assessment wells in terms of the number of grid cells.

In some aspects, another feature that improves an overall performance of the workflow of step 210 may be filtering capability. Wells are placed in high-potential zones only. Depending on the nature of the reservoir and the objective of the study, cutoffs can be applied on oil saturation, permeability, or any reservoir static or dynamic property. Assessment wells are placed to penetrate only potential zones after filtering out unnecessary grid cells. As a result, this step reduces the size of the investigated solution space, and hence speeds up well calculations in the simulation runs.

Figure 26:
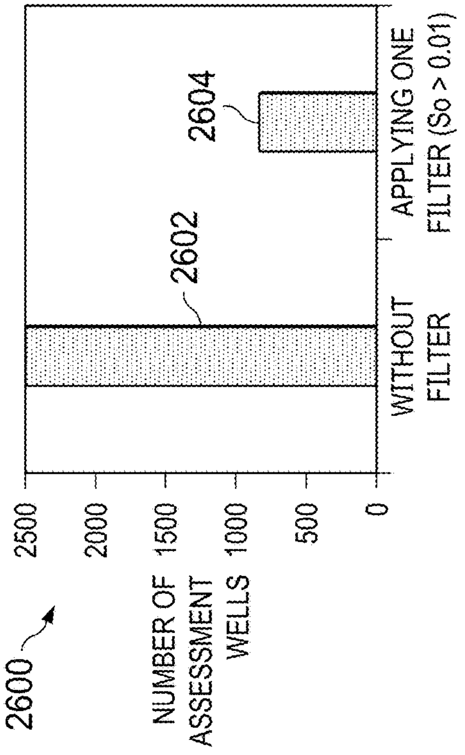
FIG. 26 illustrates a chart that shows a number of assessment wells placed in two different cases according to the present disclosure.

FIG. 26 shows a histogram 2600 compares two different TDPI processes; one (2602) without applying filters and another (2604) applying a filter on oil saturation (So>0.01). The number of assessment wells was reduced from 2,500 to 845. The assessment wells may be a plurality of single lateral pseudo wells placed vertically to calculate the productivity index at each grid cell. These wells exhibit certain spacing and production constraints that can result in unleashed reservoir productivity potential from every spot. The production rate can be controlled and usually set to relatively high values in order for the assessment wells to produce with their full potential and the TDPI process to calculate the potential productivity. Similarly, bottom hole pressure may be set to a minimum (for example, above bubble point pressure) in order to assess well potential.

Figure 27B:
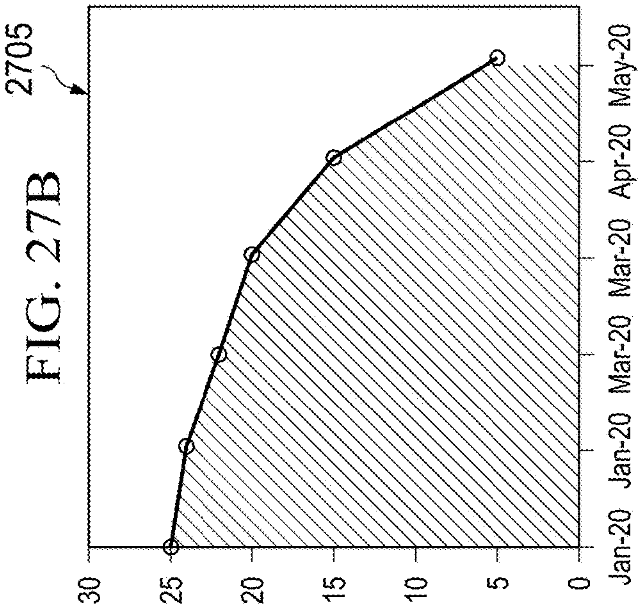
FIG. 27B illustrates a chart that shows an integration of total productivity index over time (TDPI) of one grid cell according to the present disclosure.
Figure 27A:
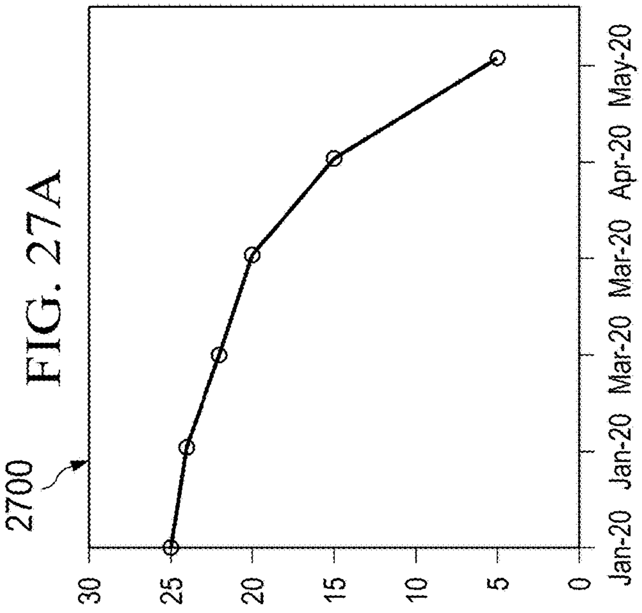
FIG. 27A illustrates a chart that shows a productivity index of one grid cell at different simulation time-steps according to the present disclosure.

The example TDPI process of step 210 may analyze oil productivity index results from a simulation output and create a new sweet spot identifier: Total Dynamic Productivity Index (TDPI). TDPI is the integration of productivity index values with respect to time, and this value describes how productive each grid cell is if the reservoir pressure changes per psi. For example, FIG. 27A shows a chart that 2700 shows a productivity index of one grid cell at different simulation time-steps. FIG. 27B shows a chart 2705 that shows an integration of productivity index over time (TDPI) of one grid cell, in other words, how the TDPI is calculated for a grid cell.

In some aspects, the TDPI process of step 210, therefore, generates a 3D reservoir property of normalized TDPI values ranging between 0 and 1. The normalization may be performed to simplify understanding of the result and to streamline post-processing and analysis. The TDPI process of step 210 may be integrated within a simulation environment, which automates creating the multiple simulation cases with different well locations, running simulations, analyzing results, and generating a TDPI 3D array. In some aspects, the TDPI process of step 210 may capitalize on efficient hyper performance computing (HPC) clusters to run the multiple simulation jobs of multi-million grid cell size models.

In some implementations, the TDPI process of step 210 (as described) may conserve and save significant computational resources during execution. For example, as described, the total dynamic productivity analysis involves creating a number of assessment cases and predicting their performance using a numerical simulator, which may perform computations in High Performance Computing (HPC) hardware. Each assessment case computes the TDPI at different locations in the hydrocarbon reservoir. Depending on the characteristics of the reservoir and field strategy, the number of assessment cases required to compute the TDPI varies reaching hundreds in some cases. A conventional workflow executes a numerical simulation of these assessment cases sequentially and then it extracts the required information from each case in order to generate the 3D TDPI map of the whole reservoir. All assessment cases are executed as one job. Due to the enormous simulation models and the massive amount of spatial data, solving the conventional workflow numerical simulation of one assessment case takes a considerable amount of time especially for cases with long assessment periods. Consequently, the cumulative assessment time of the conventional sequential workflow becomes large and not practical to serve urgent business planning demands. In addition, the conventional workflow reserves the required hardware resources for executing one assessment case and holds them until the completion of the whole workflow. This conventional workflow violates the scheduling process in place. The main purpose of the scheduling process is to manage the execution of multiple simulation jobs and make efficient use of the HPC clusters. Reserving a set of Central Processing Unit (CPU) cores until the completion of the whole workflow introduces potential blockage and delays of other high-priority simulation jobs.

Figure 29:
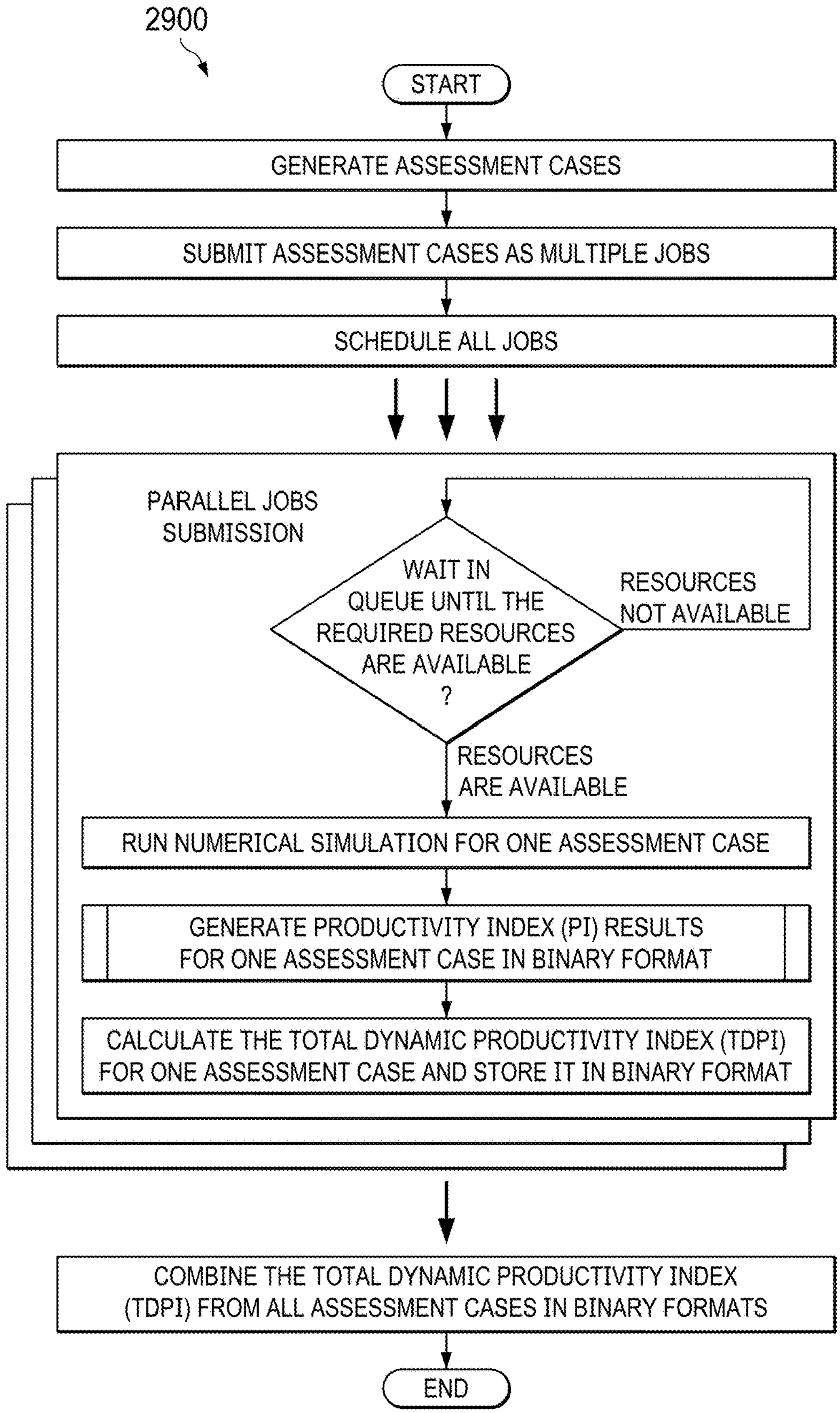
FIG. 29 illustrates a computational workflow according to the present disclosure.

In contrast, the TDPI process of step 210 may be architected in a way to speed up the total run and make efficient use of the hardware resources honoring the scheduling and priority polices. As depicted in FIG. 29, the TDPI process 2900 is shown as a workflow that creates one simulation job for each assessment case resulting in scheduling the cases as multiple jobs. This allows a simulation to run for multiple assessment cases in parallel which significantly reduces the total run time of the whole workflow. Assuming that resources for running all the assessment cases are free and available, all cases will be executed in parallel and the results may be available in a very short time. The total run time of the workflow (T) can be quantified as follows:

$$T=n\times t \text{ if } (s\times n\leq C) \quad (4)$$

$$T>n\times t \text{ if } (s\times n>C) \quad (5)$$

where n is the number of assessment cases, s is the number of CPUs required and assigned for one case, t is the run time of one assessment case given s, and C is the total number of free and available CPUs.

Equation (4) quantifies the total run time of the workflow 2900 under the optimistic condition when the total number of required resources is free and available. In addition to a faster time to obtain the results, this approach may provide better utilization of the free and available CPUs. Equation (5) indicates that partial execution of the workflow is performed based on the available resources, where the scheduler will be responsible for starting the simulation of the other assessment cases depending on the jobs priority and policies.

FIG. 29 also shows another level of parallelization in the workflow 2900. The calculation process of the TDPI may be distributed on different jobs and their results are then combined. TDPI of each assessment case may be performed independently after its simulation is complete. This approach significantly reduces the TDPI calculation time in the workflow 2900. The calculation of TDPI may be performed using the change of productivity index (PI) over time. Unlike the conventional workflow where PI results are generated by the simulator for each assessment case and stored in flat files, the workflow 2900 calculates the PI from the simulation results and then calculates the TDPI matrix immediately. The TDPI result may then be stored in binary files for efficient storage and fast access.

Figure 30:
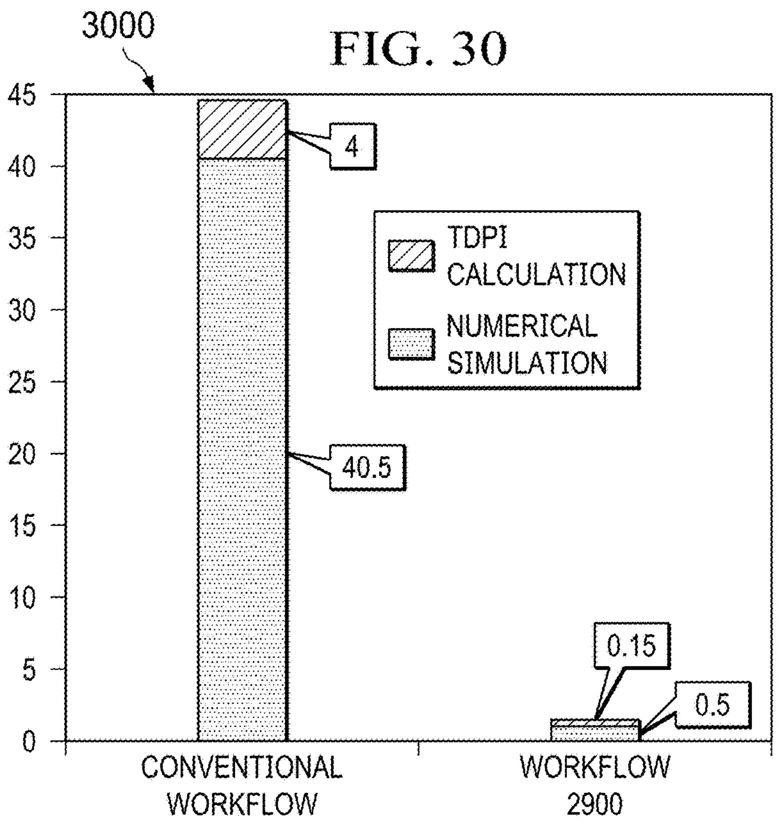
FIG. 30 illustrates a graph and table of a runtime comparison between the computational workflow of FIG. 29 and conventional workflows under a particular condition ($s \times n \leq C$) according to the present disclosure.
Figure 31:
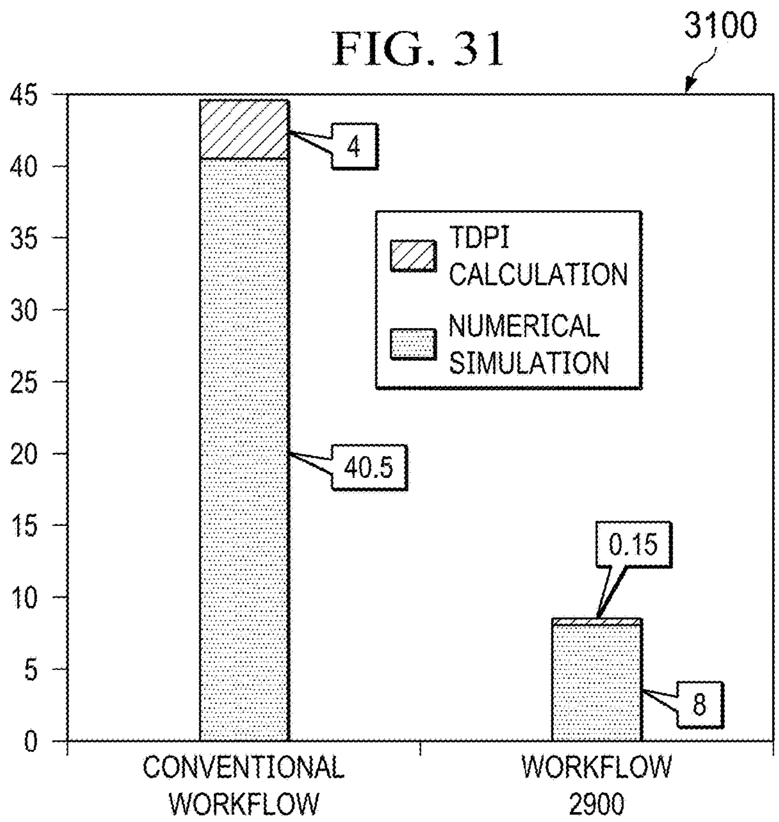
FIG. 31 illustrates a graph and table of a runtime comparison between the computational workflow of FIG. 29 and conventional workflows under another particular condition ($s \times n > C$) according to the present disclosure.

The gain in performance obtained from the workflow 2900 over conventional workflows to calculate TDPI is illustrated in FIGS. 30 and 31. A simulation model of a hydrocarbon reservoir was used to compare the new and conventional workflows. A TDPI scenario was created, which resulted in creating 81 assessment cases. Each assessment case requires 1,000 CPUs to run the simulation in this example. Using this amount of CPUs, simulation for one assessment case can be completed in 0.5 hour. This scenario was submitted using the workflow 2900 and a conventional workflow under two different conditions. In a first condition, the simulation cluster had plenty of free and available CPUs more than 81,000. The runtime of the two workflows under the first condition is illustrated in FIG. 30, which shows a graph 3000 and table 3005 that describe the results of the conventional workflow and the workflow 2900. The parameters for running the workflow under this condition are listed in the table 3005. Under this optimistic condition, the runtime dropped from 44.5 hours to 0.65 hour when using the workflow 2900.

In the second condition, the simulation cluster was busy and had less free and available CPUs; less than 81,000. The runtime of the two workflows under the second condition is illustrated in FIG. 31, which includes a graph 3100 and table 3105. The parameters for running the workflow under this condition are listed in the table 3105. Under this condition, the runtime dropped from 44.5 to 8.15. The reduction in this condition was less than the first condition due to unavailability of enough free CPUs to run the simulation of all the assessment cases in the same time. Therefore, some of the cases were submitted for simulation while other cases remained in the queue temporally waiting for the scheduler to avail resources for them.

Figure 32:
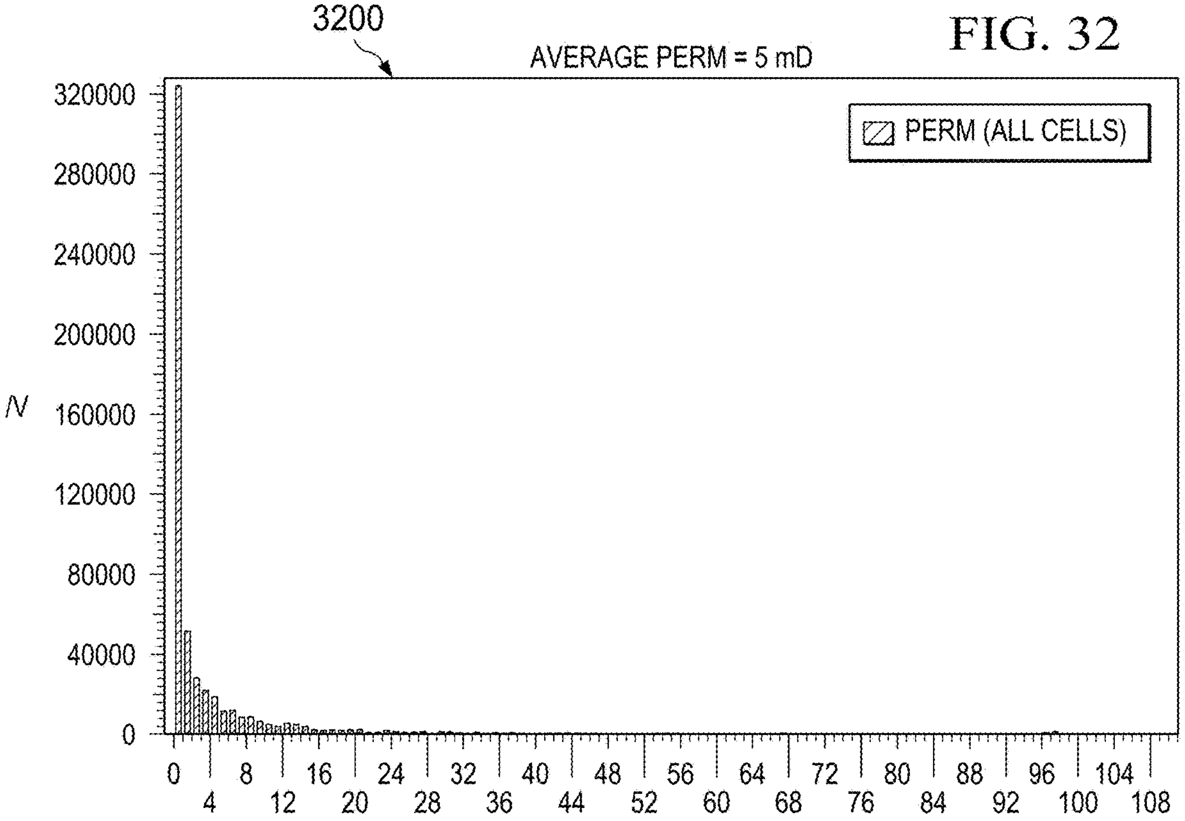
FIG. 32 illustrates a histogram for an example field permeability according to the present disclosure.
Figure 33:
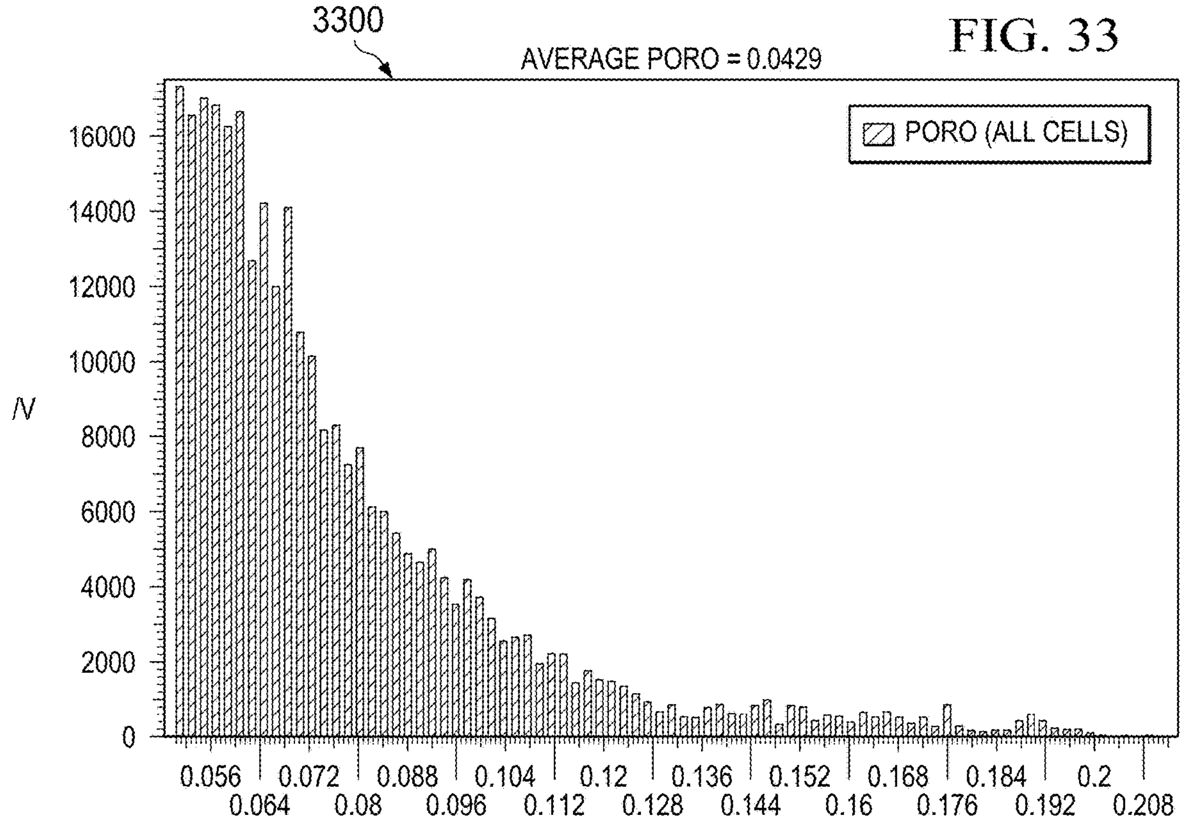
FIG. 33 illustrates a histogram for an example field porosity according to the present disclosure.

Using the workflow 2900, therefore, step 210 was used in an experimental simulation for the hypothetical field, Y. The following results are based on a synthetic reservoir model which exemplifies the TDPI process of step 210 applied on an actual study. The reservoir model details presented in table 2800 of FIG. 28 has a low permeability and porosity as also can be seen, respectively, in FIGS. 32 and 33. FIG. 32 shows a graph 3200 that shows an example field permeability for field Y, while FIG. 33 shows a graph 3300 that shows an example field porosity for field Y. In these graphs, 800 m corresponds to 8 grid cells, the later value was used as an input to the method 200.

An example interface 3400 for the TDPI process of step 210 is shown in FIG. 34. As shown in this figure, the interface 3400 has several sections in which a user may specify settings for the TDPI process. For example, the interface 3400 contains six sections. A first section 3402 includes a specification of assessment wells to be placed by the process and the flow rate that unleashes the reservoir potential with the minima bottom hole pressure settings. A second section 3404 includes a time of the assessments, whether with ongoing settings of the simulation run or with a future dates related to a specific business plan interval to be evaluated. A third section 3406 includes a duration of the assessment, which identifies a time of the TDPI process to be performed. A fourth section 3408 includes the aforementioned specification of geomechanical and mono frequency related parameter thresholds (for example, as described with reference to FIG. 21). A fifth section 3410 includes the layers needed to be considered in the assessment, which may help reduce the number of runs. A sixth section 3412 involves the simulator specifications and assignment of a number of parallel clusters to execute the generated number of assessment runs.

Figure 35A:
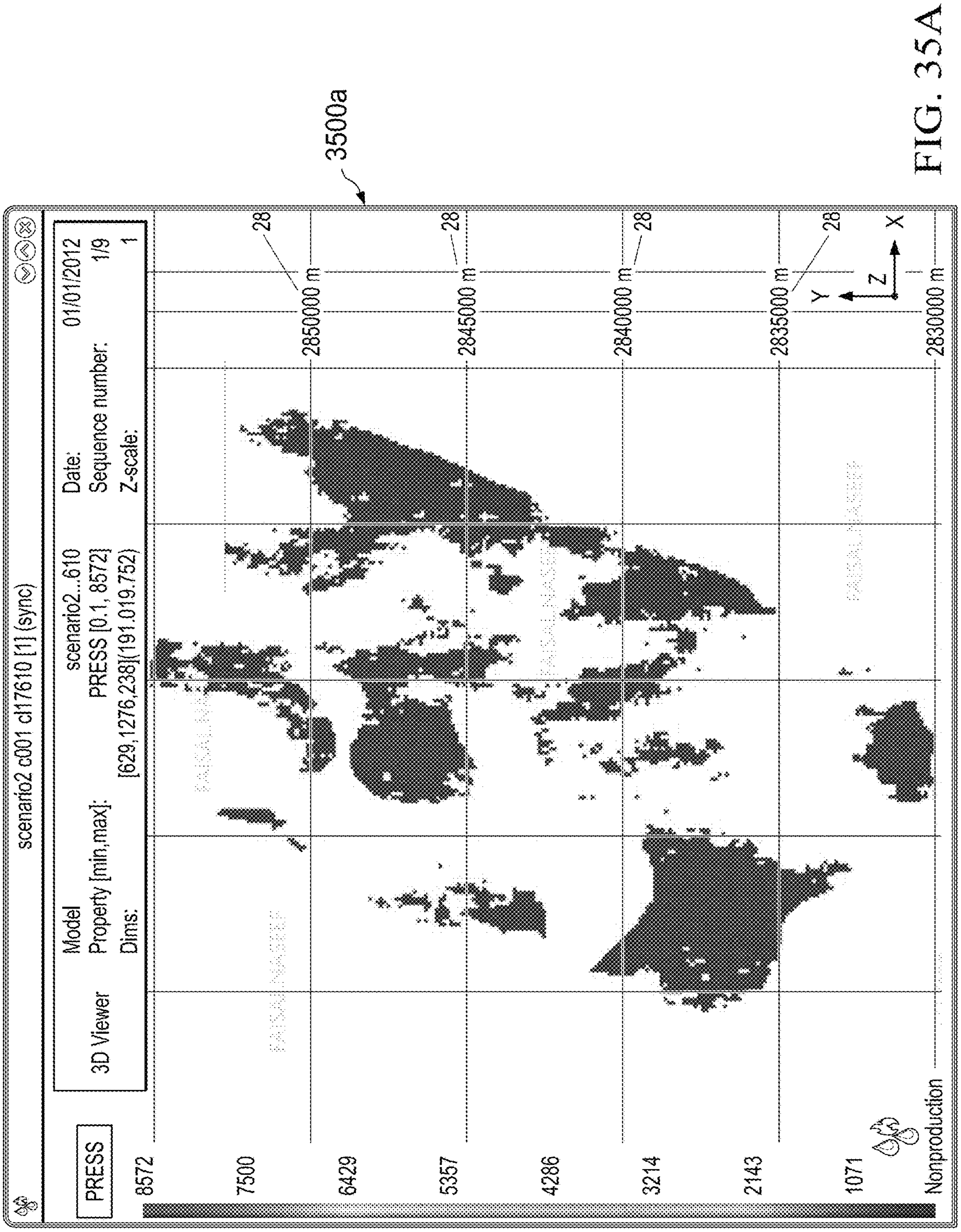
FIGS. 35A-35C illustrate two dimensional (2D) heat maps for some of the geomechanical parameters resulting after specifying their limits according to the present disclosure.
Figure 35B:
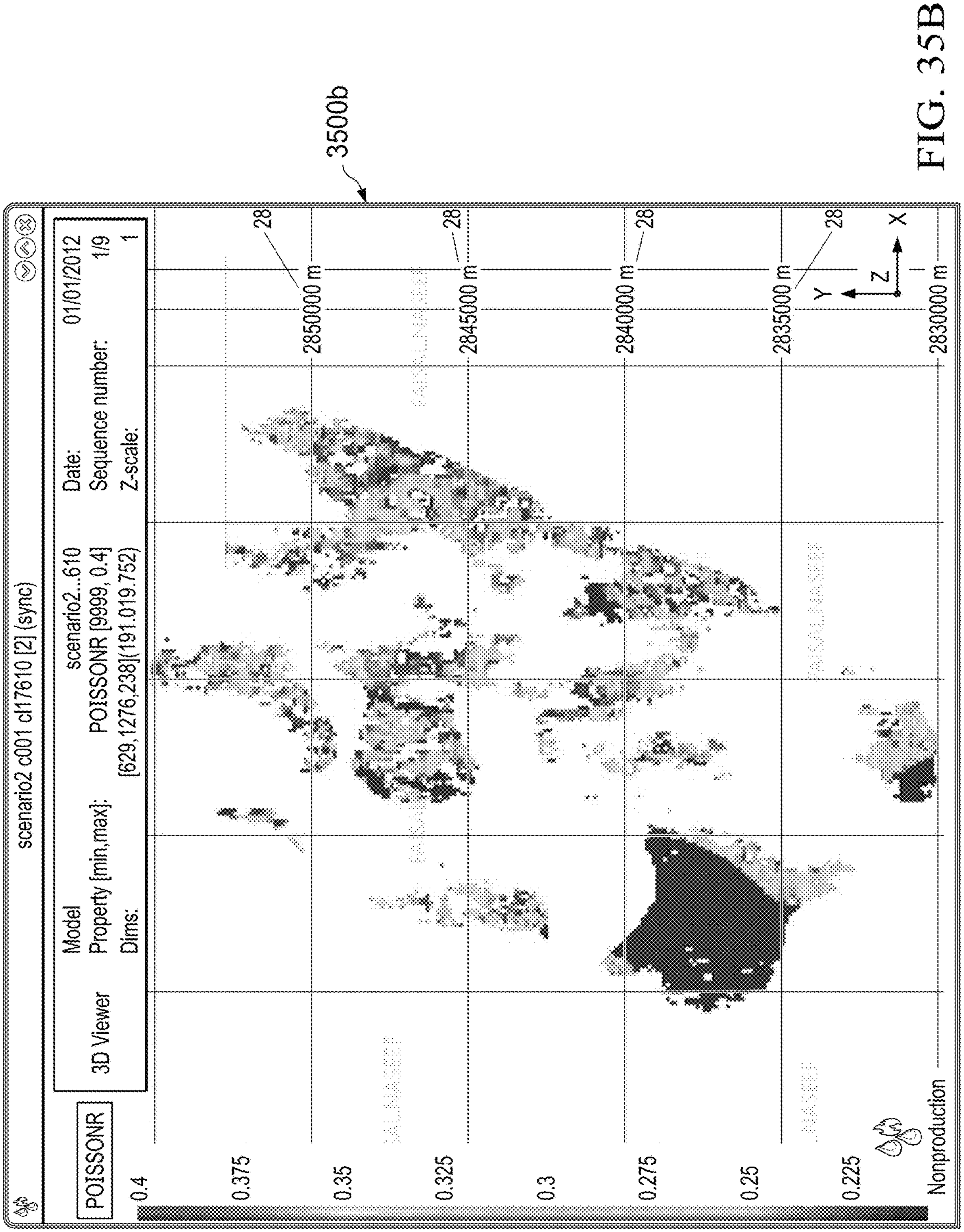
Figure 35C:
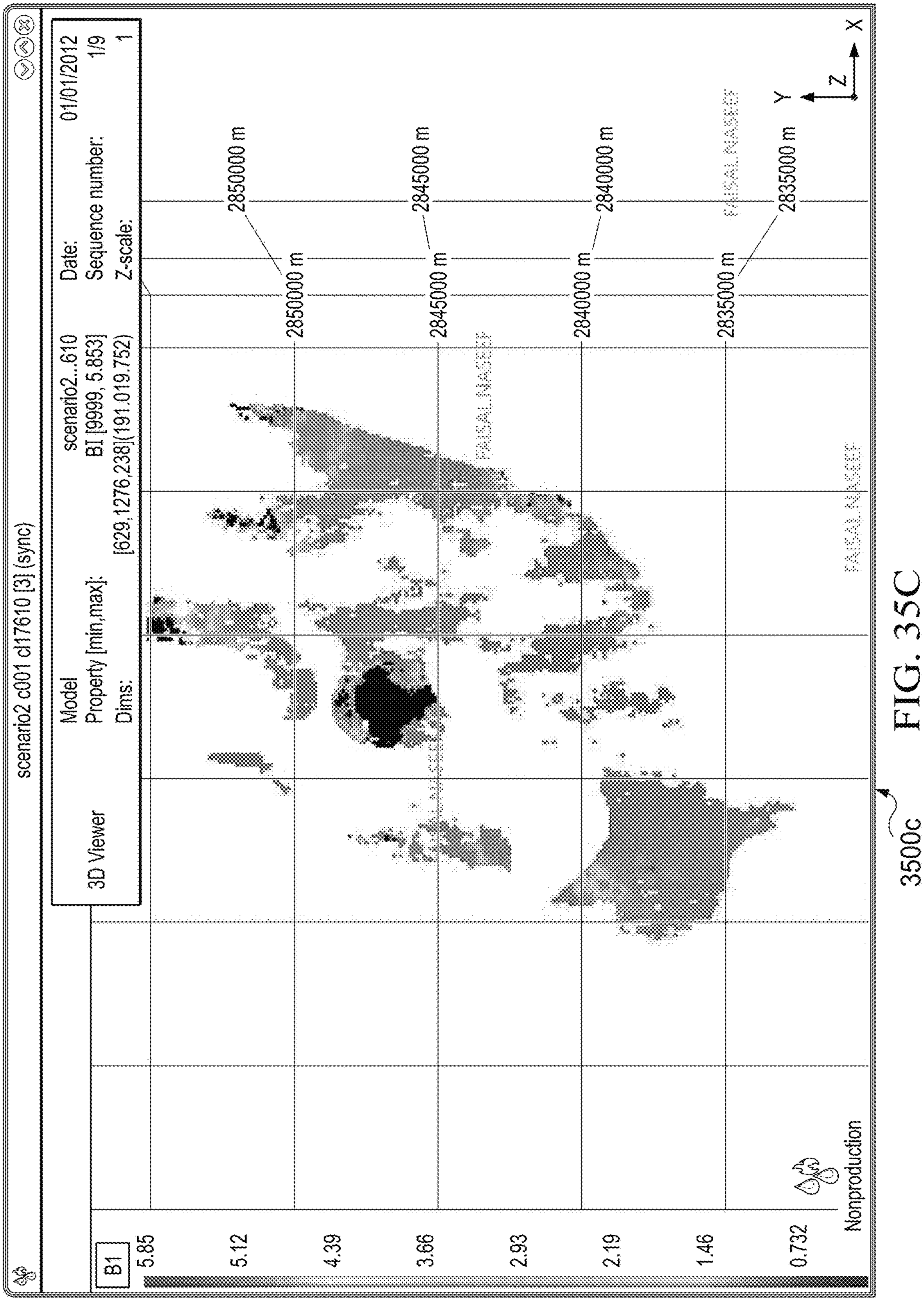
Figure 36A:
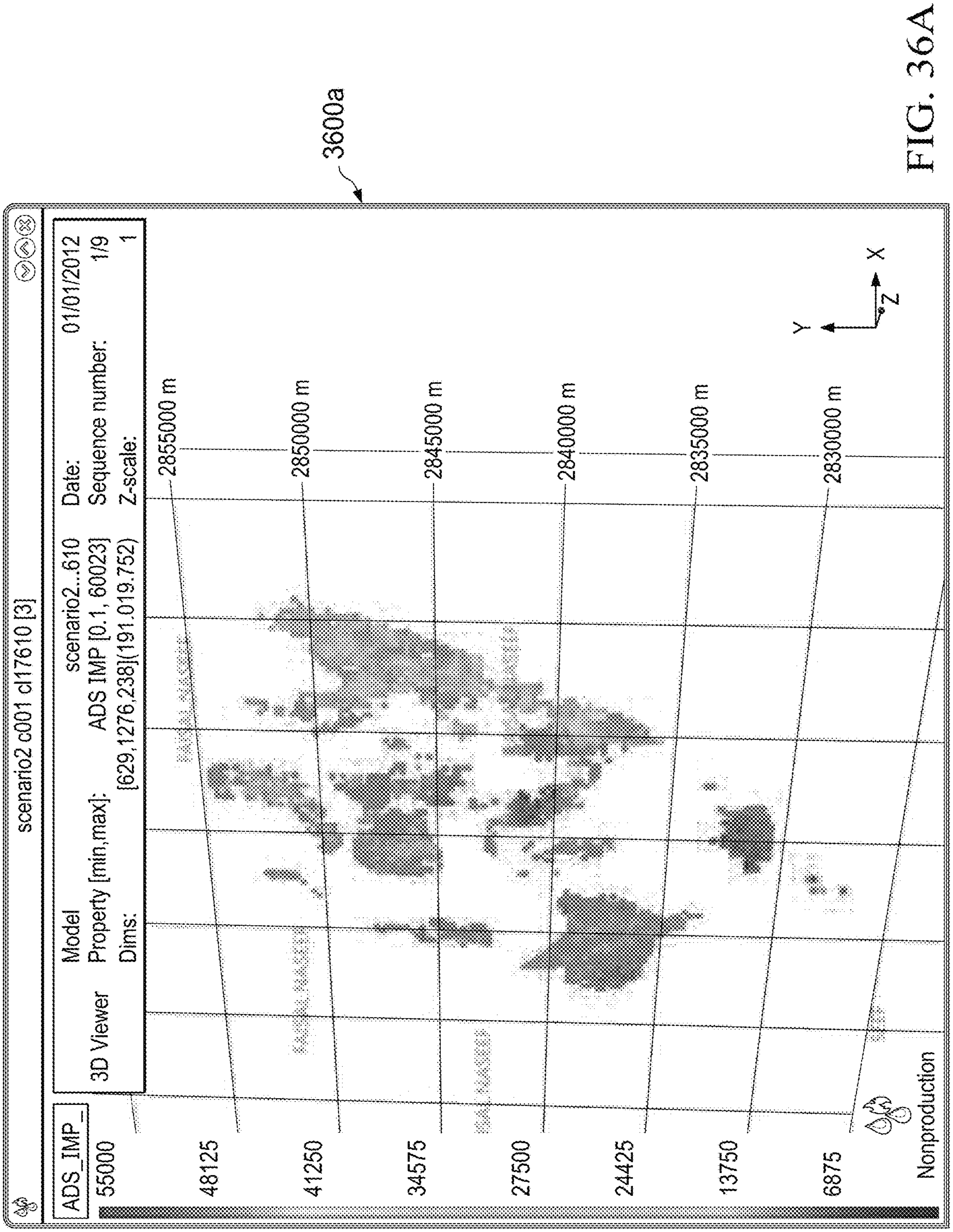
FIGS. 36A-36C illustrate 2D heat maps of some of the mono frequency parameters resulting after specifying their limits according to the present disclosure.
Figure 36B:
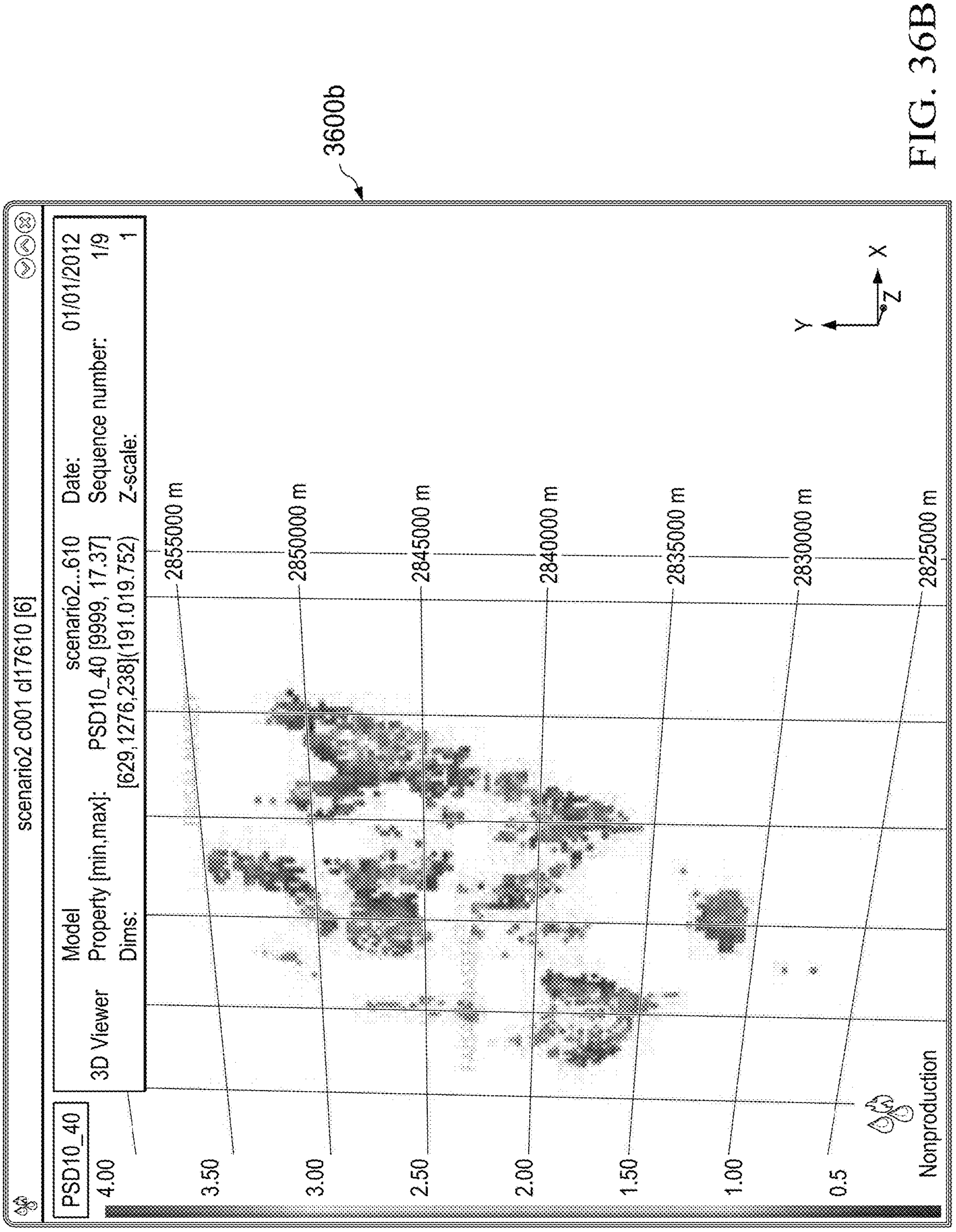
Figure 36C:
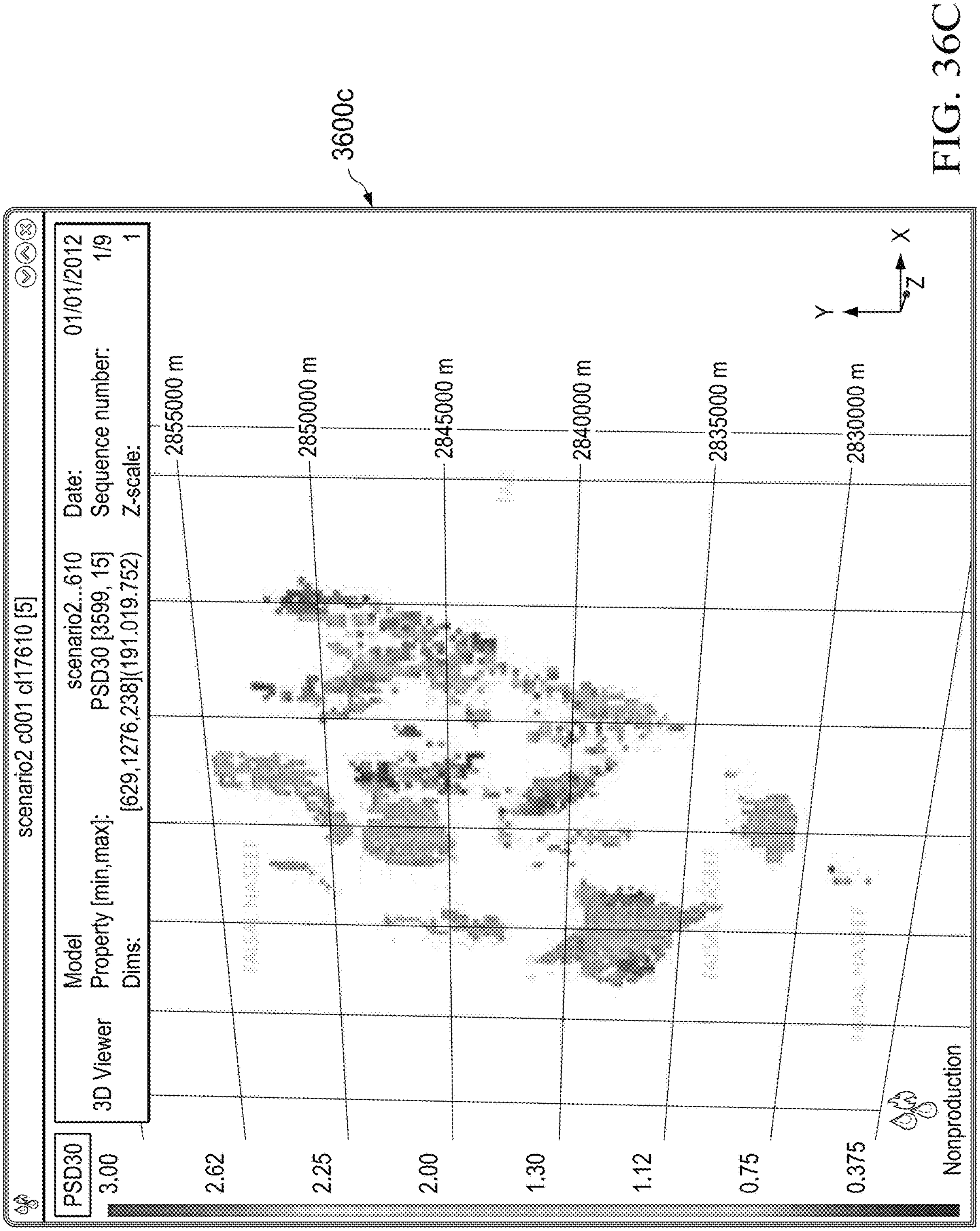
Figure 37:
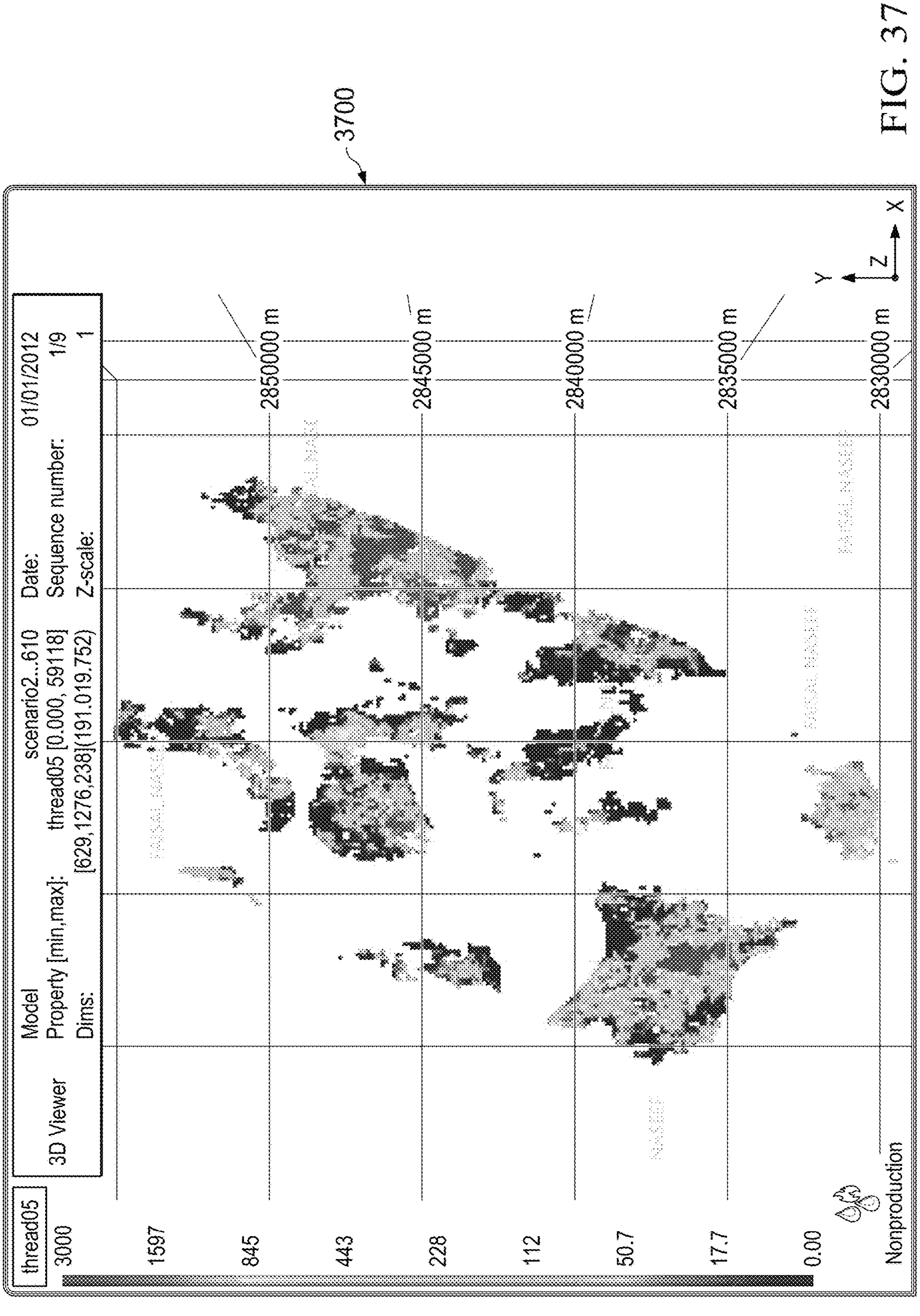
FIG. 37 illustrates a 2D heat map for TDPI values after activating gas simulation parameters (non-Darcy and Pseudo pressure functions) according to the present disclosure.

Method 200 may continue at step 212, which includes generating a graphical representation of the generated 3D index for presentation on a graphical user interface to a user. For example, after the completion of all simulation runs, FIGS. 35A-35C show 2D heat maps 3500*a*-3500*c* (respectively) that are output from the TDPI process of step 210 based on the geomechanical specified parameters (for example, from step 206). FIGS. 36A-36C show 2D maps 3600*a*-3600*c* (respectively) that are output from the TDPI process of step 210 based on specifying mono frequency attributes (for example, from step 204). After activating gas reservoir simulation parameters such as non-Darcy and pseudo pressure functions (for example, from step 208), FIG. 37 shows a 2D heat map 3700 that is the result which allows for energy plus gas rich cells and drillable wells to be revealed. In heat map 3700, lighter areas in the average map represent nonproductive areas whereas darker areas indicate areas with the highest values of TDPI.

In the example experimentation, to validate and evaluate the results obtained from applying geomechanical properties, mono frequency attributes, and gas reservoir simulation pressure related parameters, ten wells have been placed considering each of these three elements. The wells were placed according to the best spots obtained with TDPI values that factor in each of the geomechanical, mono frequency, and gas pressure related simulation parameters. FIGS. 38-42 show TDPI computed values based on geomechanical properties, mono frequency attributes, a conventional spacing method, reservoir opportunity index, and gas pressure related simulation parameters, respectively.

Figure 38:
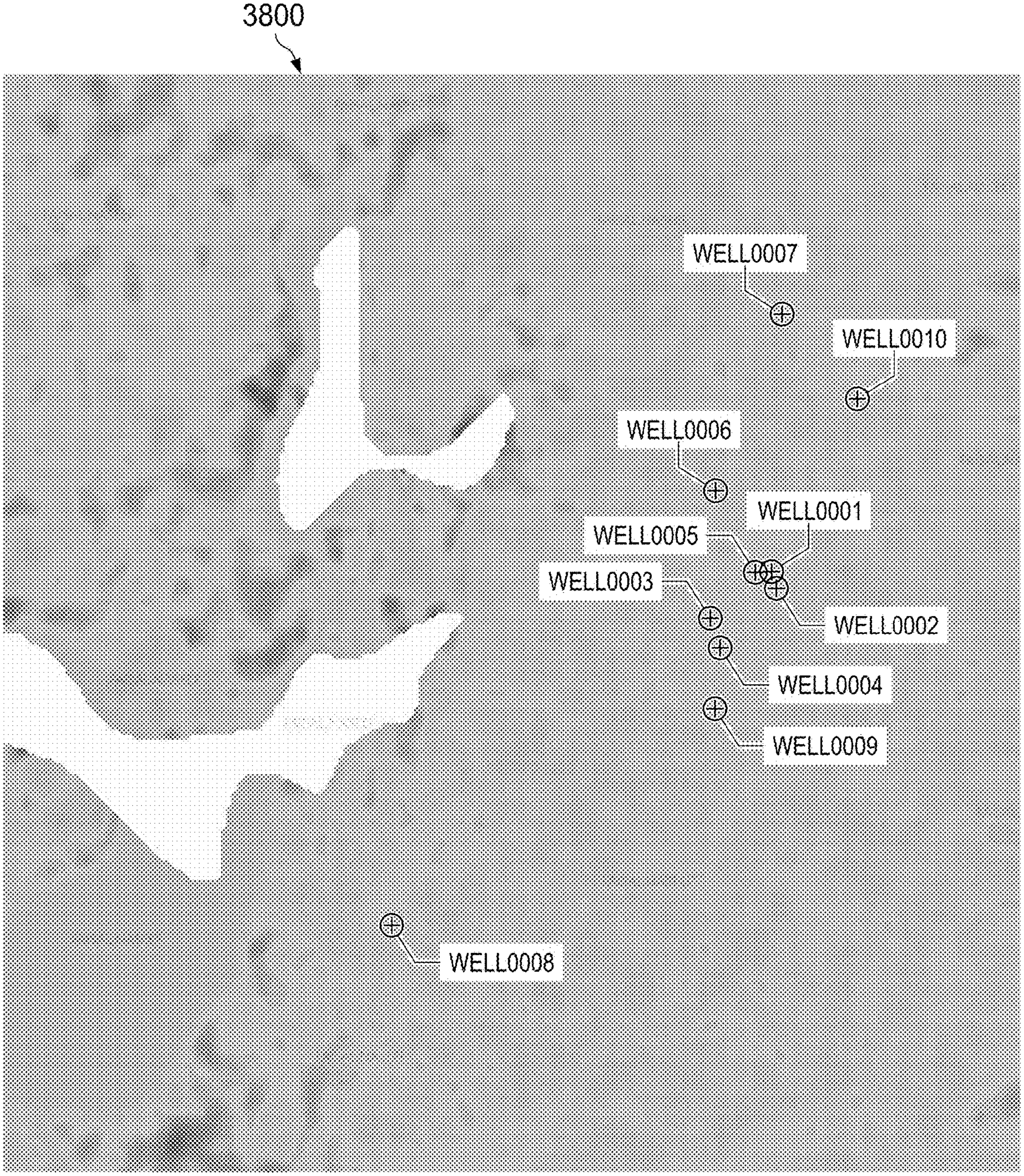
FIG. 38 illustrates a map that shows ten gas wells placed in a reservoir based on TDPI values computed considering geomechanical properties according to the present disclosure.
Figure 39:
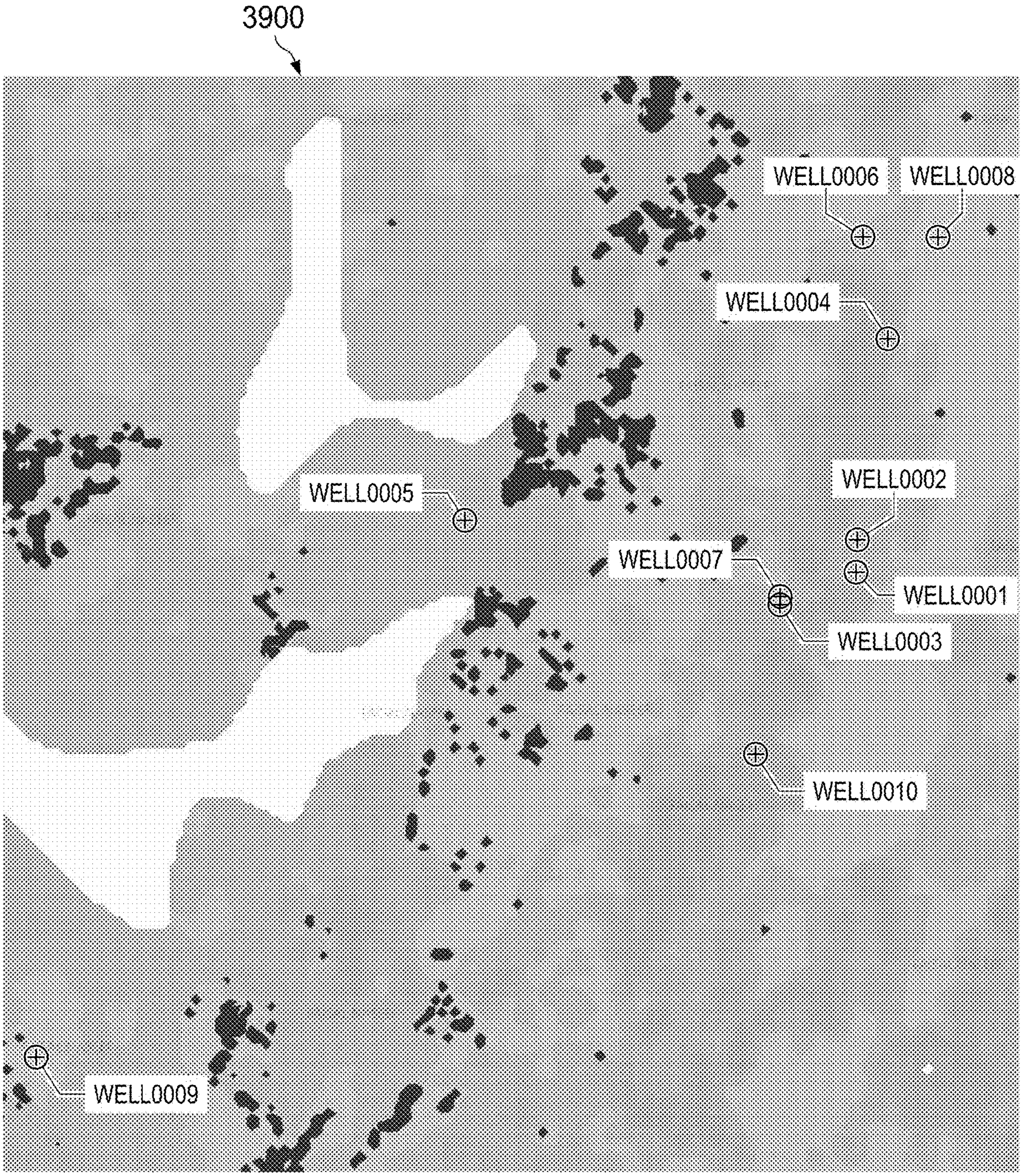
FIG. 39 illustrates a map that shows ten gas wells placed in a reservoir based on TDPI values computed considering mono frequency attributes according to the present disclosure.
Figure 40:
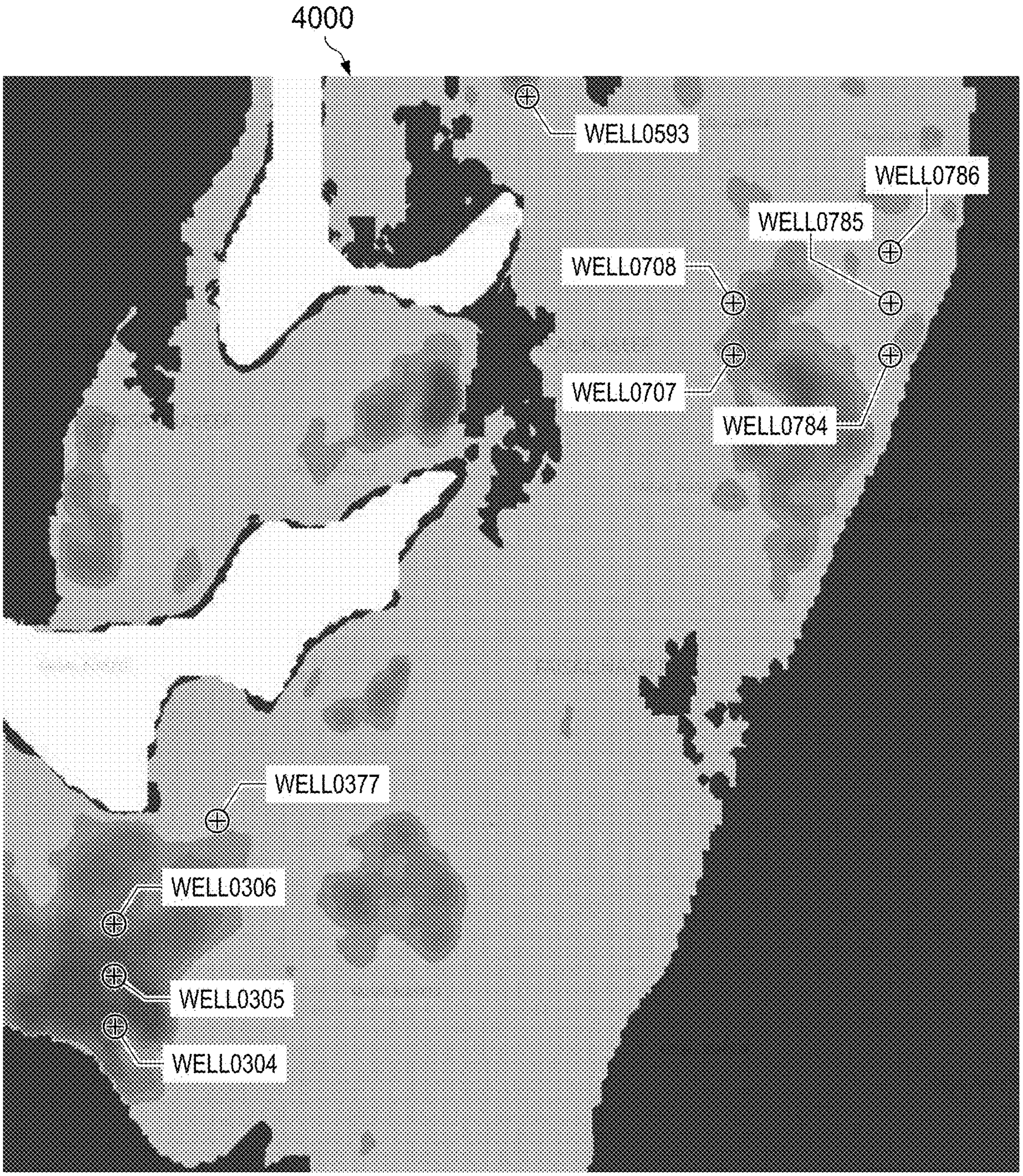
FIG. 40 illustrates a map that shows ten gas wells placed in a reservoir based on a conventional well placement method according to the present disclosure.
Figure 41:
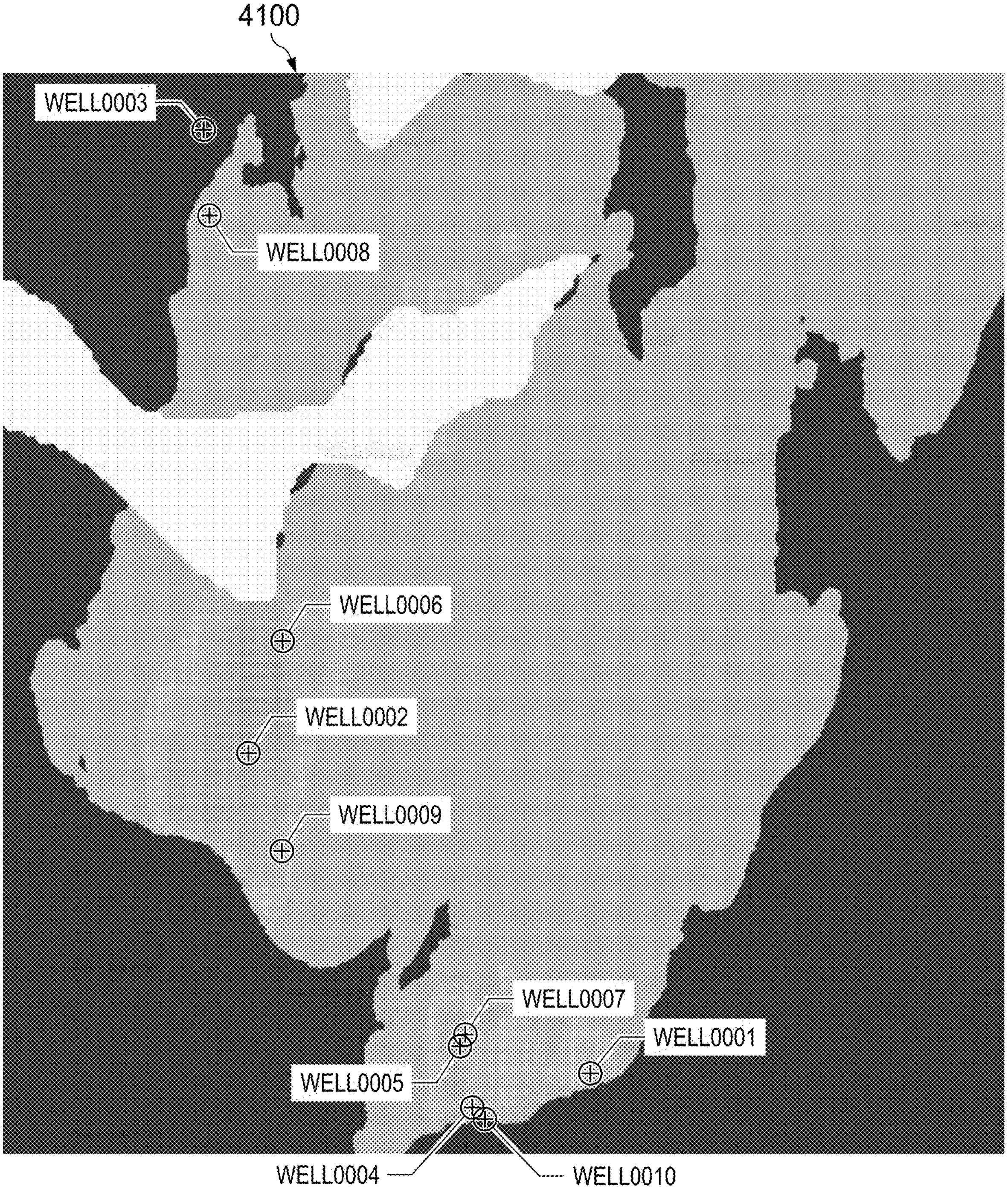
FIG. 41 illustrates a map that shows ten gas wells placed in a reservoir based on a reservoir opportunity index (ROI) which includes gas saturation, porosity and permeability according to the present disclosure.
Figure 42:
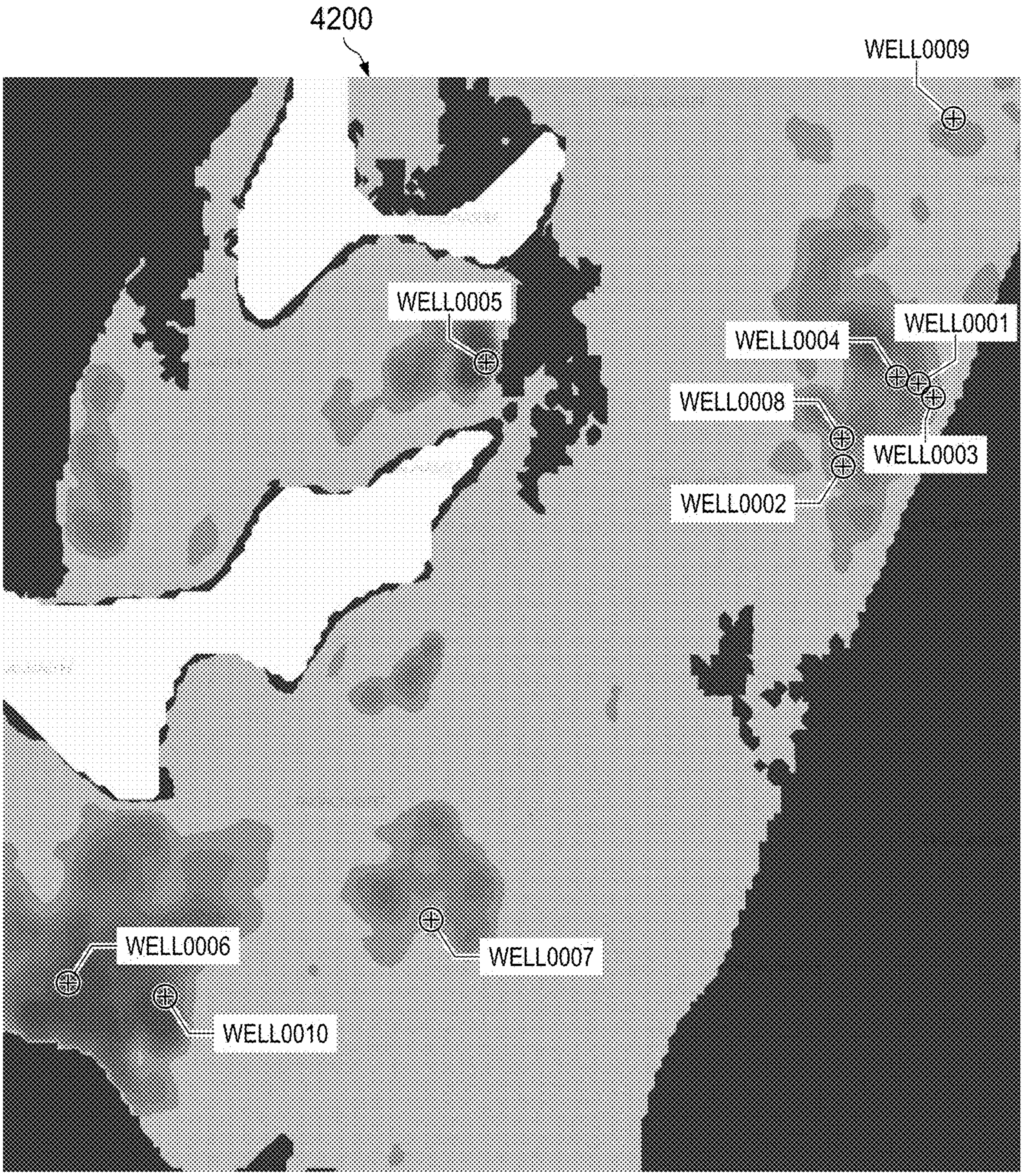
FIG. 42 illustrates a map that shows ten gas wells placed in a reservoir based on TDPI values computed considering gas pressure related simulation parameters according to the present disclosure.

More specifically, FIG. 38 shows heat map 3800, which shows the ten gas wells placed based on TDPI values computed considering geomechanical properties. FIG. 39 shows heat map 3800, which shows the ten gas wells placed based on TDPI values computed considering mono frequency attributes. FIG. 40 shows heat map 4000, which shows the ten gas wells placed based on conventional well placement methods (in other words, not based on method 200). FIG. 41 shows heat map 4100, which shows the ten gas wells placed based on a Reservoir Opportunity Index (ROI), which includes gas saturation, porosity, and permeability. FIG. 42 shows heat map 4200, which shows the ten gas wells placed based on TDPI values computed considering gas pressure related simulation parameters. In these heat maps, some wells are close to each other, but at different layers to honor the spacing constraints.

Figures 43, 44:
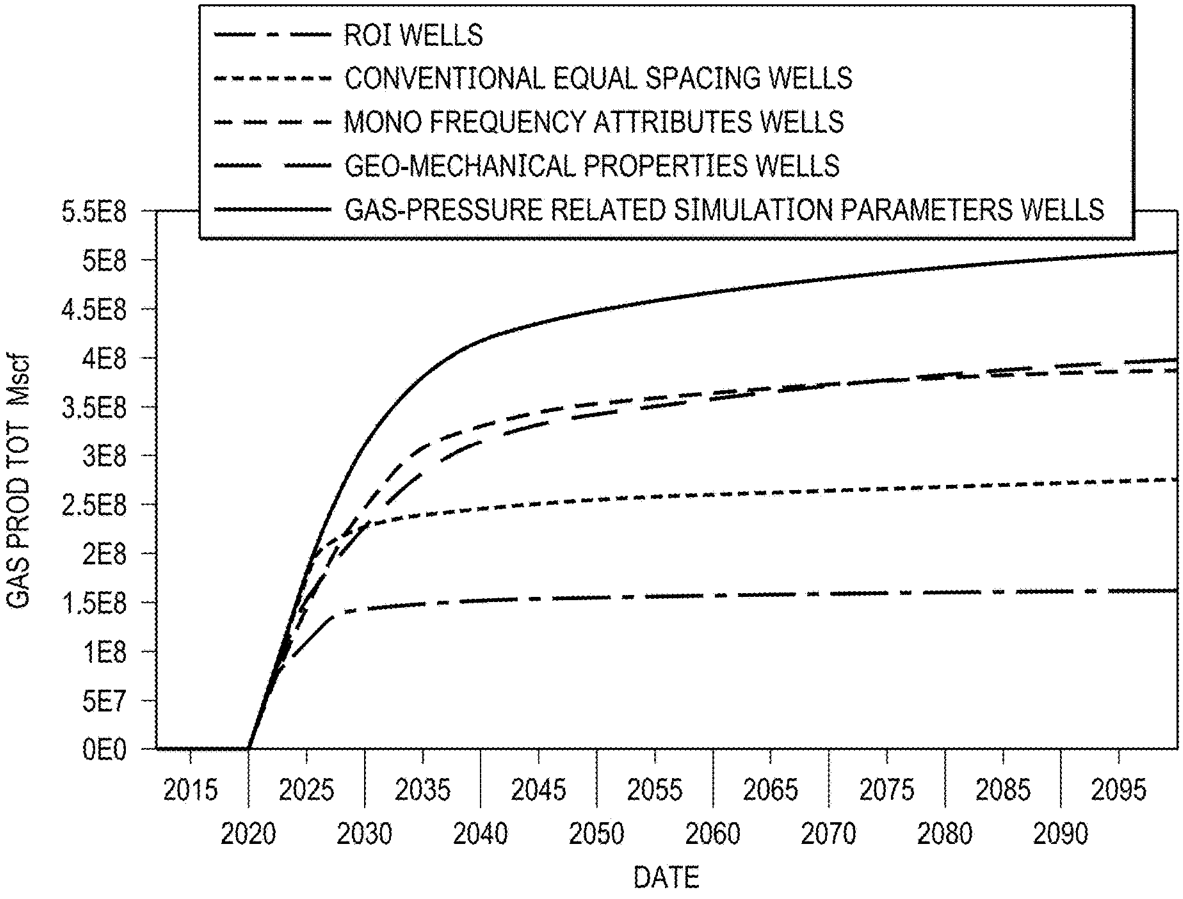
FIG. 43 illustrates a graph that compares the performance of the ten wells placed in a reservoir based on multiple gas reservoirs sweet spots criteria according to the present disclosure.
FIG. 44 illustrates a chart that shows gas recovered after 80 years of production from an example reservoir from each scenario of the graph of FIG. 43 according to the present disclosure.

All the ten wells, in this example, have the same length and spacing of eight cells between them in radial format. After simulating the performance of these scenarios with the same settings for all the gas producers at each case for about 80 years, another output from step 212 is shown in FIG. 43. FIG. 43 shows a graph 4300 that compares the performance of the ten wells placed in the field Y based on multiple gas reservoirs sweet spots criteria (as explained above). For example, as shown in graph 4300, the total gas production from the ten wells over 80 years is, from highest to lowest based on placement in the field, gas-pressure related simulation parameters (for example, pseudo-pressure and non-Darcy flow factors), geomechanical property parameters, mono frequency attribute parameters (these are very close), conventional equal spacing parameters, and ROI parameters.

As shown, execution of the method 200 resulted in well placement using geomechanical properties and mono frequency attributes, which produced more than 40% higher gas than what is conventionally gained from wells placed without using method 200. In addition, gas pressure related simulation parameters, such as non-Darcy and pseudo pressure functions, were responsible to increase the gas recovery more than 80% than conventional parameter placement. FIG. 44 shows a table 4400 that illustrates, numerically and graphically, the recovered numbers from each scenario presented.

The well production sites calculated using method 200 are 3D properties. In this example implementation, prediction wells were placed based on average maps of such sites. The wells penetrated all layers of the simulation model. This was done to simplify the analysis in this example; in reality, wells are optimally digitized to follow the predicted sites in 3D space to make sure the wells pass through for example, only, high-potential zones. The average map technique used in this example may be useful for quick assessments to guide field development planning and optimization. Such assessment may give an indication for the potential of utilizing method 200 to predict energetic gas rich pockets in reservoirs and thus facilitate justified development decisions for the field of interest.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described previously as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described previously should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for determining one or more hydrocarbon sweet spots, comprising:

generating, with one or more hardware processors, a three-dimensional (3D) simulation model of a hydrocarbon reservoir in a subterranean formation;

executing, with the one or more hardware processors, a gas winnowing process to the 3D simulation model;

applying, with the one or more hardware processors, one or more geomechanical restraints to the 3D simulation model;

activating, with the one or more hardware processors, one or more energy simulation parameters with the 3D simulation model;

applying, with the one or more hardware processors, a total dynamic productivity index (TDPI) process to the 3D simulation model to generate at least one 3D index that comprises one or more hydrocarbon sweet spots; and generating, with the one or more hardware processors, a graphical representation of the generated 3D index for presentation on a graphical user interface (GUI) to a user, wherein the computer-implemented method further comprises:

integrating, with the one or more hardware processors, one or more 3D geomechanical properties and one or more two- or three-dimensional (2D or 3D) mono frequency attributes with the 3D simulation model, and generating, with the one or more hardware processors, a history matched 3D simulation model that comprises a grid model that comprises a plurality of grid cells; and wherein the computer-implemented method further comprises:

applying, with the one or more hardware processors, one or more user-defined cutoffs to the 2D or 3D mono frequency attributes, applying, with the one or more hardware processors, one or more user-defined cutoffs to the 3D geomechanical properties, excluding, with the one or more hardware processors, a portion of the plurality of grid cells based on the applied one or more user-defined cutoffs to the 2D or 3D mono frequency attributes and the applied one or more user-defined cutoffs to the 3D geomechanical properties, and generating the history matched 3D simulation model that comprises the grid model that comprises the plurality of grid cells without the excluded portion of the plurality of grid cells.

2. The computer-implemented method of claim 1, wherein the plurality of grid cells comprise a plurality of uniformly-sized grid cells.

3. The computer-implemented method of claim 2, further comprising receiving the one or more user-defined cutoffs to the 2D or 3D mono frequency attributes and the one or more user-defined cutoffs to the 3D geomechanical properties from the user through the GUI.

4. The computer-implemented method of claim 1, further comprising receiving the one or more user-defined cutoffs to the 2D or 3D mono frequency attributes and the one or more user-defined cutoffs to the 3D geomechanical properties from the user through the GUI.

5. The computer-implemented method of claim 4, wherein the graphical representation of the generated 3D index comprises at least one of:

a graphical representation of the generated 3D index that includes mono frequency attributes;

a graphical representation of the generated 3D index that includes geomechanical properties; or a graphical representation of the generated 3D index that includes has energy simulation parameters.

6. The computer-implemented method of claim 1, wherein generating the one or more energy simulation parameters with the 3D simulation model comprises:

activating, with the one or more hardware processors, a pseudo-pressure function;

activating, with the one or more hardware processors, a non-Darcy flow function; and generating the history matched 3D simulation model that comprises the pseudo-pressure function and the non-Darcy flow function.

7. The computer-implemented method of claim 6, further comprising receiving a pseudo-pressure blockage factor for the pseudo-pressure function and a D factor for the non-Darcy flow function from the user through the GUI.

8. The computer-implemented method of claim 1, wherein applying the TDPI process comprises:

identifying, with the one or more hardware processors, one or more user-defined TDPI factors;

executing, with the one or more hardware processors, productivity index computations for each of the one or more hydrocarbon sweet spots for each of a plurality of layers in the 3D simulation model; and generating, with the one or more hardware processors, a TDPI for each of a plurality of grid cells of the 3D simulation model per layer of the plurality of layers in the 3D simulation model.

9. The computer-implemented method of claim 8, wherein the one or more user-defined TDPI factors comprise at least one of:

a spacing between the one or more hydrocarbon sweet spots;

one or more static cutoffs;

one or more dynamic cutoffs;

a time interval between completion times of the one or more hydrocarbon sweet spots; or one or more layers of the plurality of layers to be excluded from the productivity index computations.

10. The computer-implemented method of claim 1, wherein the graphical representation of the generated 3D index comprises at least one of:

a graphical representation of the generated 3D index that includes mono frequency attributes;

a graphical representation of the generated 3D index that includes geomechanical properties; or a graphical representation of the generated 3D index that includes has energy simulation parameters.

11. A computing system, comprising:

one or more memory modules; and one or more hardware processors communicably coupled to the one or more memory modules and configured to execute instructions stored in the one or more memory modules to perform operations comprising:

generating a three-dimensional (3D) simulation model of a hydrocarbon reservoir in a subterranean formation;

executing a gas winnowing process to the 3D simulation model;

applying one or more geomechanical restraints to the 3D simulation model;

activating one or more energy simulation parameters with the 3D simulation model;

applying a total dynamic productivity index (TDPI) process to the 3D simulation model to generate at least one 3D index that comprises one or more hydrocarbon production sweet spots; and generating a graphical representation of the generated 3D index for presentation on a graphical user interface (GUI) to a user, wherein the operation of generating the 3D simulation model comprises:

integrating one or more 3D geomechanical properties and one or more two- or three-dimensional (2D or 3D) mono frequency attributes with the 3D simulation model, and generating a history matched 3D simulation model that comprises a grid model that comprises a plurality of grid cells; and wherein the operations further comprise:

applying one or more user-defined cutoffs to the 2D or 3D mono frequency attributes, applying one or more user-defined cutoffs to the 3D geomechanical properties, excluding a portion of the plurality of grid cells based on the applied one or more user-defined cutoffs to the 2D or 3D mono frequency attributes and the applied one or more user-defined cutoffs to the 3D geomechanical properties, and generating the history matched 3D simulation model that comprises the grid model that comprises the plurality of grid cells without the excluded portion of the plurality of grid cells.

12. The computing system of claim 11, wherein the graphical representation of the generated 3D index comprises at least one of:

a graphical representation of the generated 3D index that includes mono frequency attributes;

a graphical representation of the generated 3D index that includes geomechanical properties; or a graphical representation of the generated 3D index that includes has energy simulation parameters.

13. The computing system of claim 11, wherein the plurality of grid cells comprise a plurality of uniformly-sized grid cells.

14. The computing system of claim 13, wherein the operations further comprise receiving the one or more user-defined cutoffs to the 2D or 3D mono frequency attributes and the one or more user-defined cutoffs to the 3D geomechanical properties from the user through the GUI.

15. The computing system of claim 11, wherein the operations further comprise receiving the one or more user-defined cutoffs to the 2D or 3D mono frequency attributes and the one or more user-defined cutoffs to the 3D geomechanical properties from the user through the GUI.

16. The computing system of claim 15, wherein the graphical representation of the generated 3D index comprises at least one of:

a graphical representation of the generated 3D index that includes mono frequency attributes;

a graphical representation of the generated 3D index that includes geomechanical properties; or a graphical representation of the generated 3D index that includes has energy simulation parameters.

17. The computing system of claim 11, wherein the operation of generating the one or more energy simulation parameters with the 3D simulation model comprises:

activating a pseudo-pressure function;

activating a non-Darcy flow function; and generating the history matched 3D simulation model that comprises the pseudo-pressure function and the non-Darcy flow function.

18. The computing system of claim 17, wherein the operations further comprise receiving a pseudo-pressure blockage factor for the pseudo-pressure function and a D factor for the non-Darcy flow function from the user through the GUI.

19. The computing system of claim 11, wherein the operation of applying the TDPI process comprises:

identifying one or more user-defined TDPI factors;

executing productivity index computations for each of the one or more hydrocarbon sweet spots for each of a plurality of layers in the 3D simulation model; and generating a TDPI for each of a plurality of grid cells of the 3D simulation model per layer of the plurality of layers in the 3D simulation model.

20. The computing system of claim 19, wherein the one or more user-defined TDPI factors comprise at least one of:

a spacing between the one or more hydrocarbon sweet spots;

one or more static cutoffs;

one or more dynamic cutoffs;

a time interval between completion times of the one or more hydrocarbon sweet spots; or one or more layers of the plurality of layers to be excluded from the productivity index computations.

21. An apparatus comprising at least one non-transitory, computer readable storage medium that stores instructions that, when executed by at least one processor, cause the at least one processor to perform operations comprising:

generating, with one or more hardware processors, a three-dimensional (3D) simulation model of a hydrocarbon reservoir in a subterranean formation;

executing a gas winnowing process to the 3D simulation model;

applying one or more geomechanical restraints to the 3D simulation model;

activating one or more energy simulation parameters with the 3D simulation model;

applying a total dynamic productivity index (TDPI) process to the 3D simulation model to generate at least one 3D index that comprises one or more hydrocarbon sweet spots; and generating a graphical representation of the generated 3D index for presentation on a graphical user interface (GUI) to a user, wherein the operation of generating the 3D simulation model comprises:

integrating one or more 3D geomechanical properties and one or more two- or three-dimensional (2D or 3D) mono frequency attributes with the 3D simulation model, and generating a history matched 3D simulation model that comprises a grid model that comprises a plurality of grid cells; and wherein the operations further comprise:

applying one or more user-defined cutoffs to the 2D or 3D mono frequency attributes, applying one or more user-defined cutoffs to the 3D geomechanical properties, excluding a portion of the plurality of grid cells based on the applied one or more user-defined cutoffs to the 2D or 3D mono frequency attributes and the applied one or more user-defined cutoffs to the 3D geomechanical properties, and generating the history matched 3D simulation model that comprises the grid model that comprises the plurality of grid cells without the excluded portion of the plurality of grid cells.

22. The apparatus of claim 21, wherein the plurality of grid cells comprise a plurality of uniformly-sized grid cells.

23. The apparatus of claim 22, wherein the operations further comprise receiving the one or more user-defined cutoffs to the 2D or 3D mono frequency attributes and the one or more user-defined cutoffs to the 3D geomechanical properties from the user through the GUI.

24. The apparatus of claim 21, wherein the operations further comprise receiving the one or more user-defined cutoffs to the 2D or 3D mono frequency attributes and the one or more user-defined cutoffs to the 3D geomechanical properties from the user through the GUI.

25. The apparatus of claim 24, wherein the graphical representation of the generated 3D index comprises at least one of:

a graphical representation of the generated 3D index that includes mono frequency attributes;

a graphical representation of the generated 3D index that includes geomechanical properties; or a graphical representation of the generated 3D index that includes has energy simulation parameters.

26. The apparatus of claim 21, wherein the operation of generating the one or more energy simulation parameters with the 3D simulation model comprises:

activating a pseudo-pressure function;

activating a non-Darcy flow function; and generating the history matched 3D simulation model that comprises the pseudo-pressure function and the non-Darcy flow function.

27. The apparatus of claim 26, wherein the operations further comprise receiving a pseudo-pressure blockage factor for the pseudo-pressure function and a D factor for the non-Darcy flow function from the user through the GUI.

28. The apparatus of claim 21, wherein the operation of applying the TDPI process comprises:

identifying one or more user-defined TDPI factors;

executing productivity index computations for each of the one or more hydrocarbon sweet spots for each of a plurality of layers in the 3D simulation model; and generating a TDPI for each of a plurality of grid cells of the 3D simulation model per layer of the plurality of layers in the 3D simulation model.

29. The apparatus of claim 28, wherein the one or more user-defined TDPI factors comprise at least one of:

a spacing between the one or more hydrocarbon sweet spots;

one or more static cutoffs;

one or more dynamic cutoffs;

a time interval between completion times of the one or more hydrocarbon sweet spots; or one or more layers of the plurality of layers to be excluded from the productivity index computations.

30. The apparatus of claim 21, wherein the graphical representation of the generated 3D index comprises at least one of:

a graphical representation of the generated 3D index that includes mono frequency attributes;

a graphical representation of the generated 3D index that includes geomechanical properties; or a graphical representation of the generated 3D index that includes has energy simulation parameters.

* * * * *